(12) United States Patent
Yoshizawa et al.

(10) Patent No.: US 7,209,881 B2
(45) Date of Patent: Apr. 24, 2007

(54) PREPARING ACOUSTIC MODELS BY SUFFICIENT STATISTICS AND NOISE-SUPERIMPOSED SPEECH DATA

(75) Inventors: Shinichi Yoshizawa, Osaka (JP); Kiyohiro Shikano, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 951 days.

(21) Appl. No.: 10/323,990

(22) Filed: Dec. 18, 2002

(65) Prior Publication Data
US 2003/0120488 A1 Jun. 26, 2003

(30) Foreign Application Priority Data
Dec. 20, 2001 (JP) .............................. 2001-387037
Apr. 10, 2002 (JP) .............................. 2002-107628

(51) Int. Cl.
*G10L 15/06* (2006.01)
*G10L 15/14* (2006.01)
*G10L 15/20* (2006.01)

(52) U.S. Cl. .................... 704/233; 704/243; 704/256.2

(58) Field of Classification Search ................ 704/233, 704/243, 244, 245, 246, 250, 256.2, 256.3
See application file for complete search history.

(56) References Cited

U.S. PATENT DOCUMENTS

| | | | | |
|---|---|---|---|---|
| 5,819,223 A * | 10/1998 | Takagi | ...................... | 704/256.1 |
| 5,839,105 A * | 11/1998 | Ostendorf et al. | .......... | 704/256 |
| 5,864,810 A | 1/1999 | Digalakis et al. | | |
| 6,336,108 B1 * | 1/2002 | Thiesson et al. | ............... | 706/20 |
| 6,389,393 B1 * | 5/2002 | Gong | ......................... | 704/244 |
| 6,421,641 B1 * | 7/2002 | Huang et al. | ................ | 704/250 |
| 6,466,908 B1 * | 10/2002 | Baggenstoss | ............... | 704/256 |
| 6,622,117 B2 * | 9/2003 | Deligne et al. | ............. | 702/190 |
| 6,804,647 B1 * | 10/2004 | Heck et al. | .................. | 704/246 |
| 6,842,734 B2 * | 1/2005 | Yamada et al. | ............. | 704/245 |
| 6,876,966 B1 * | 4/2005 | Deng et al. | .................. | 704/233 |
| 7,065,487 B2 * | 6/2006 | Miyazawa | ................... | 704/233 |
| 7,103,541 B2 * | 9/2006 | Attias et al. | ................. | 704/226 |

(Continued)

FOREIGN PATENT DOCUMENTS

JP           05002399 A       1/1993

(Continued)

OTHER PUBLICATIONS

Yoshizawa et al., "Unsupervised speaker adaptation based on sufficient HMM statistics of selected speakers," IEEE International Conference on Acoustics, Speech, and Signal Processing, 2001, May 7-11, 2001, vol. 1, pp. 341-344.*

(Continued)

*Primary Examiner*—Martin Lerner
(74) *Attorney, Agent, or Firm*—Harness, Dickey & Pierce, P.L.C.

(57) ABSTRACT

Noise-superimposed speech data is grouped according to acoustic similarity, and sufficient statistics are prepared using the speech data in each of the groups. A group acoustically similar to voice data of a user of the speech recognition is selected, and sufficient statistics acoustically similar to the user's voice data are selected from the sufficient statistics in the selected group. Using the selected sufficient statistics, an acoustic model is prepared.

19 Claims, 48 Drawing Sheets

U.S. PATENT DOCUMENTS

| | | | |
|---|---|---|---|
| 2003/0050783 A1* | 3/2003 | Yoshizawa | 704/270.1 |
| 2003/0200085 A1* | 10/2003 | Nguyen et al. | 704/238 |
| 2004/0002858 A1* | 1/2004 | Attias et al. | 704/226 |
| 2004/0019483 A1* | 1/2004 | Deng et al. | 704/239 |
| 2004/0143435 A1* | 7/2004 | Deng et al. | 704/256 |
| 2005/0228666 A1* | 10/2005 | Liu et al. | 704/256 |

FOREIGN PATENT DOCUMENTS

| | | |
|---|---|---|
| JP | 06-214592 A | 8/1994 |
| JP | 09-034485 | 2/1997 |
| JP | 09-258769 A | 10/1997 |
| JP | 10-161692 A | 6/1998 |
| JP | 10-512686 | 12/1998 |
| JP | 11-175090 | 7/1999 |
| JP | 2000-075889 | 3/2000 |
| JP | 2000-081893 | 3/2000 |
| JP | 2000-330587 | 11/2000 |
| JP | 2001-255887 A | 9/2001 |
| JP | 2002-182682 A | 6/2002 |

OTHER PUBLICATIONS

Wang et al., "Complete recognition of continuous Mandarin speech for Chinese language with very large vocabulary but limited training data," Conference on Acoustics, Speech, and Signal Processing, 1995. ICASSP-95. May 9-12, 1995, vol. 1, pp. 61 to 64.*

Nakamura et al., "Noise and room acoustics distorted speech recognition by HMM composition," 1996 IEEE International Conference on Acoustics, Speech, and Signal Processing, 1996. ICASSP-96. May 7-10, 1996, vol. 1, pp. 69 to 72.*

Shinichi Yoshizawa et al.; "Unsupervised training based on the sufficient HMM statistics from selected speakers"; Technical Report of IEICE; NLC2000-41, SP2000-89 (Dec. 2000); pp. 83-88.

M.J.F. Gales; "Cluster Adaptive Training for Speech Recognition"; IBM T.J. Watson Research Center; Yorktown Heights, New York.

Masahiro Tanaka; "Principle and Application of EM Algorithm"; System/Control/Information; The Institute of Systems, Control and Information Engineers; vol. 42, No. 2; 1998; pp. 88-96; with a partial English translation.

Gao Y et al: "Speaker Adaptation Based on Pre-Clustering Training Speakers" 5th European Conference on Speech Communication and Technology. Eurospeech '97. Rhodes, Greece, Sep. 22-25, 1997.

Illina I et al: "Environment normalization training and environment adaptation using mixture stochastic trajectory model" Speech Communication, Elsevier Science Publishers, Amsterdam, NL, vol. 26, No. 4, Dec. 1998.

Wu C et al: "Speaker adaptation for telephony data using speaker clustering" Proceedings of the International Conference on Signal Processing, vol. 2, Aug. 21, 2000.

* cited by examiner

FIG. 4
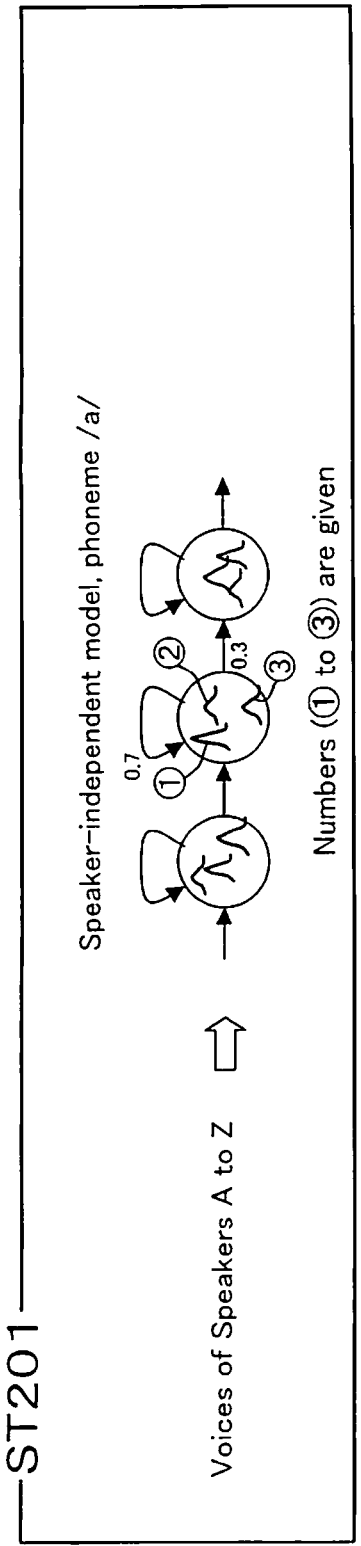
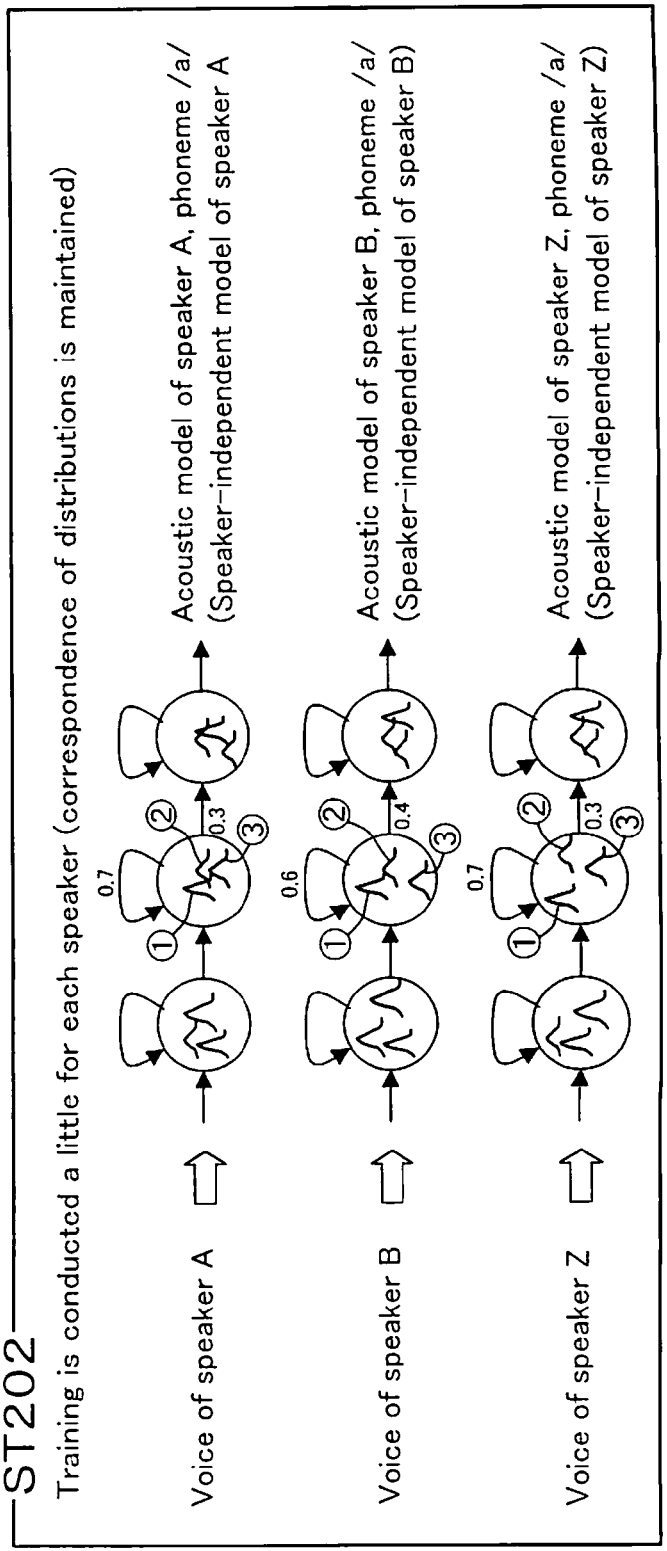

FIG. 15

| SN ratio of use environment | Adapted model of the invention | Conventional adapted model |
|---|---|---|
| 15dB | 61.0% | 32.6% |
| 20dB | 70.5% | 51.4% |
| 25dB | 75.1% | 66.6% |

Word accuracy

FIG. 16
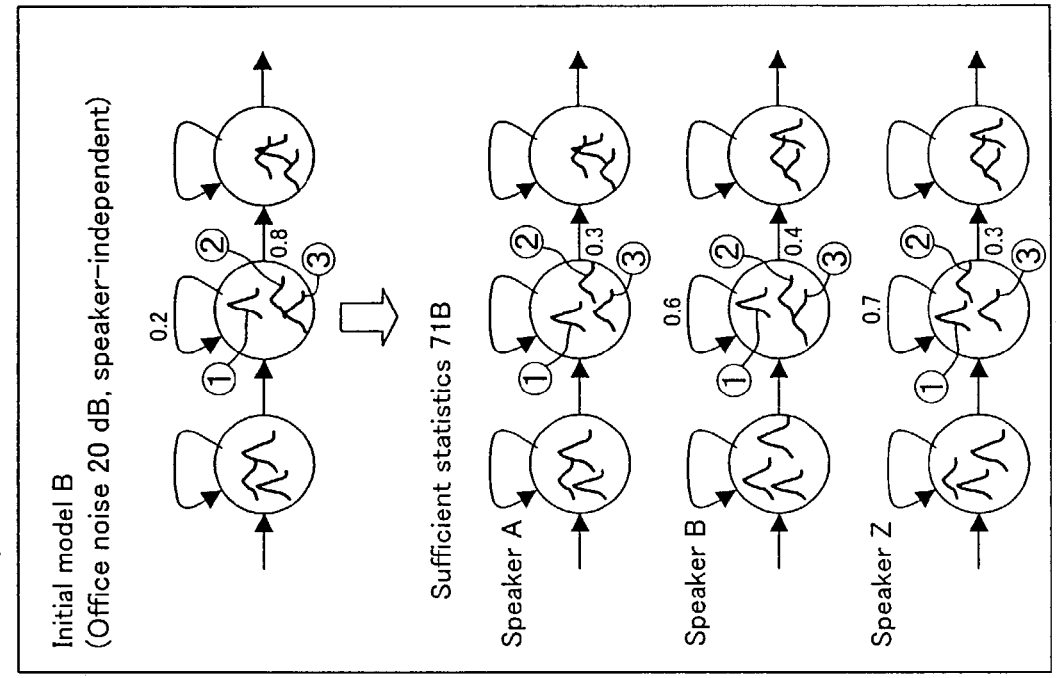
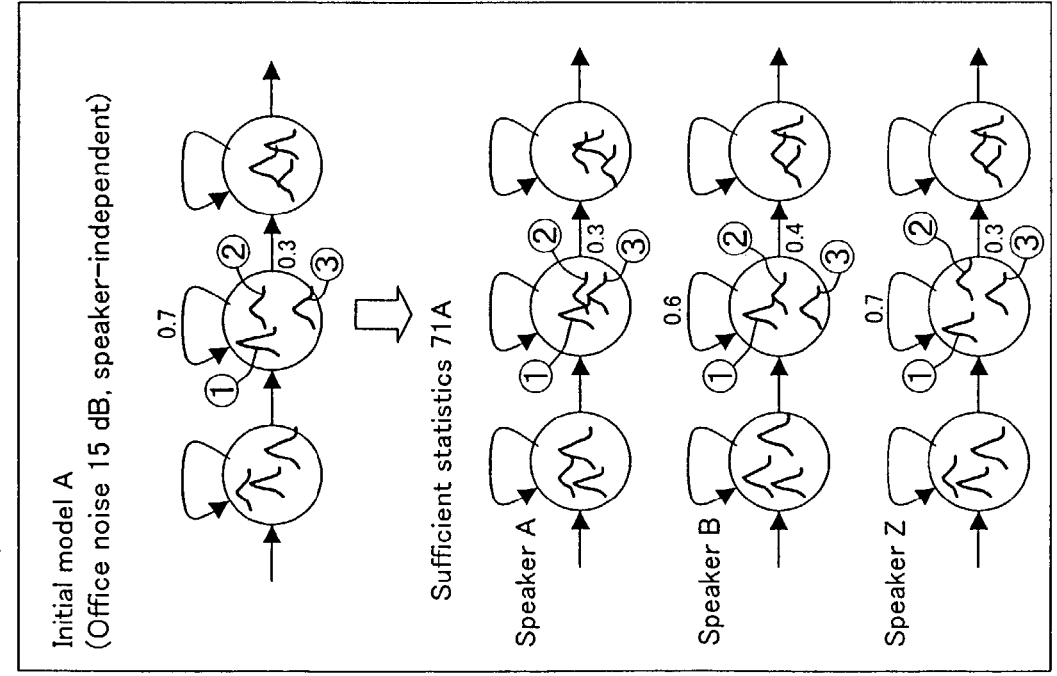

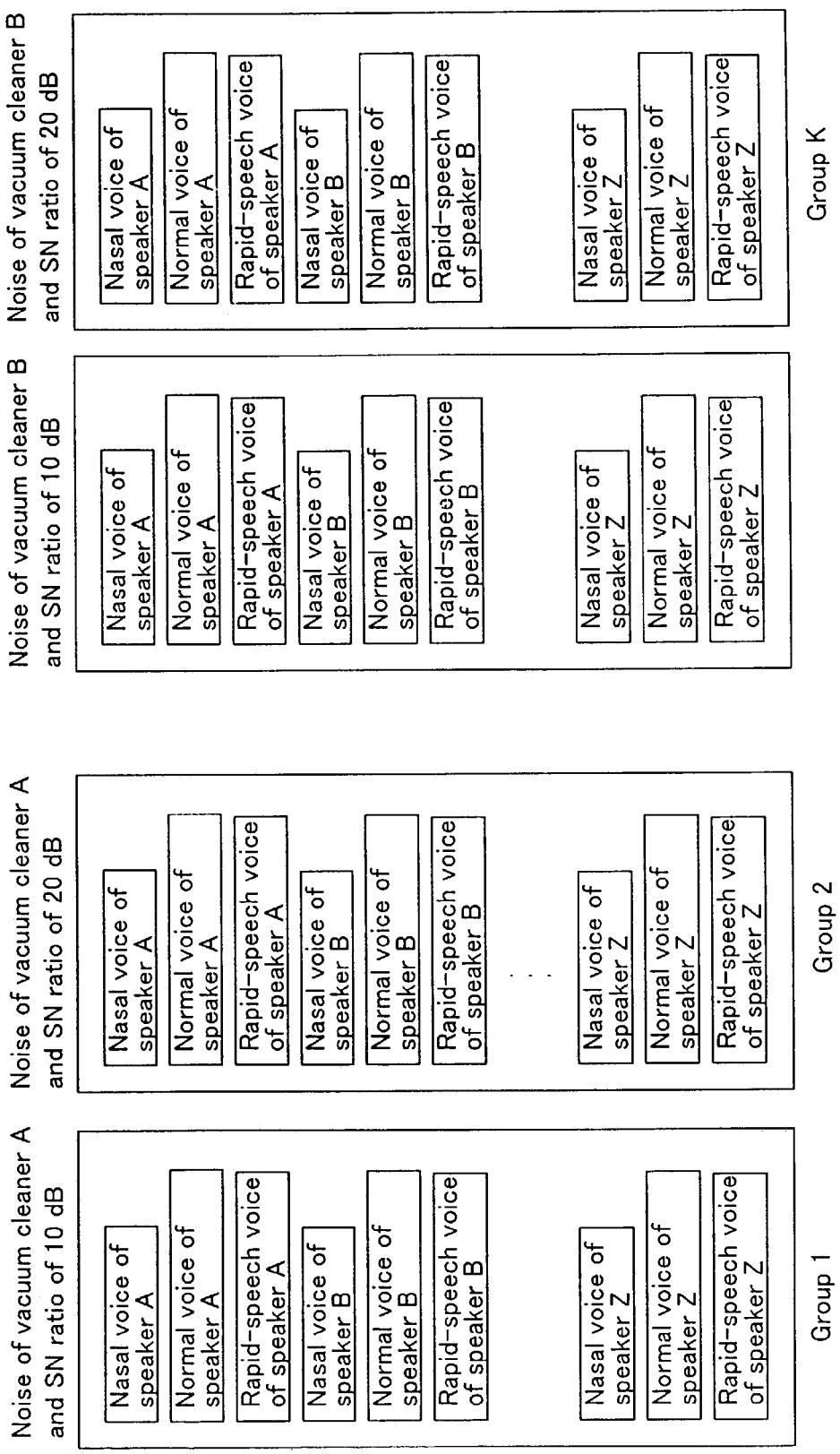
FIG. 19B Sufficient statistics and selection models
(Groups are formed according to the type of noise × SN ratio, and sufficient statistics for variations of the speaker × voice tone of speaker are stored for each group)

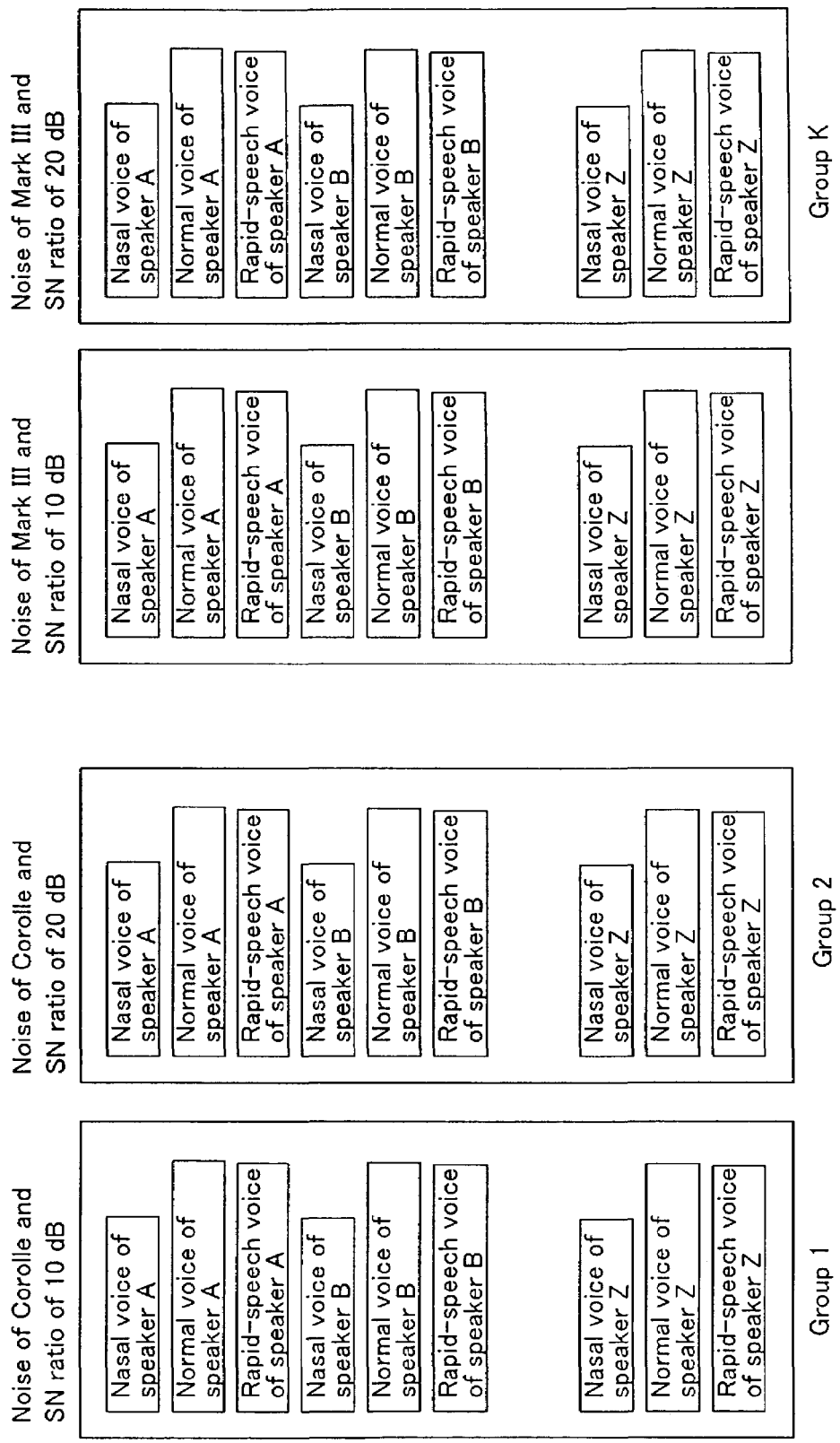
FIG. 21B Sufficient statistics and selection models
(Groups are formed according to the type of noise × SN ratio, and sufficient statistics for variations of the speaker × voice tone of speaker are stored for each group)

FIG. 25B     Sufficient statistics and selection models (Groups are formed according to the type of noise × SN ratio × similarity of speaker, and sufficient statistics for variations of voice tone of speaker are stored for each group)

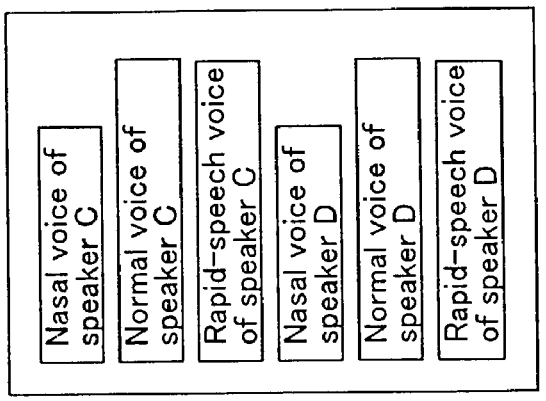

Group 1 — Noise of train, SN ratio of 10 dB and similar speakers A, B

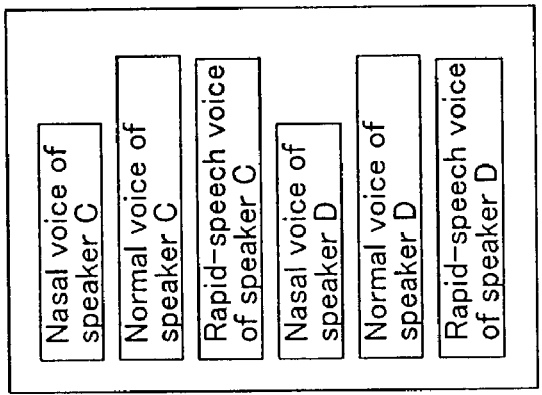

Group 2 — Noise of train, SN ratio of 10 dB and similar speakers C, D

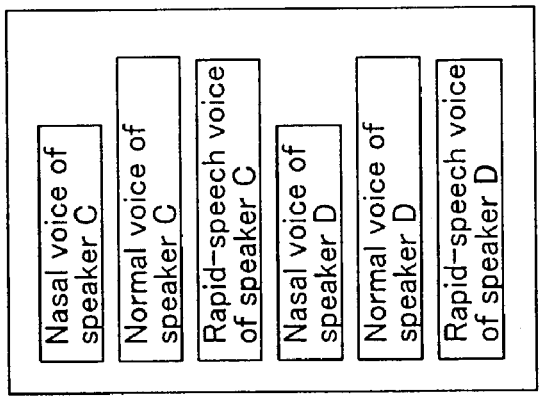

Group (K-1) — Noise of bus, SN ratio of 10 dB and similar speakers C, D

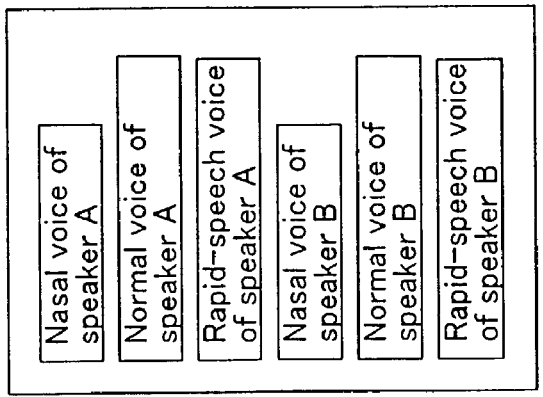

Group K — Noise of bus, SN ratio of 20 dB and similar speakers C, D

FIG. 27 Sufficient statistics and selection models (Groups are formed according to the similarity of speaker, and sufficient statistics for variations of the type of noise × SN ratio are stored for each group)

PREPARING ACOUSTIC MODELS BY SUFFICIENT STATISTICS AND NOISE-SUPERIMPOSED SPEECH DATA

BACKGROUND OF THE INVENTION

The present invention relates to a method, apparatus and computer program for preparing an acoustic model used for speech recognition. More particularly, the present invention relates to a method, apparatus and computer program for preparing an acoustic model adapted to the voice of a person using speech recognition and the environment in which speech recognition is used.

In recent years, it has been expected to use speech recognition technology for improvement of the convenience of the user of digital information equipment such as cellular phones, personal digital assistants (PDAs), car navigation systems, personal computers and home electric appliances.

In a speech recognition system, if no acoustic model is appropriate to a user, the user is prevented from using the speech recognition system. Therefore, it is necessary for the speech recognition system to provide an acoustic model adapted to the voice of a user. There are various techniques for adapting an acoustic model to the voice of a person using a speech recognition system (speaker adaptation techniques) as shown in FIG. 1. FIG. 1 is a map of various speaker adaptation techniques placed at positions corresponding to the levels of the computer power and the hard disk capacity of the system considered necessary to realize the respective speaker adaptation techniques. The map also includes, for the respective speaker adaptation techniques, "the number of sentences the user must utter for adaptation", "variation factors acceptable by the speaker adaptation technique (speaker individuality, voice tone)", and "recognition performance (indicated by the size of the asterisk; as the asterisk is larger, the performance is higher)".

Conventionally, because information equipment was low in computer power and small in the capacity of the hard disk mountable, only speaker adaptation techniques low in recognition performance, such as "normalization of vocal tract length" and "MLLR+eigen voice space", were available. With increase in the computer power of information equipment, speaker adaptation techniques "MLLR" and "CAT", which can exhibit high recognition performance using the increased computer power, have become available. However, in these speaker adaptation techniques, the number of sentences the user must utter for adaptation of an acoustic model is comparatively large, and this places a large burden on the user. In addition, these techniques are not appropriate to information equipment of which the user frequently changes (for example, remote controllers of TV sets). These techniques are not appropriate to equipment comparatively small in computer power, such as home electric appliances and cellular phones, either.

In recent years, hard disks have become increasingly larger in capacity and less expensive. In this situation, speaker adaptation techniques such as a "method using clustering" and a "method using sufficient statistics", which use a hard disk with a comparatively large capacity but only require comparatively low computer power, have made their appearance. These speaker adaptation techniques are appropriate to car navigation systems in which the capacity of the hard disk mounted has become increasingly larger, and to equipment comparatively low in computer power such as home electric appliances including TV sets and cellular phones. Small-size home electric appliances and cellular phones are not allowed to mount a large-capacity hard disk therein. However, due to the recent progress permitting communications with a large-capacity server through a network, the above speaker adaptation techniques have become available for such small-size equipment. In these speaker adaptation techniques, the number of sentences the user must utter for adaptation of an acoustic model can be reduced (to about one sentence). This reduces the burden on the user, and also enables instantaneous use even at the occasion of change of the user. However, in the "method using clustering", in which one HMM similar to the user is selected and used as the adapted model, the recognition performance will be greatly degraded if there is available no HMM similar to the user.

In view of the above, it is considered that the speaker adaptation technique most appropriate to cellular phones, home electric appliances and the like is the "method using sufficient statistics" (Shinichi Yoshizawa, Akira Baba et al. "Unsupervised phoneme model training based on the sufficient HMM statistics from selected speakers", Technical Report of IEICE, SP2000-89, pp.83–88 (2000)). According to this report, a high-precision adapted model (an acoustic model adapted to the voice of a user) can be obtained with one sentence utterance of the user.

A procedure for preparing an adapted model by the "method using sufficient statistics" will be described with reference to FIGS. 2 and 3.

Preparation of Selection Models and Sufficient Statistics (ST200)

Speech data of a number of speakers (for example about 300 speakers) recorded in a quiet environment is stored in advance in a speech database 310 (FIG. 3).

A selection model (represented by a Gaussian mixture model (GMM) in this case) and a sufficient statistic (represented by a hidden Markov model (HMM) in this case) are prepared for each speaker using the speech data stored in the database 310, and stored in a sufficient statistic file 320 (FIG. 3). The "sufficient statistic" refers to a statistic sufficient to represent the nature of a database, which includes the mean, variance and EM count of a HMM acoustic model in this case. The sufficient statistic is calculated by one-time training from a speaker-independent model using the EM algorithm. The selection model is prepared in the form of a Gaussian mixture model with 64 mixture components per state without distinction of the phoneme.

The preparation of sufficient statistics will be described in detail with reference to FIG. 4.

In step ST201, a speaker-independent sufficient statistic is prepared. In this case, the preparation is made by conducting training with data of all speakers is made using the EM algorithm. The sufficient statistic is represented by a hidden Markov model, with each state being represented by a mixed Gaussian distribution. Numbers are given to the Gaussian distributions of the prepared speaker-independent sufficient statistic.

In step ST202, sufficient statistics for the respective speakers are prepared using the prepared speaker-independent sufficient statistic as the initial value. In this case, the preparation is made by conducting training with data of the respective speakers using the EM algorithm. Numbers corresponding to the numbers given to the speaker-independent sufficient statistic are stored in association with the Gaussian distributions of the sufficient statistics of the respective speakers.

Input of Voice Data for Adaptation (ST210)

The voice of a user is input.

Selection of Sufficient Statistics Using Selection Models (ST220)

A plurality of sufficient statistics "similar" to the voice of the user (acoustic models of speakers acoustically similar to the user's voice) are selected based on the input voice and the selection models. The sufficient statistics "similar" to the user's voice are determined by inputting the input voice into the selection models to obtain the probability likelihood of the selection models and obtaining the sufficient statistics of the speakers corresponding to top N selection models largest in likelihood. This selection is performed by an adapted model preparation section 330 shown in FIG. 3 in the manner shown in FIG. 5.

Preparation of Adapted Model (ST230)

An adapted model is prepared using the selected sufficient statistics. To state specifically, statistics calculation (equations 1 to 3) is newly performed among the Gaussian distributions of the same number for the selected sufficient statistics, to obtain one Gaussian distribution. This preparation of an adapted model is performed by the adapted model preparation section 330 shown in FIG. 3 in the manner shown in FIG. 5.

$$\mu_i^{adp} = \frac{\sum_{j=1}^{N_{sel}} C_{mix}^j \mu_i^j}{\sum_{j=1}^{N_{sel}} C_{mix}^j} - (i=1, 2, \ldots, N_{mix})$$ Equation 1

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i=1, 2, \ldots, N_{mix})$$ Equation 2

$$a^{adp}[i][j] = \frac{\sum_{k=1}^{N_{sel}} C_{state}^k[i][j]}{\sum_{j=1}^{N_{state}} \sum_{k=1}^{N_{sel}} C_{state}^k[i][j]} (i, j=1, 2, \ldots, N_{state})$$ Equation 3

In the above equations, the mean and variance of the normal distribution in each state of the HMM of the adapted model are expressed by $\mu_i^{adp}$ (i=1, 2, . . . , $N_{mix}$) and $v_i^{adp}$ (i=1, 2, . . . , $N_{mix}$) where $N_{mix}$ is the number of mixed distributions. The state transition probability is expressed by $a^{adp}[i][j]$ (i, j=1, 2, . . . , $N_{state}$) where $N^{state}$ is the number of states, and $a^{adp}[i][j]$ represents the transition probability from state i to state j. $N_{sel}$ denotes the number of acoustic models selected, and $\mu_i^j$ (i=1, 2, . . . , $N_{mix}$ and j=1, 2, . . . , $N_{sel}$) and $v_i^j$ (i=1, 2, . . . , $N_{mix}$ and j=1, 2, . . . , $N_{sel}$) are the mean and variance, respectively, of the respective acoustic models. $C_{mix}^j$ (j=1, 2, . . . , $N_{sel}$) and $C_{state}^k[i][j]$ (k=1, 2, . . . , $N_{sel}$ and i, j=1, 2, . . . , $N_{state}$) are the EM count (frequency) in the normal distribution and the EM count related to the state transition, respectively.

Recognition (ST240)

A speech recognition system 300 (FIG. 3) recognizes the user's voice using the adapted model prepared as described above.

The "method using sufficient statistics" described above makes the approximation that the positional relationship among the Gaussian distributions of the speaker-independent sufficient statistic (initial value) are equal to the positional relationship among the Gaussian distributions of the sufficient statistics for the respective speakers is made. In other words, it is presumed that in the calculation of sufficient statistics of speech data from the initial-value sufficient statistic, only the mixture weight, the mean value and the variance may be trained while the positional relationship among the Gaussian distributions is maintained. To state more specifically, it is presumed that the Gaussian distribution among those of the initial-value sufficient statistic located closest to a certain Gaussian distribution of the sufficient statistic of certain speech data in the distribution distance such as a KL distance has the same number as the certain Gaussian distribution of the sufficient statistic of the certain speech data. This presumption holds in a quiet environment (see FIG. 4). This approach is therefore effective as an adapted model preparation method "in a quiet environment". Practically, however, preparation of an adapted model "in a noisy environment" must also be considered. In such an environment, the above presumption does not hold as shown in FIG. 6, and thus the precision of the adapted model decreases.

SUMMARY OF THE INVENTION

An object of the present invention is providing an acoustic model preparation method, an acoustic model preparation apparatus and an acoustic model preparation program in which the precision of an adapted model is prevented from decreasing in a noisy environment.

The method of the present invention is a method for preparing an acoustic model used for speech recognition, including the following steps (a) to (e). In the step (a), noise-superimposed speech data is grouped according to acoustic similarity. In the step (b), sufficient statistics are prepared for each of groups obtained in the step (a) using the speech data in the group. In the step (c), a group acoustically similar to voice data of a user of the speech recognition is selected from the groups obtained in the step (a). In the step (d), sufficient statistics acoustically similar to the voice data of the user are selected from the sufficient statistics in the group selected in the step (c). In the step (e), an acoustic model is prepared using the sufficient statistics selected in the step (d).

Preferably, the steps (a) and (b) are performed off-line before the user uses the speech recognition.

Preferably, in the step (a), the grouping is made according to the type of the noise.

Preferably, in the step (a), the grouping is made according to the SN ratio of the noise-superimposed speech data.

Preferably, in the step (a), the grouping is made according to acoustic similarity of speaker.

Preferably, in the step (b), the sufficient statistics are prepared for each speaker.

Preferably, in the step (b), the sufficient statistics are prepared for each voice tone of each speaker.

Preferably, in the step (b), the sufficient statistics are prepared for each type of the noise.

Preferably, in the step (b), the sufficient statistics are prepared for each SN ratio of speech data in each group.

The apparatus of the present invention is an apparatus for preparing an acoustic model used for speech recognition, including a storage section, a first selection section, a second selection section and a model preparation section. The storage section stores sufficient statistics prepared using speech data in each of a plurality of groups. The plurality of groups is obtained by grouping noise-superimposed speech data according to acoustic similarity. The first selection section selects a group acoustically similar to voice data of a user of the speech recognition from the plurality of groups. The second selection section selects sufficient statistics acoustically similar to the voice data of the user from the sufficient statistics in the group selected by the first selection section. The model preparation section prepares an acoustic model using the sufficient statistics selected by the second selection section.

Preferably, the apparatus described above further includes a grouping section and a sufficient statistic preparation section. The grouping section groups noise-superimposed speech data according to acoustic similarity. The sufficient statistic preparation section prepares sufficient statistics for each of groups obtained by the grouping section using speech data in the group. The storage section stores the sufficient statistics prepared by the sufficient statistic preparation section.

The program of the present invention is a computer program for preparing an acoustic model used for speech recognition, which tailors a computer to function as the following means (a) to (d). The means (a) stores sufficient statistics prepared using speech data in each of a plurality of groups. The plurality of groups is obtained by grouping noise-superimposed speech data according to acoustic similarity. The means (b) selects a group acoustically similar to voice data of a user of the speech recognition from the plurality of groups. The means (c) selects sufficient statistics acoustically similar to the voice data of the user from the sufficient statistics in the group selected by the means (b). The means (d) prepares an acoustic model using the sufficient statistics selected by the means (c).

Preferably, the computer is tailored to further function as the following means (e) and (f). The means (e) groups noise-superimposed speech data according to acoustic similarity. The means (f) prepares sufficient statistics for each of groups obtained by the means (e) using speech data in the group. The means (a) stores the sufficient statistics prepared by the means (f).

According to the method, apparatus and program described above, "acoustically similar" speech data is grouped together in the variations of the type of noise, the SN ratio, the speaker and the like, and sufficient statistics are prepared within each group, for preparation of an adapted model (acoustic model). By this grouping, the presumption discussed in the prior art can be realized. That is, the precision of the adapted model is prevented from decreasing in a noisy environment, and thus a high-precision adapted model can be prepared.

Alternatively, the method of the present invention is a method for preparing an acoustic model used for speech recognition, including the following steps (a) to (d). In the step (a), speech data acoustically similar to voice data of a user of the speech recognition is selected from a plurality of speech data of a plurality of speakers. In the step (b), noise in an environment in which the speech recognition is used is superimposed on the speech data selected in the step (a). In the step (c), sufficient statistics are prepared using noise-superimposed speech data obtained in the step (b). In the step (d), an acoustic model is prepared using the sufficient statistics prepared in the step (c).

Preferably, the above method further includes steps (e) and (f). In the step (e), noise in an environment in which speech recognition is predicted to be used is superimposed on the plurality of speech data of the plurality of speakers. In the step (f), label information on noise-superimposed speech data obtained in the step (e) is prepared. In the step (c), the sufficient statistics are prepared using noise-superimposed speech data obtained in the step (b) and label information on the speech data selected in the step (a) among the label information prepared in the step (f).

Preferably, in the step (f), information on the state transition of acoustic models for noise-superimposed speech data obtained in the step (e) is further prepared. In the step (c), the sufficient statistics are prepared using additionally information on the state transition of acoustic models for the speech data selected in the step (a) among the information on the state transition of acoustic models prepared in the step (f).

Preferably, in the step (e), each of a plurality of types of noise is superimposed on the plurality of speech data of the plurality of speakers. In the step (f), label information is prepared for each of the plurality of types of noise. In the step (c), label information appropriate to the environment in which the speech recognition is used is selected from a plurality of types of label information on the speech data selected in the step (a), and the sufficient statistics are prepared using the selected label information.

Alternatively, the apparatus of the present invention is an apparatus for preparing an acoustic model used for speech recognition, including a storage section, a selection section, a noise superimposing section, a sufficient statistic preparation section and a model preparation section. The storage section stores a plurality of speech data of a plurality of speakers. The selection section selects speech data acoustically similar to voice data of a user of the speech recognition from the speech data stored in the storage section. The noise superimposing section superimposes noise in an environment in which the speech recognition is used on the speech data selected by the selection section. The sufficient statistic preparation section prepares sufficient statistics using noise-superimposed speech data obtained by the noise superimposing section. The model preparation section prepares an acoustic model using the sufficient statistics prepared by the sufficient statistic preparation section.

Alternatively, the program of the present invention is a computer program for preparing an acoustic model used for speech recognition, which tailors a computer to function as the following means (a) to (e). The means (a) stores a plurality of speech data of a plurality of speakers. The means (b) selects speech data acoustically similar to voice data of a user of the speech recognition from the speech data stored in the means (a). The means (c) superimposes noise in an environment in which the speech recognition is used on the speech data selected by the means (b). The means (d) prepares sufficient statistics using noise-superimposed speech data obtained by the means (c). The means (e) prepares an acoustic model using the sufficient statistics prepared by the means (d).

According to the method, apparatus and program described above, since processing is performed using acoustically similar speech data, a high-precision adapted model can be prepared. In addition, since sufficient statistics are calculated after selection of acoustically similar speech data, the processing for preparation of the sufficient statistics can be facilitated.

The adapted model preparation apparatus of the present invention is an apparatus for preparing an acoustic model used for speech recognition. The adapted model preparation apparatus includes a storage section, a memory section and a model preparation section. The storage section stores a plurality of groups grouped according to acoustic similarity. Each of the plurality of groups includes a plurality of sufficient statistics. The memory section memorizes a group ID. The group ID indicates at least one group of the plurality of the groups. The model preparation section selects one group acoustically similar to voice data of a user of the speech recognition from the group or groups corresponding to the group ID memorized in the memory section. The model preparation section prepares an acoustic model using at least two sufficient statistics acoustically similar to voice data of the user among the sufficient statistics included in the selected group.

Preferably, the model preparation section selects at least one group acoustically similar to voice data of a user of the speech recognition among the plurality of the groups. The model preparation section stores a group ID indicating the selected group in the memory section.

Preferably, the memory section associates the group ID with the type of noise in an environment in which the speech recognition is used.

Preferably, the memory section associates the group ID with a user ID indicating a user of the speech recognition.

Preferably, the memory section associates the group ID with an equipment ID indicating the adapted model preparation apparatus.

Alternatively, the adapted model preparation apparatus of the present invention is an apparatus for preparing an acoustic model used for speech recognition. The adapted model preparation apparatus includes a storage section and a model preparation section. The storage section stores a plurality of groups grouped according to acoustic similarity. Each of the plurality of groups includes a plurality of sufficient statistics. The model preparation section receives a group ID. The group ID indicates at least one group of the plurality of the groups. The model preparation section selects one group acoustically similar to voice data of a user of the speech recognition from the group or groups corresponding to the received group ID. The model preparation section prepares an acoustic model using at least two sufficient statistics acoustically similar to voice data of the user among the sufficient statistics included in the selected group.

Preferably, the model preparation section receives the group ID from an external memory device. The model preparation section selects at least one group acoustically similar to voice data of a user of the speech recognition among the plurality of the groups. The model preparation section stores a group ID indicating the selected group in the external memory device.

Preferably, the external memory device associates the group ID with the type of noise in an environment in which the speech recognition is used.

Preferably, the external memory device associates the group ID with a user ID indicating a user of the speech recognition.

Preferably, the external memory device associates the group ID with an equipment ID indicating the adapted model preparation apparatus.

Alternatively, the adapted model preparation apparatus of the present invention is an apparatus for preparing an acoustic model used for speech recognition. The adapted model preparation apparatus includes a selection section and a model preparation section. The selection section receives a group ID. The group ID indicates at least one group of a plurality of the groups. The plurality of groups is grouped according to acoustic similarity. Each of the plurality of groups includes a plurality of sufficient statistics. The selection section selects one group acoustically similar to voice data of a user of the speech recognition from the group or groups corresponding to the received group ID. The model preparation section receives at least two sufficient statistics acoustically similar to voice data of the user among the sufficient statistics included in the group selected by the selection section. The model preparation section prepares an acoustic model using the received sufficient statistics.

Preferably, the selection section receives the group ID from an external memory device. The selection section selects at least one group acoustically similar to voice data of a user of the speech recognition among the plurality of the groups. The selection section stores a group ID indicating the selected group in the external memory device.

Preferably, the external memory device associates the group ID with the type of noise in an environment in which the speech recognition is used.

Preferably, the external memory device associates the group ID with a user ID indicating a user of the speech recognition.

Preferably, the external memory device associates the group ID with an equipment ID indicating the adapted model preparation apparatus.

The adapted model preparation method of the present invention is a method for preparing an acoustic model used for speech recognition. The adapted model preparation method includes the following steps (a) to (d). In the step (a), a plurality of groups grouped according to acoustic similarity is prepared. Each of the plurality of groups includes a plurality of sufficient statistics. In the step (b), a group ID indicating at least one group of the plurality of the groups is prepared. In the step (c), one group acoustically similar to voice data of a user of the speech recognition is selected from the group or groups corresponding to the group ID. In the step (d), an acoustic model is prepared using at least two sufficient statistics acoustically similar to voice data of the user among the sufficient statistics included in the group selected in the step (c).

Preferably, in the step (b), at least one group acoustically similar to voice data of a user of the speech recognition is selected among the plurality of the groups, and a group ID indicating the selected group is prepared.

Preferably, in the step (b), the group ID is associated with the type of noise in an environment in which the speech recognition is used.

Preferably, in the step (b), the group ID is associated with a user ID indicating a user of the speech recognition.

BRIEF DESCRIPTION OF THE DRAWINGS

FIG. 4 is a view demonstrating preparation of sufficient statistics.

FIG. 15 shows the recognition experimental results.

FIG. 16 shows examples of sufficient statistics stored in the sufficient statistic storage section shown in FIG. 7.

DESCRIPTION OF THE PREFERRED EMBODIMENTS

Figure 1:
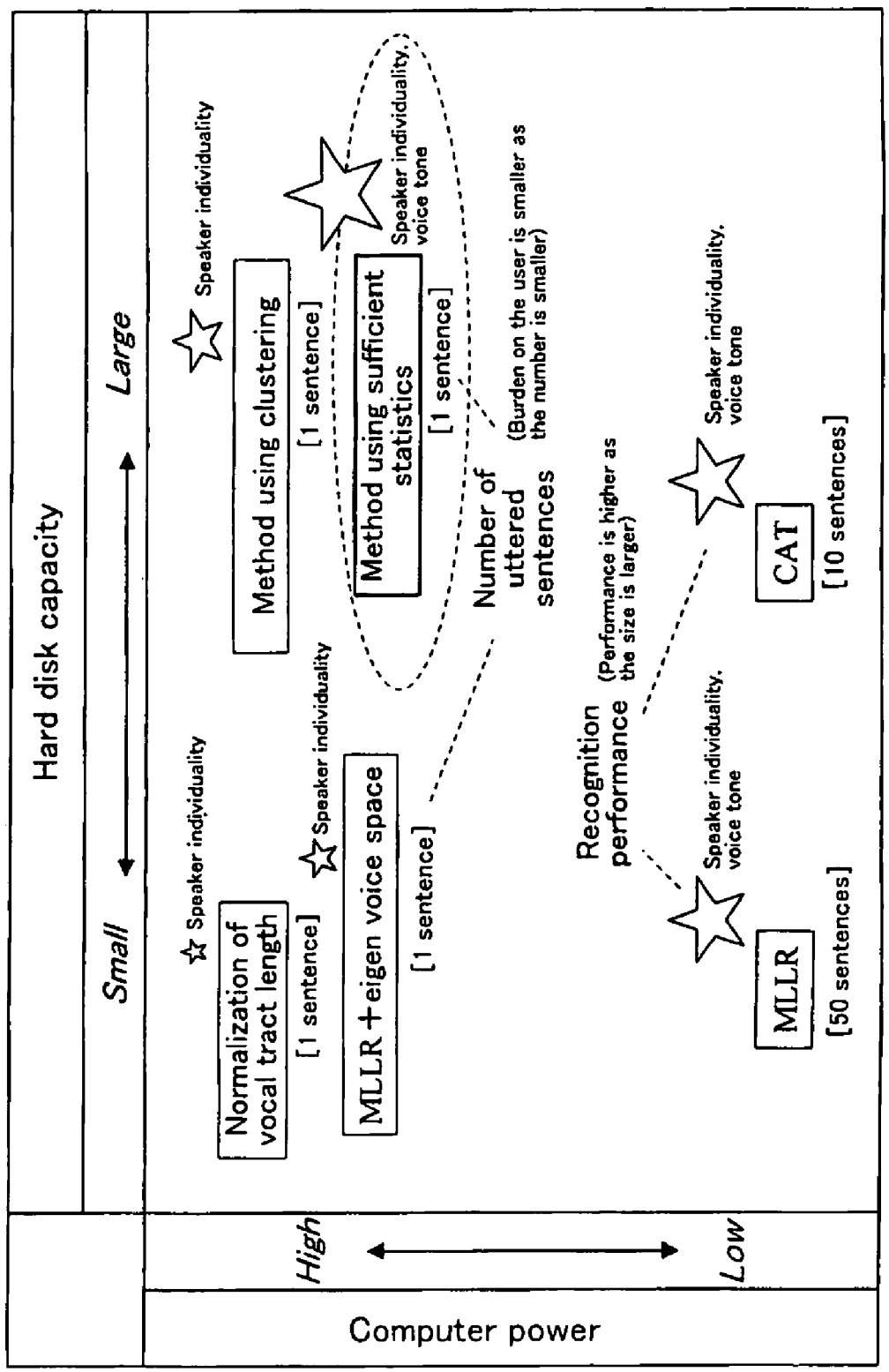
FIG. 1 shows various speaker adaptation techniques.
Figure 2:
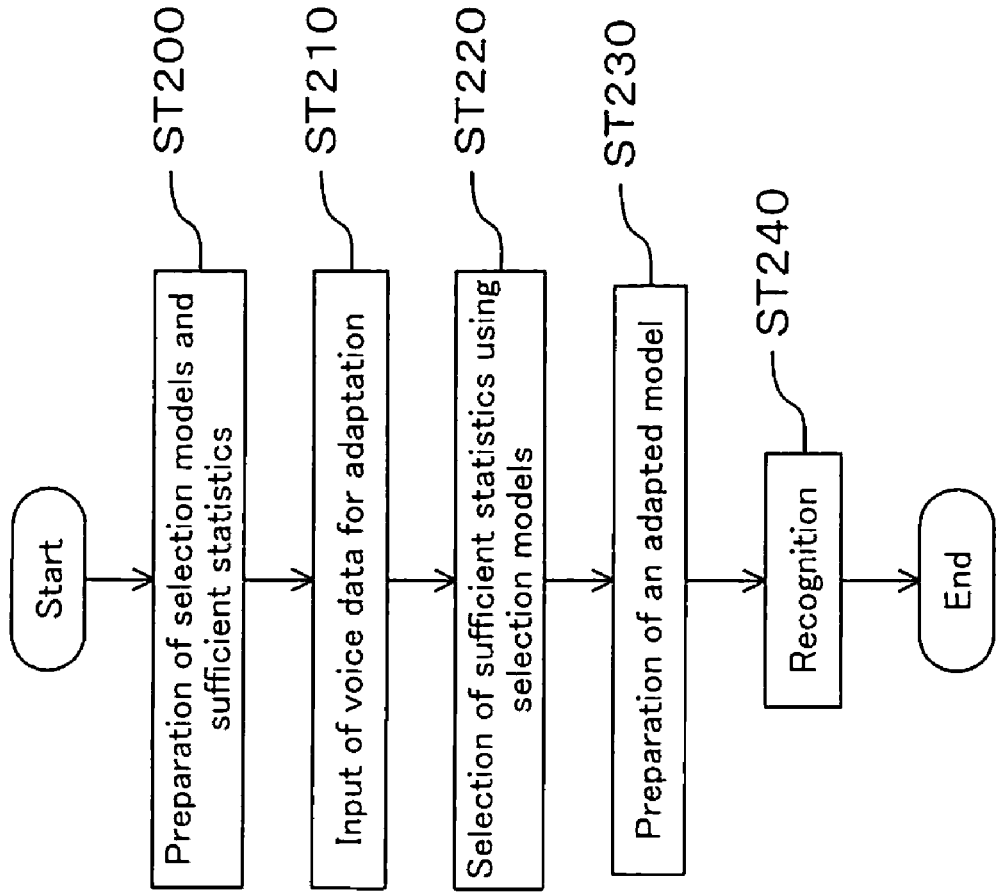
FIG. 2 is a flowchart of a procedure for preparing an adapted model by the "method using sufficient statistics".

Hereinafter, preferred embodiments of the present invention will be described with reference to the accompanying drawings. In the drawings, the same or like components are denoted by the same reference numerals, and the description thereof is omitted.

Embodiment 1

<Configuration of Adapted Model Preparation Apparatus>

Figure 7:
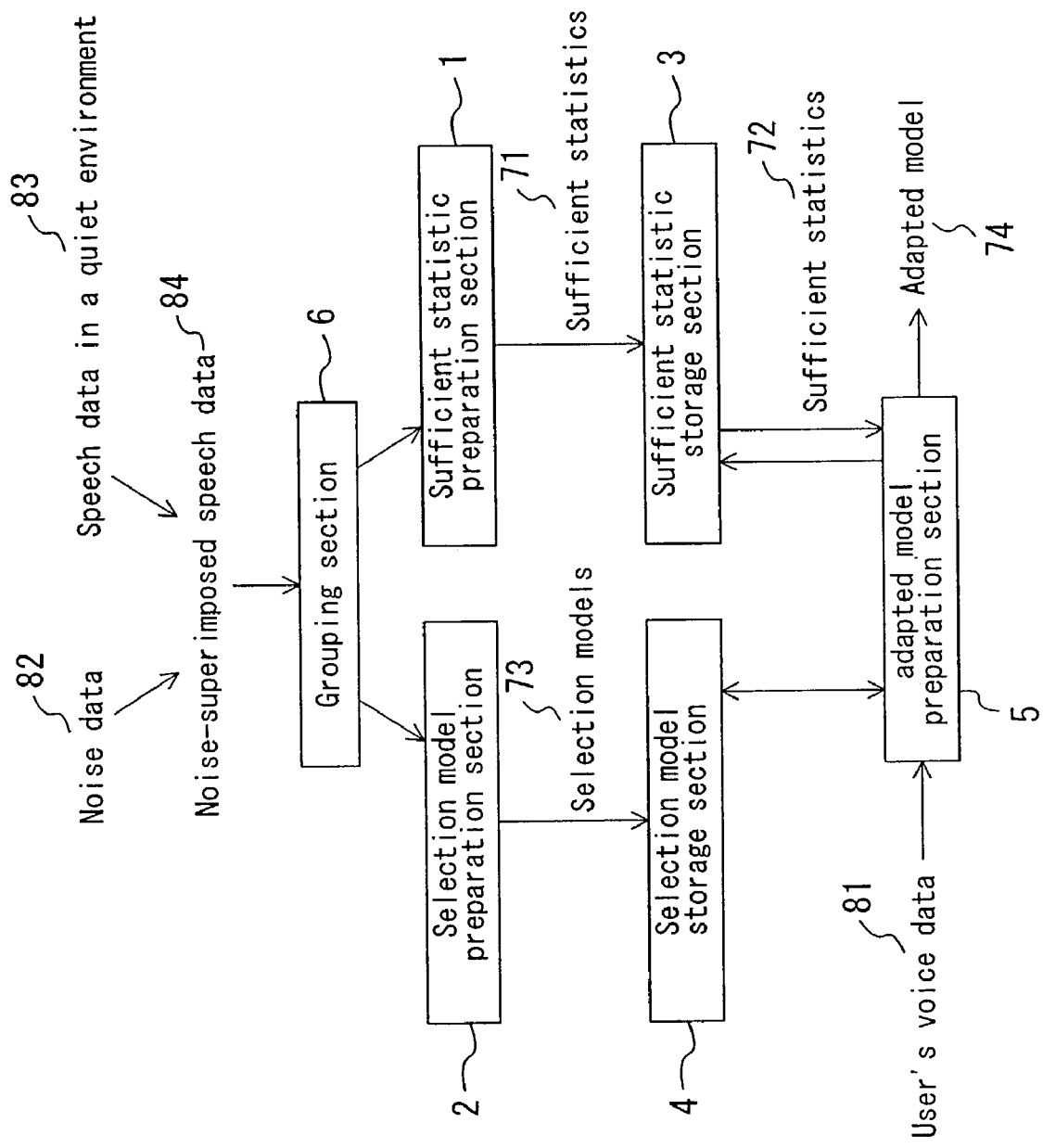
FIG. 7 is a block diagram of an adapted model preparation apparatus of Embodiment 1 of the present invention.

FIG. 7 is a block diagram showing the entire configuration of an adapted model preparation apparatus for speech recognition of Embodiment 1. The apparatus shown in FIG. 7 includes a sufficient statistic preparation section 1, a selection model preparation section 2, a sufficient statistic storage section 3, a selection model storage section 4, an adapted model preparation section 5 and a grouping section 6.

The grouping section 6 groups noise-superimposed speech data 84, obtained by superimposing noise data 82 on speech data 83 in a quiet environment, according to "acoustic similarity".

The sufficient statistic preparation section 1 prepares sufficient statistics 71 using the noise-superimposed speech data 84 for the respective groups formed by the grouping section 6. The sufficient statistic storage section 3 stores the sufficient statistics 71 prepared by the sufficient statistic preparation section 1.

The selection model preparation section 2 prepares selection models 73. The selection models 73 are models used for selection of sufficient statistics 72 similar to user's voice data 81 from the sufficient statistics 71 stored in the sufficient statistic storage section 3. The selection model storage section 4 stores the selection models 73 prepared by the selection model preparation section 2.

The adapted model preparation section 5 selects the sufficient statistics 72 "acoustically similar" to the user's voice data 81 from the sufficient statistics 71 stored in the sufficient statistic storage section 3, and prepares an adapted model 74 using the selected sufficient statistics 72.

<Procedure of Preparation of Adapted Model>

A procedure for preparing an adapted model by the apparatus having the configuration described above will be described. Assume herein that speech recognition is performed indoors.

[Preparation of Sufficient Statistics 71 and Selection Models 73]

The sufficient statistics 71 and the selection models 73 are prepared in the following manner. Assume herein that this preparation is performed off-line before the user requests acquisition of an adapted model.

The speech data 83 of a plurality of speakers are recorded in a quiet environment. Assume herein that speech data of about 300 speakers are recorded.

The noise data 82 in an environment in which the user may use the speech recognition (use environment) is recorded. Assume herein that office noise is recorded.

The noise data 82 is superimposed on the speech data 83 at an SN ratio in the use environment, to prepare the noise-superimposed speech data 84. Assume herein that the noise data 82 is superimposed at SN ratios of 15 dB, 20 dB and 25 dB.

Figure 8:
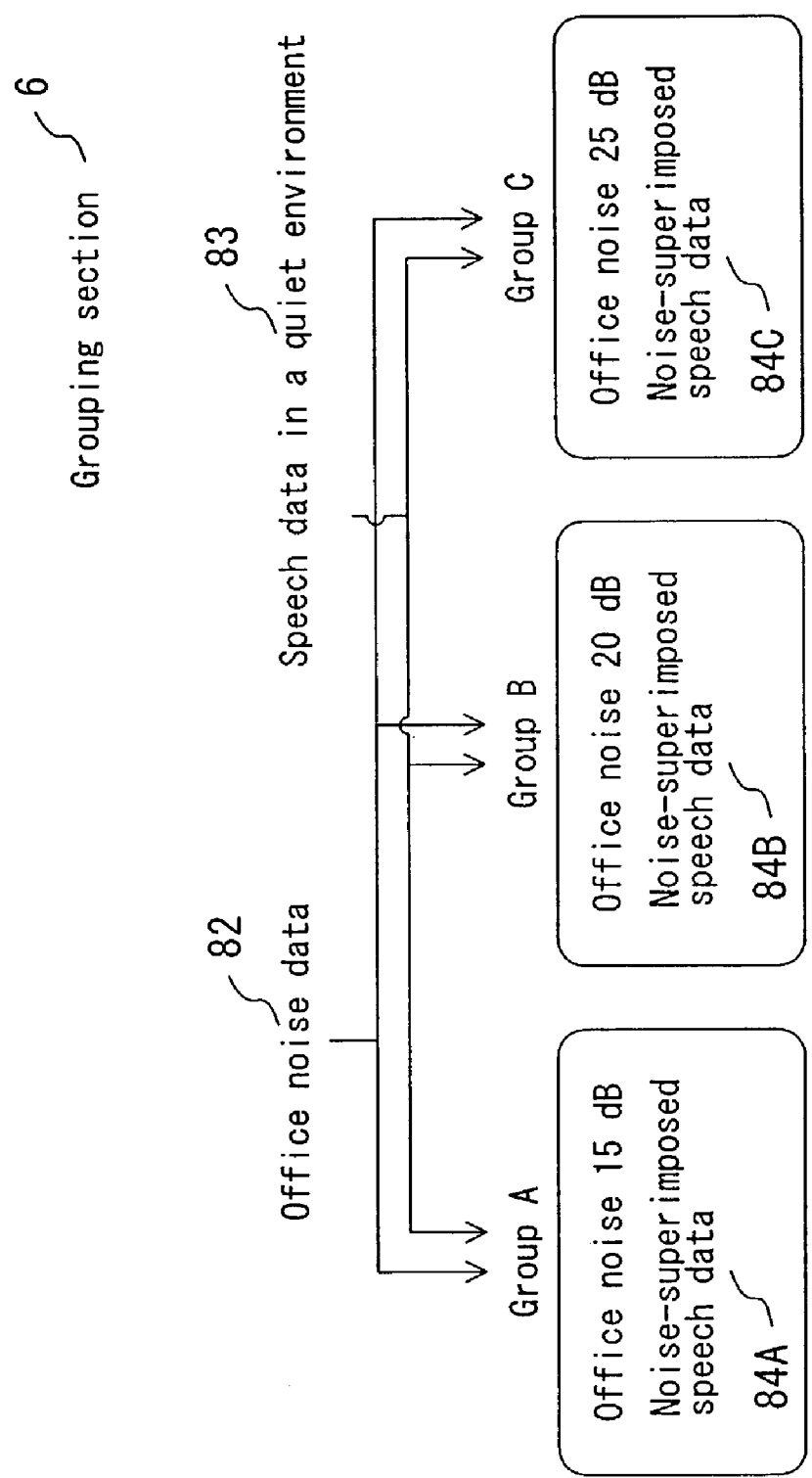
FIG. 8 shows a flow of grouping by a grouping section shown in FIG. 7.

The grouping section 6 groups the noise-superimposed speech data 84 according to "acoustic similarity". Herein, as shown in FIG. 8, the noise-superimposed speech data 84 is grouped into three groups according to the SN ratio: 15 dB group A, 20 dB group B and 25 dB group C.

Figure 9:
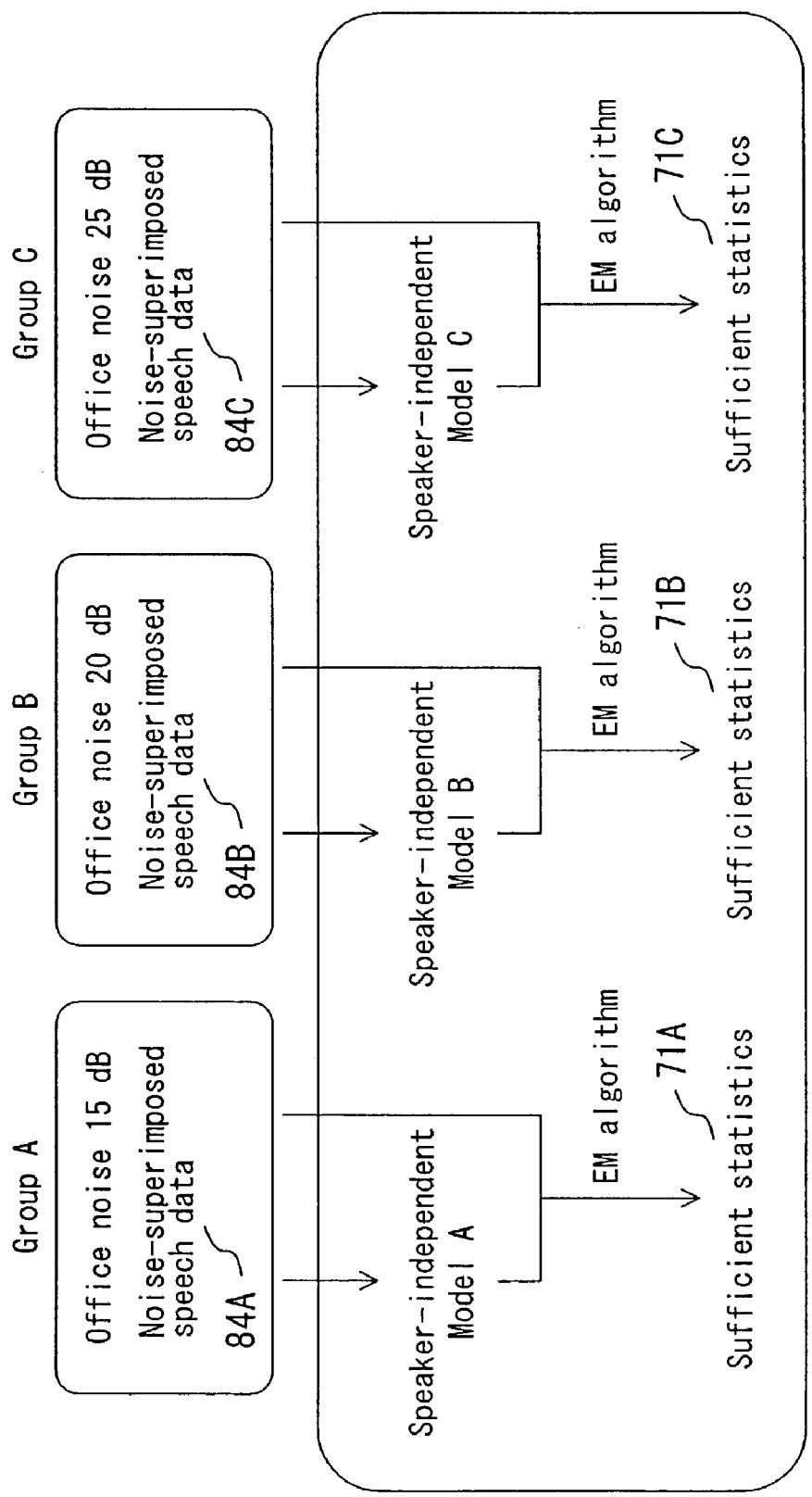
FIG. 9 shows a flow of preparation of sufficient statistics stored in a sufficient statistic storage section shown in FIG. 7.

The sufficient statistics 71 are prepared in the following manner. As shown in FIG. 9, the sufficient statistic preparation section 1 prepares speaker-independent models A to C for the respective groups formed by the grouping section 6 using noise-superimposed speech data 84A to 84C, respectively. The sufficient statistic preparation section 1 then calculates sufficient statistics 71A to 71C for the respective groups by conducting one-time training with the speaker-independent models A to C for the respective speakers using the speakers' noise-superimposed speech data 84 according to the EM algorithm. Herein, about 300 sufficient statistics are prepared for each group.

Figure 10:
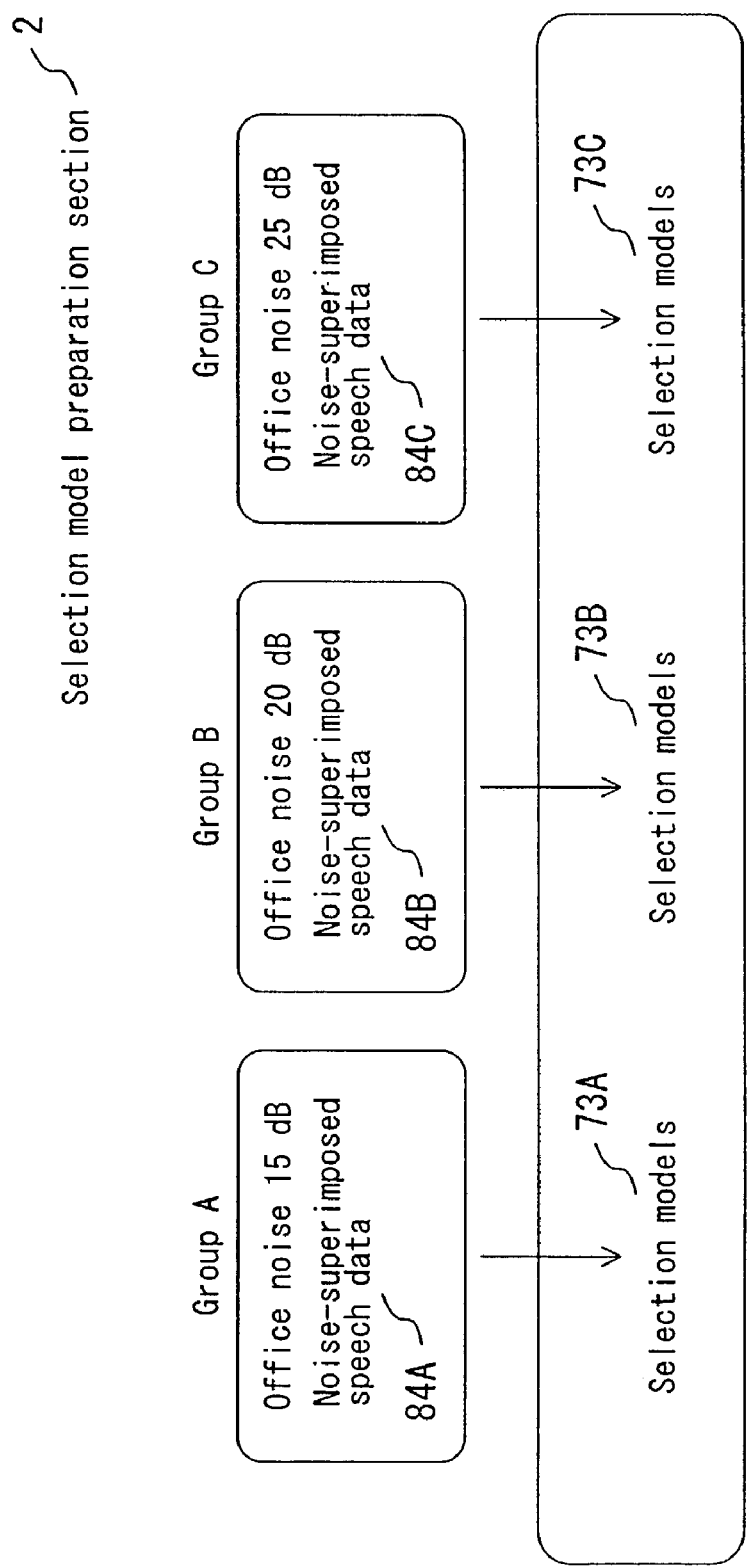
FIG. 10 shows a flow of preparation of selection models stored in a selection model storage section shown in FIG. 7.

The selection models 73 are prepared in the following manner. As shown in FIG. 10 as an example, the selection model preparation section 2 prepares selection models 73A to 73C for the respective groups formed by the grouping section 6 for the respective speakers using the noise-superimposed speech data 84A to 84C in the form of Gaussian mixture models (GMMs) with 64 mixture components per state without distinction of the phoneme. Herein, about 300 sufficient statistic selection models are prepared for each group.

The noise-superimposed speech data 84A to 84C used for preparation of the sufficient statistics 71A to 71C (FIG. 9) are respectively paired with the selection models 73A to 73C (FIG. 10) prepared based on the speech data 84A to 84C. Therefore, selection of sufficient statistics similar to the user's voice data can be made using the corresponding selection models.

Figure 11:
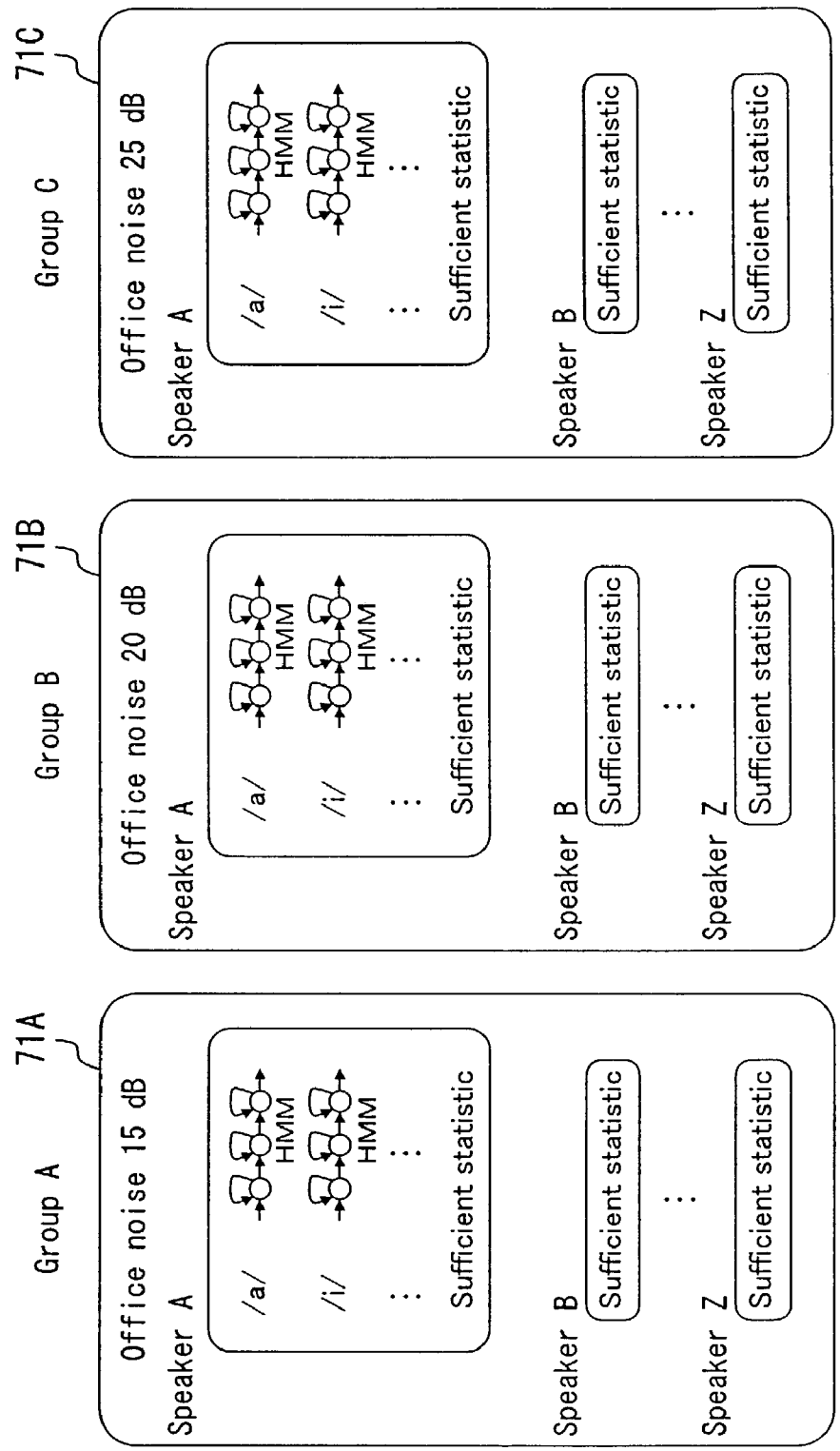
FIG. 11 shows examples of sufficient statistics stored in the sufficient statistic storage section shown in FIG. 7.
Figure 12:
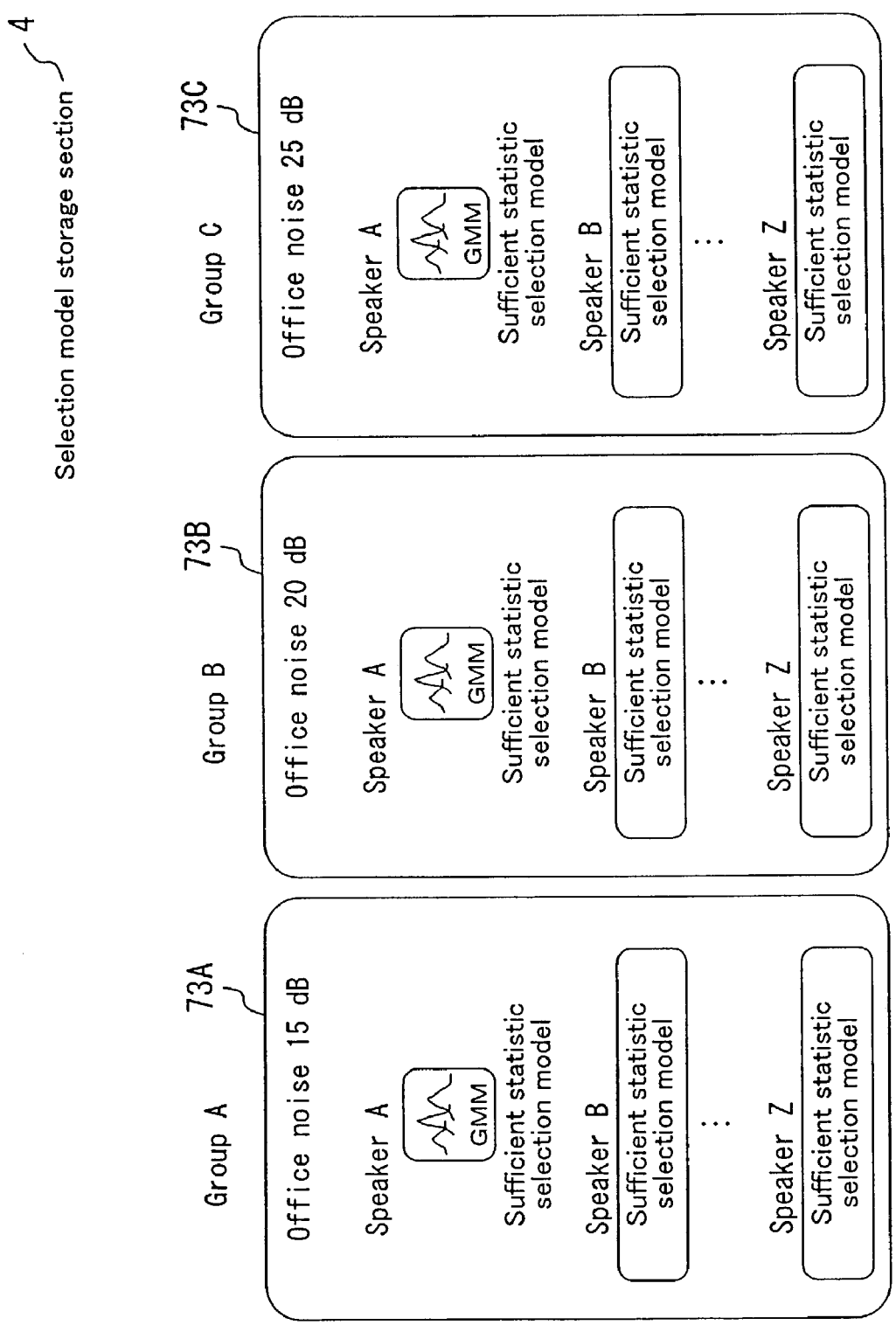
FIG. 12 shows examples of selection models stored in the selection model storage section shown in FIG. 7.

The sufficient statistic storage section 3 stores the sufficient statistics 71A to 71C prepared by the sufficient statistic preparation section 1. The selection model storage section 4 stores the selection models 73A to 73C prepared by the selection model preparation section 2. FIGS. 11 and 16 show examples of the sufficient statistics 71 stored in the sufficient statistic storage section 3. FIG. 12 shows examples of the selection models 73 stored in the selection model storage section 4. The sufficient statistics and the selection models for the respective speakers (speakers A to Z) in the respective groups (A to C) are paired.

[Preparation of Adapted Model 74]

The adapted model 74 is then prepared by the adapted model preparation section 5 in the following manner. Note that this preparation will be described using the examples of the sufficient statistics 71 and the selection models 73 shown in FIGS. 11 and 12.

The user requests preparation of the adapted model 74. The user's voice data 81 is input into the adapted model preparation section 5 in an environment in which the speech recognition is used (use environment). The user's voice data 81 is noise-superimposed voice data including noise in the use environment. Assume herein that the user uses the speech recognition in an indoor environment having an SN ratio of 20 dB.

The adapted model preparation section 5 sends the user's voice data 81 to the selection model storage section 4 so that the user's voice data 81 is input into the selection models 73. Specifically, the user's voice data 81 is input into the sufficient statistic selection models for the speakers A to Z in the groups A to C shown in FIG. 12.

A group "acoustically similar" to the user's voice data 81 is determined among the groups formed by the grouping section 6 in the following manner.

Figure 13:
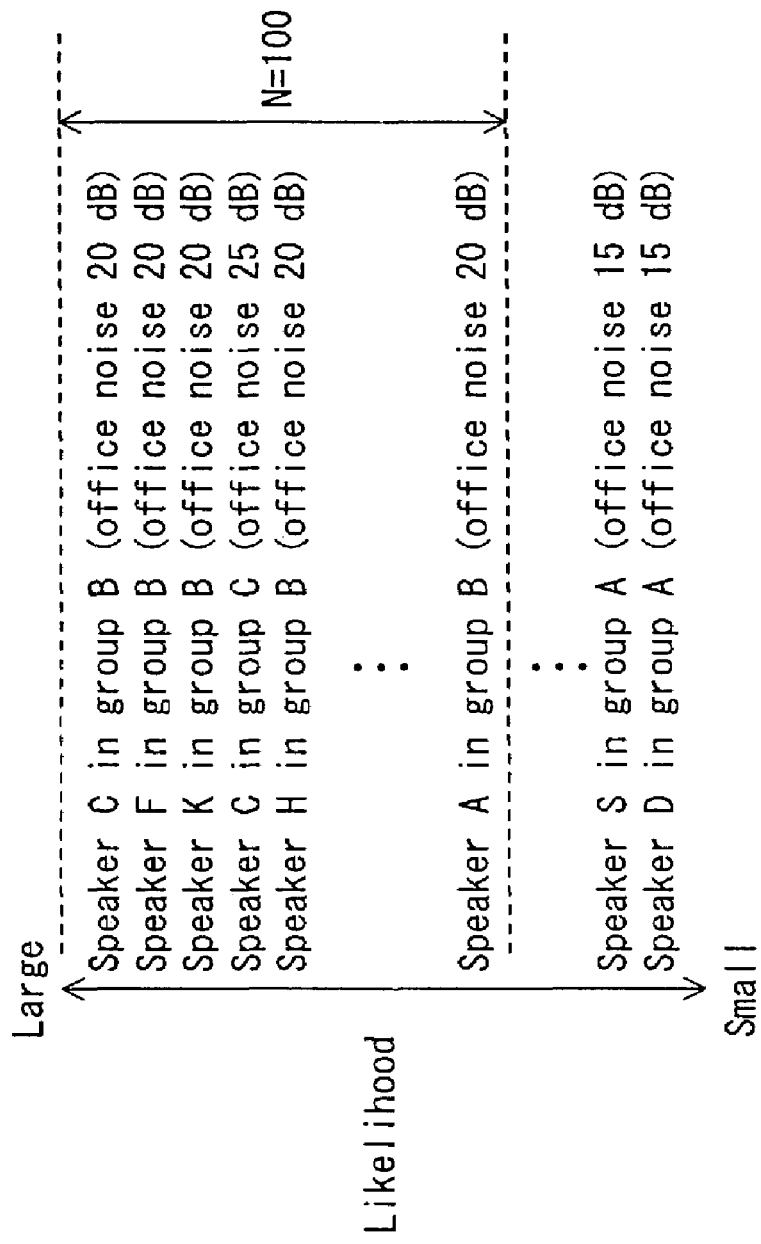
FIG. 13 shows a flow of determination of a group acoustically similar to the user's voice by an adapted model preparation section shown in FIG. 7.

The likelihood of each selection model 73 to the user's voice data 81 is calculated by the input of the user's voice data 81 into the selection model 73. With the calculated likelihood, the selection models 73 are listed in order of decreasing likelihood. Specifically, the likelihoods to the user's voice data 81 of the selection models for the speakers A to Z in the groups A to C shown in FIG. 12 are calculated, and the selection models are listed in order of decreasing likelihood. FIG. 13 shows an example of a list of the selection models 73 in order of decreasing likelihood.

Top N selection models (100 models in the example in FIG. 13) largest in likelihood are selected, and a group (SN ratio of indoor noise) including the largest number of selected selection models is determined. In the example in FIG. 13, group B (indoor noise 20 dB) is determined. That is, group B is determined as the group "acoustically similar" to the user's voice data 81.

Figure 14:
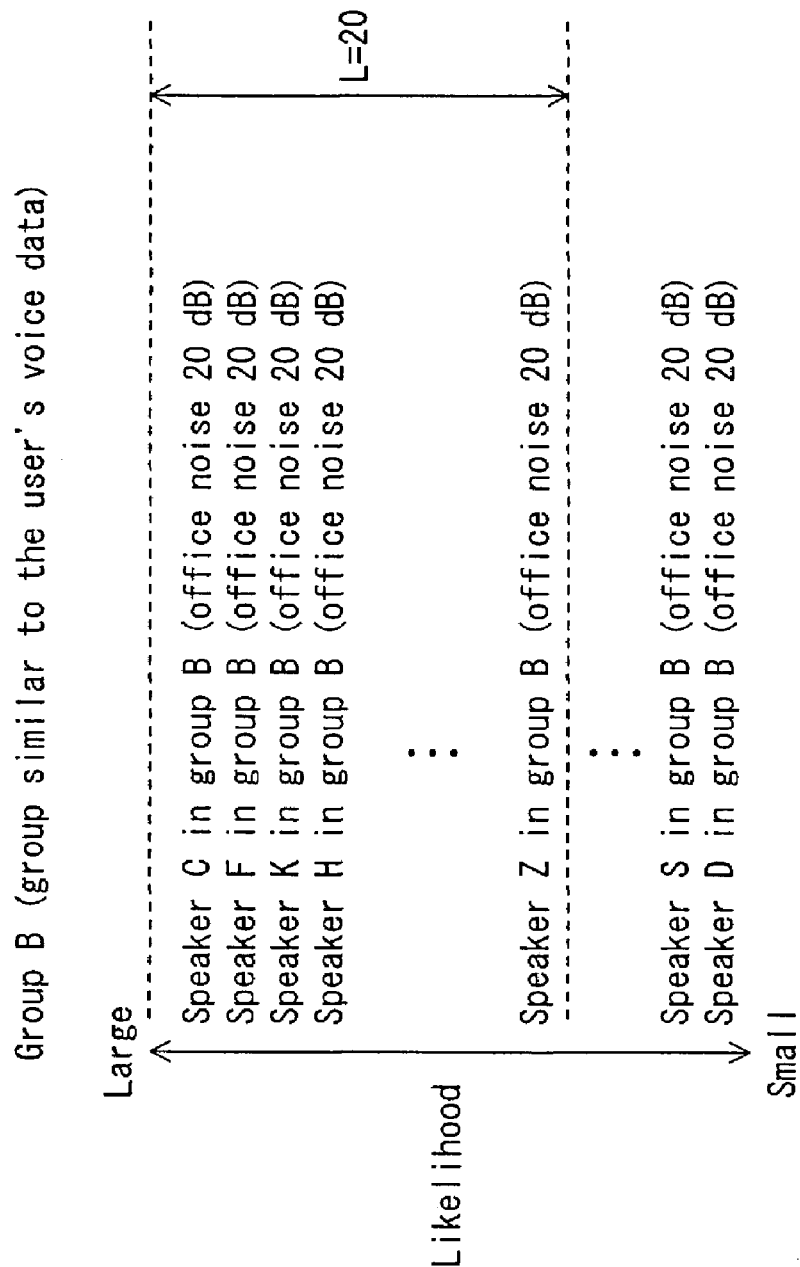
FIG. 14 shows a flow of determination of sufficient statistics similar to the user's voice data in the adapted model preparation section shown in FIG. 7.

The adapted model 74 is prepared using the sufficient statistics in the group "acoustically similar" to the user's voice data 81 (group B) in the following manner. Top L selection models 73 (20 models in the example in FIG. 14) largest in likelihood are selected from the selection models 73 in the group "acoustically similar" to the user's voice data 81 (group B). The adapted model 74 is prepared using the sufficient statistics 72 paired with the selected selection models. More specifically, the adapted model 74 is prepared by the following statistics calculation (equations 4 to 6). In the following equations, the mean and variance of the normal distribution in each state of the HMM of the adapted model 74 are expressed by $\mu_i^{adp}$ (i=1, 2, . . . , $N_{mix}$) and $v_i^{adp}$ (i=1, 2, . . . , $N_{mix}$) where $N_{mix}$ is the number of mixed distributions. The state transition probability is expressed by $a^{adp}[i][j]$ (i, j=1, 2, . . . , $N_{state}$) where $N^{state}$ is the number of states, and $a^{adp}[i][j]$ represents the transition probability from state i to state j.

$$\mu_i^{adp} = \frac{\sum_{j=1}^{N_{sel}} C_{mix}^j \mu_i^j}{\sum_{j=1}^{N_{sel}} C_{mix}^j} (i = 1, 2, \ldots, N_{mix}) \quad \text{Equation 4}$$

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i = 1, 2, \ldots, N_{mix}) \quad \text{Equation 5}$$

$$a^{adp}[i][j] = \frac{\sum_{k=1}^{N_{sel}} C_{state}^k[i][j]}{\sum_{i=1}^{N_{state}} \sum_{k=1}^{N_{sel}} C_{state}^k[i][j]} (i, j = 1, 2, \ldots, N_{state}) \quad \text{Equation 6}$$

where $N_{sel}$ is the number of acoustic models selected, and $\mu_i^j$ (i=1, 2, . . . , $N_{mix}$ and j=1, 2, . . . , $N_{sel}$) and $v_i^j$ (i=1, 2, . . . , $N_{mix}$ and j=1, 2, . . . , $N_{sel}$) are the mean and variance, respectively, of the respective HHMs. $C_{mix}^j$ (j=1, 2, . . . , $N_{sel}$) and $C_{state}^k[i][j]$ (k=1, 2, . . . , $N_{sel}$ and i, j=1, 2, . . . , $N_{state}$) are the EM count (frequency) in the normal distribution and the EM count related to the state transition, respectively.

The adapted model preparation section 5 then waits for a request for preparation of a next adapted model from a user.

<Experimental Results>

Recognition experiments were performed using adapted models, and the following results were obtained.

The conditions for the recognition experiments are as follows. The database includes data of 306 speakers, and each speaker has utterance data of about 200 sentences, digitized with a 16 kHz sampling frequency and 16 bit quantization. As the feature vectors, used were 12th order mel-frequency cepstrum coefficient (MFCC), delta cepstrum and delta power, analyzed with a window shift length of 10 ms. Cepstrum mean normalization (CMN) was done in feature vectors extraction. A language model constructed of a 20 k paper article was used. The number of speakers for evaluation was 46. A total of 200 sentences were used for evaluation with each speaker uttering four to five sentences. Office noise was used as the type of noise.

FIG. 15 shows the recognition experimental results. FIG. 15 also shows the recognition results of the conventional method for preparing an adapted model using sufficient statistics.

As is found from the results in FIG. 15, the performance of the adapted models prepared according to the present invention is significantly high compared with that of conventionally prepared adapted models.

<Effects>

As described above, in Embodiment 1, "acoustically similar" speech data is clustered (grouped) together, and selection models and sufficient statistics are prepared within each group, for preparation of an adapted model. By this clustering, the presumption discussed in the prior art can be realized. That is, the precision of the adapted model is prevented from decreasing in a noisy environment, and thus a high-precision adapted model can be prepared. The "acoustically similar" speech data to be grouped together means a group of speech data existing within the range in which the presumption in the "method using sufficient statistics" discussed in the prior art holds. To state more specifically, the "acoustically similar" speech data is a group of speech data in which, in the calculation of sufficient statistics of the speech data from the initial-value sufficient statistic, only the mixture weight, the mean and the variance may be trained while the positional relationship among the Gaussian distributions is maintained (see FIG. 16). In other words, the Gaussian distribution among those of the initial-value sufficient statistic located closest to a certain Gaussian distribution of the sufficient statistic of certain speech data in the distribution distance such as a KL distance has the same number as the certain Gaussian distribution of the sufficient statistic of the certain speech data (see FIG. 16).

Figure 17:
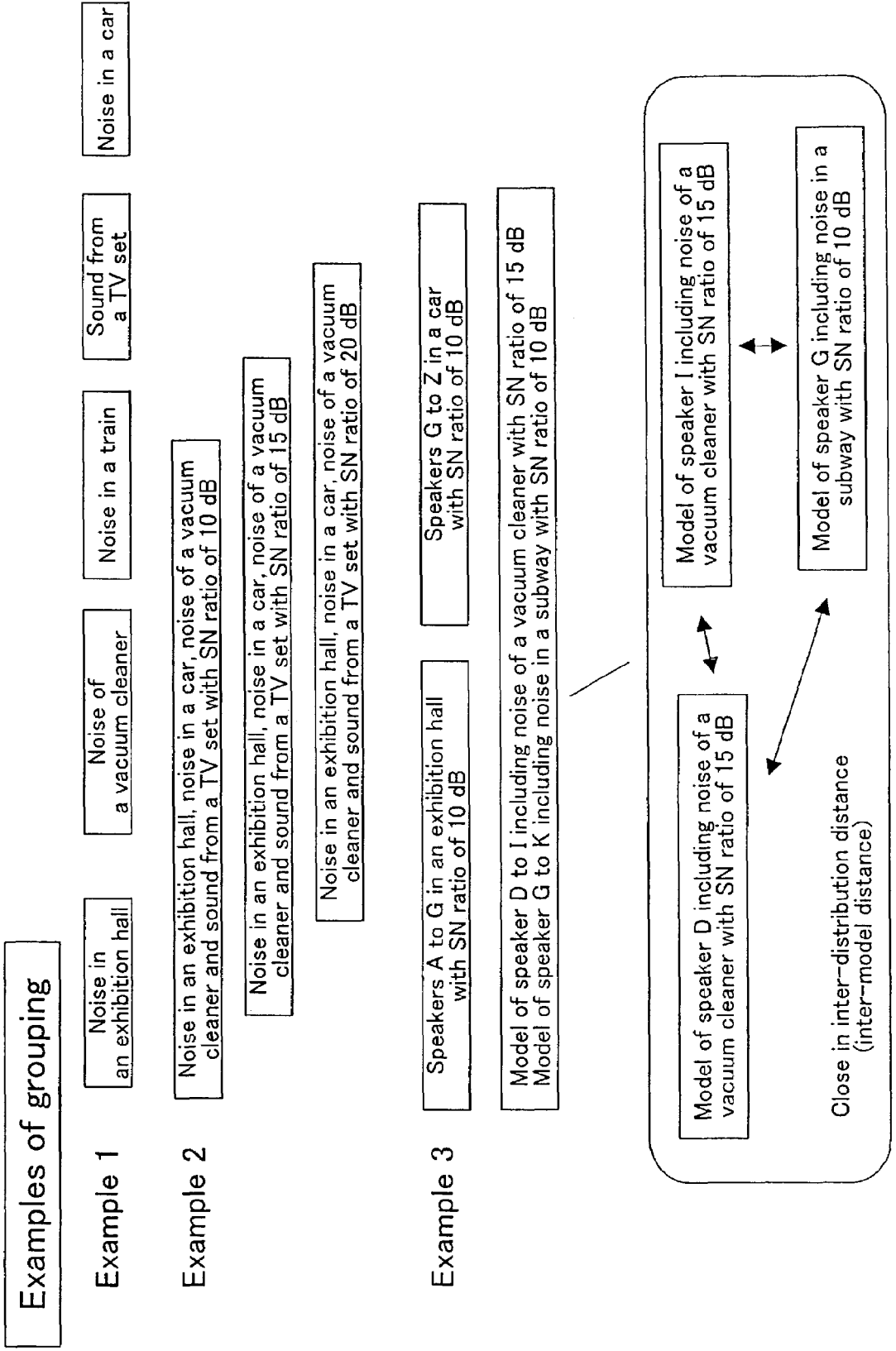
FIG. 17 shows examples of groups formed by the grouping section.

Examples of grouping capable of realizing the above presumption include:

grouping according to the type of noise;

grouping according to the SN ratio; and preparing voice models (represented by mixed Gaussian distributions) using speech data and grouping those close in inter-distribution distance such as the KL distance. Examples of grouping are shown in FIG. 17.

The following effects are also obtained in Embodiment 1.

The speech data 83 recorded off-line is used as speech data for preparation of the adapted model 74 adapted to the noise/speaker. Therefore, the user is relieved of providing a large amount of utterance, and thus less burdened.

The noise-superimposed speech data 84 is used for preparation of the sufficient statistics 71, which are then used for preparation of the adapted model 74. Therefore, an adapted model adapted to the use environment can be prepared. This enables use of the adapted model in a noisy environment.

The sufficient statistics 71 are prepared off-line. Therefore, the adapted model 74 can be prepared instantaneously during adaptation. This enables prompt use of the adapted model at the occasion of change of the use environment.

The sufficient statistics are prepared for each group formed by the grouping section 6. Therefore, the adapted model 74 better adapted to the user's voice data 81 can be prepared. This enables use of adapted models by a larger number of users in various noisy environments.

As the noise-superimposed speech data 84, speech data obtained by recording utterances in a noisy environment may be used, in place of the speech data obtained by superimposing noise data by computation.

The grouping section 6 may form groups according to the type of noise and the similarity of speaker.

The noise-superimposed speech data 84 may be speech data in environments of various types of noise such as office noise, in-car noise, noise in a hall and noise of a vacuum cleaner.

The timing at which the adapted model 74 is prepared may be automatically determined by the adapted model preparation section.

The sufficient statistic selection models 73 are not necessarily in the form of Gaussian mixture models.

Noise in the use environment may be used as the noise data 82.

The adapted model preparation apparatus of Embodiment 1 can be implemented both by hardware and software (a computer program).

<Concrete Product Images and Examples of Grouping>

The speech recognition system employing the speaker adaptation technique in Embodiment 1 may be mounted in products (information equipment) such as cellular phones, personal digital assistants (PDAs), car navigation systems, personal computers, remote controllers of TV sets, speech translation systems, pet robots and interactive agents (graphics). Some of these types of equipment will be described in relation to examples of grouping.

[Grouping Method 1]

Groups are formed according to the type of noise×SN ratio, and sufficient statistics for variations of the speaker× voice tone of speaker are stored for each group.

—Equipment Used by a Plurality of Speakers in Environments of a Plurality of Types of Noise (for Example, Controller of TV Set)—

Figure 18A:
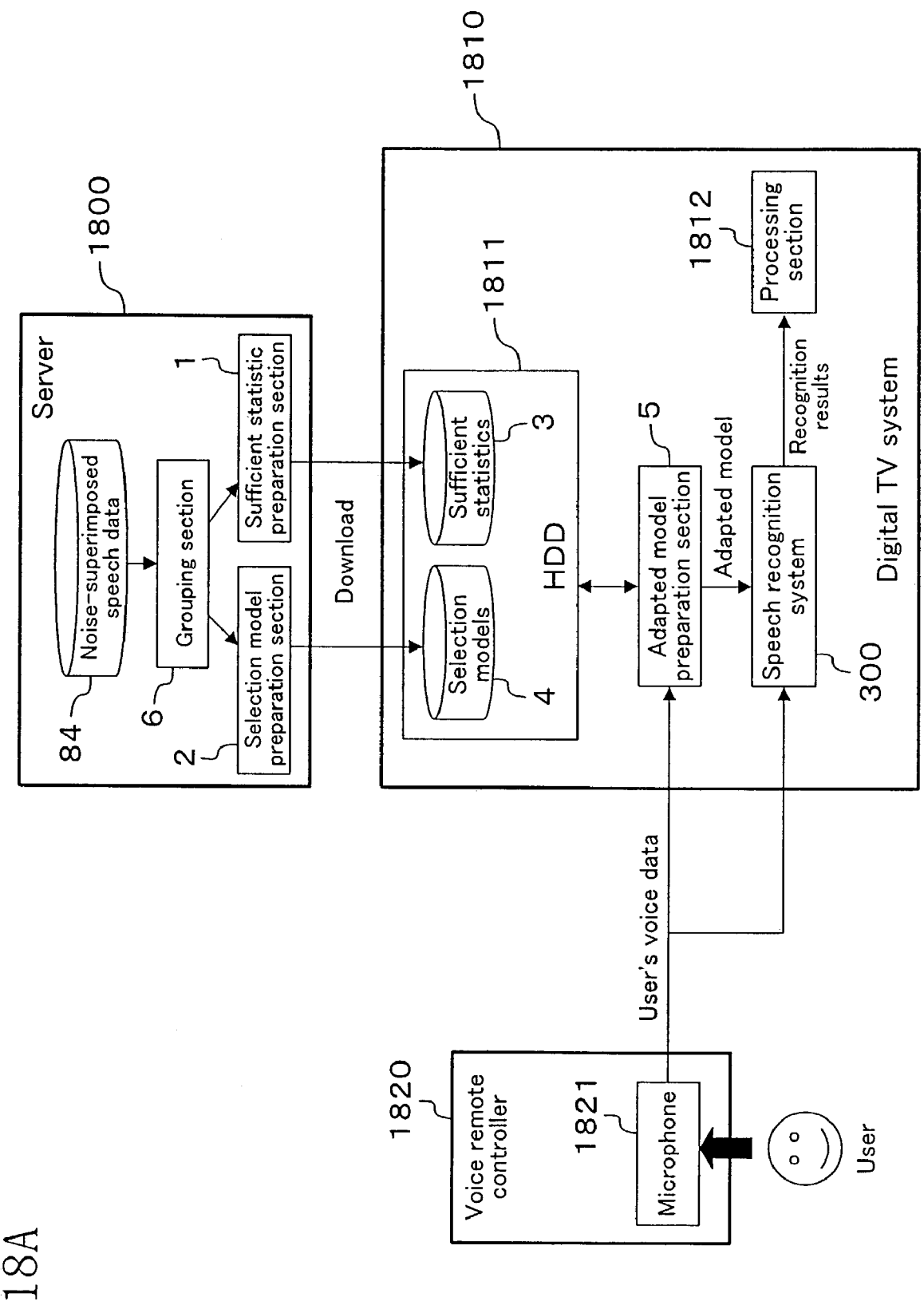
FIGS. 18A to 28 show images of practical products and examples of grouping.
Figure 18B:
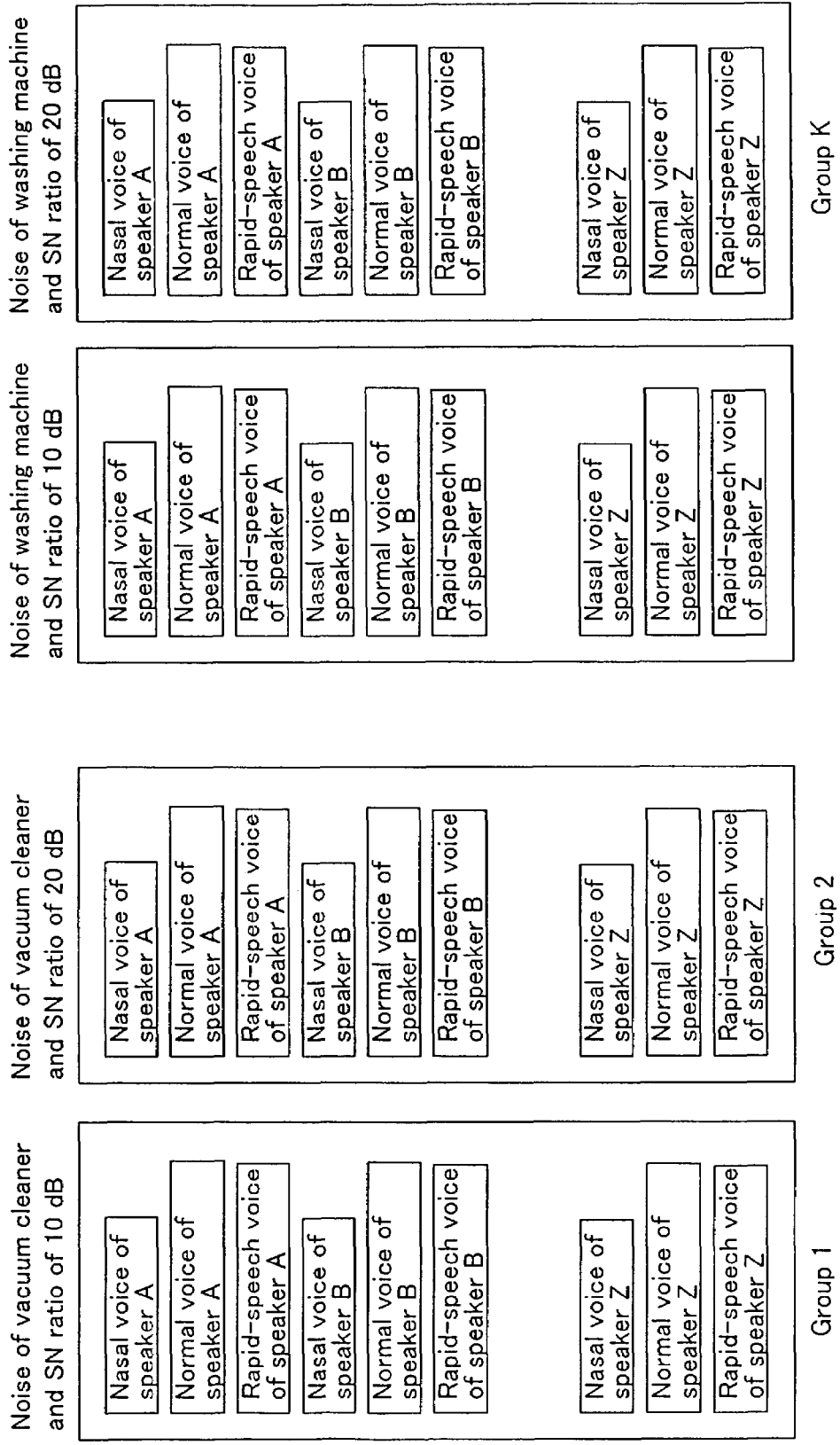

Group Selection Method 1 (see FIGS. 18A and 18B)

Figure 3:
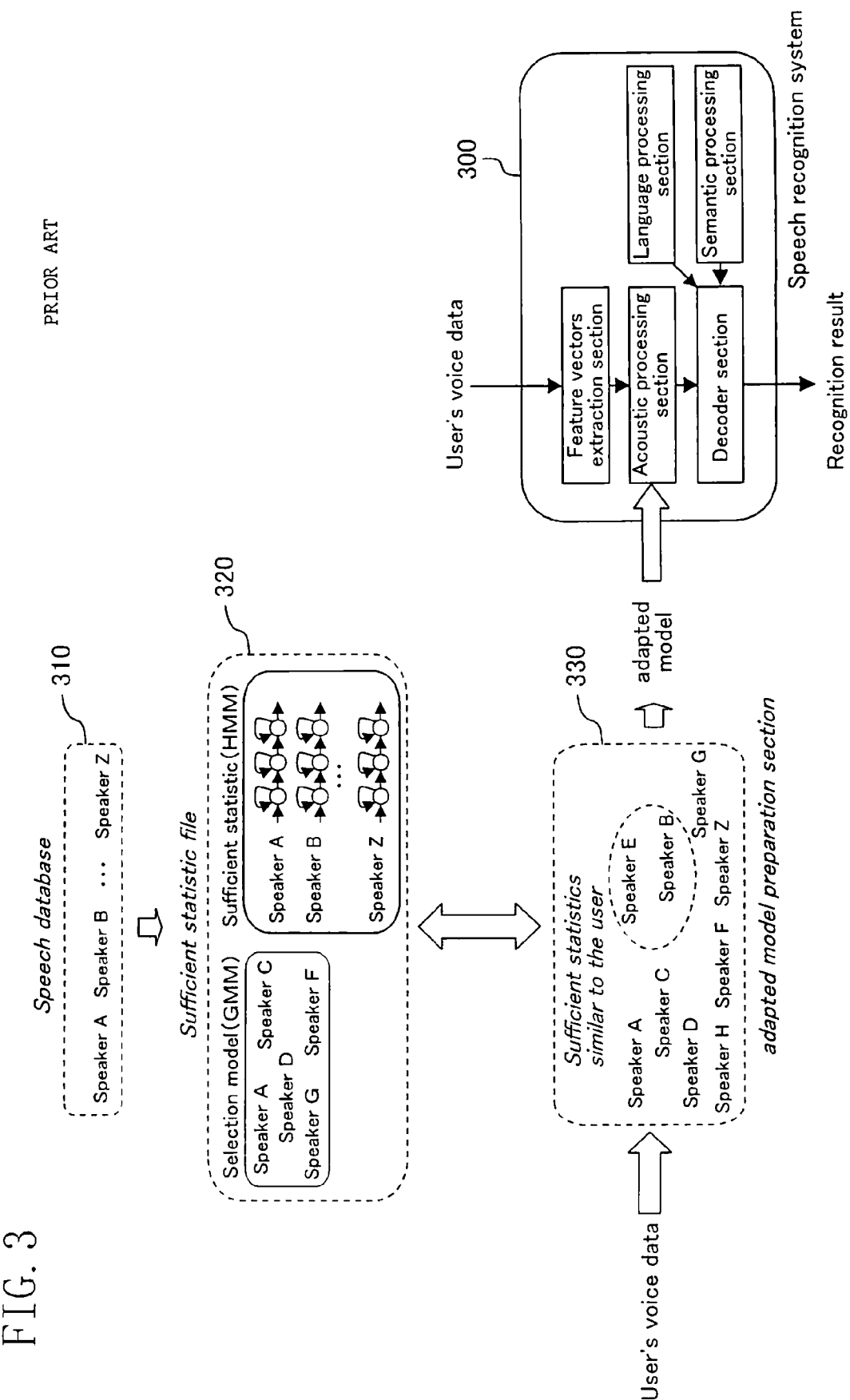
FIG. 3 is a block diagram demonstrating the procedure for preparing an adapted model by the "method using sufficient statistics".
Figure 5:
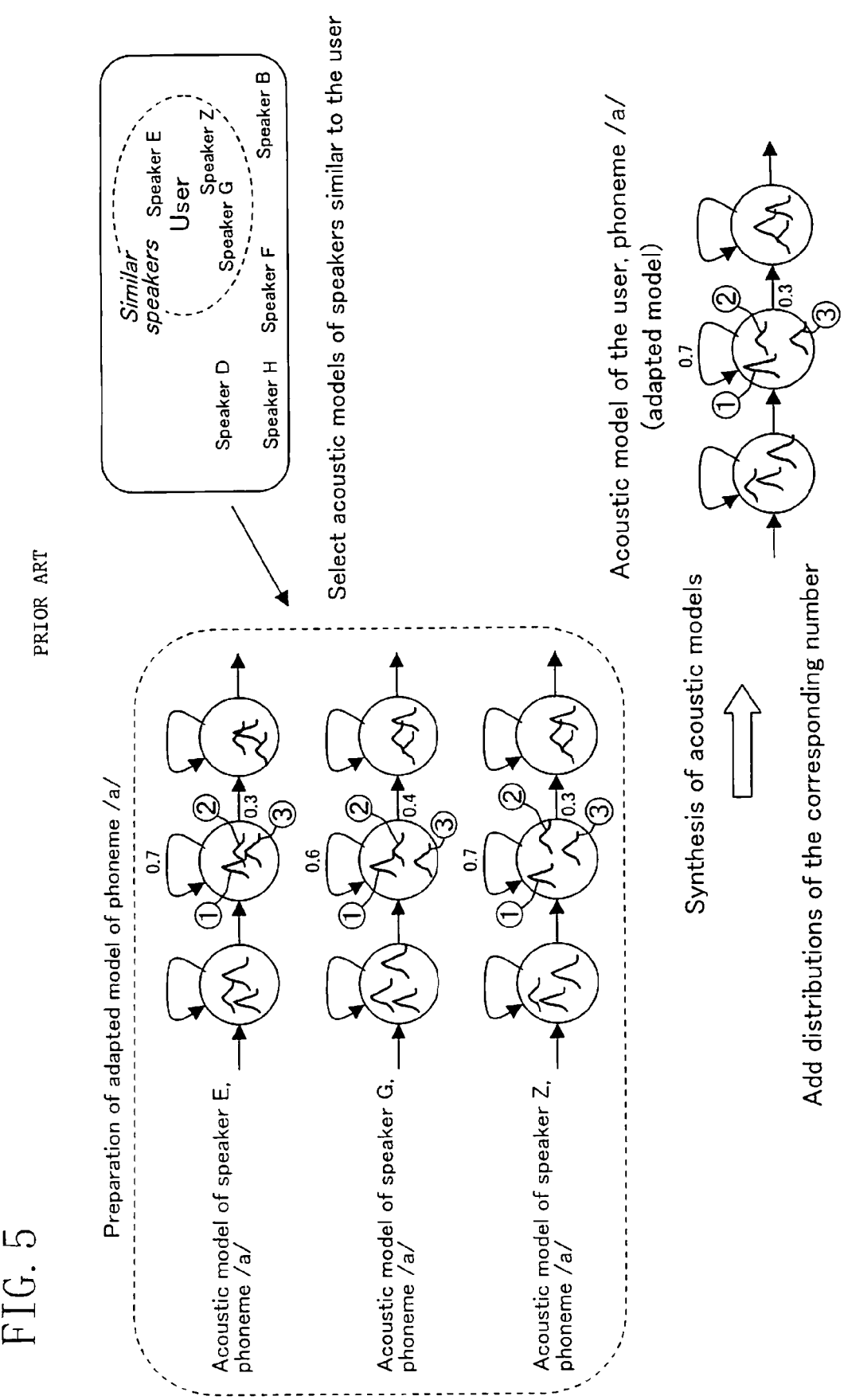
FIG. 5 is a view demonstrating preparation of an adapted model.
Figure 6:
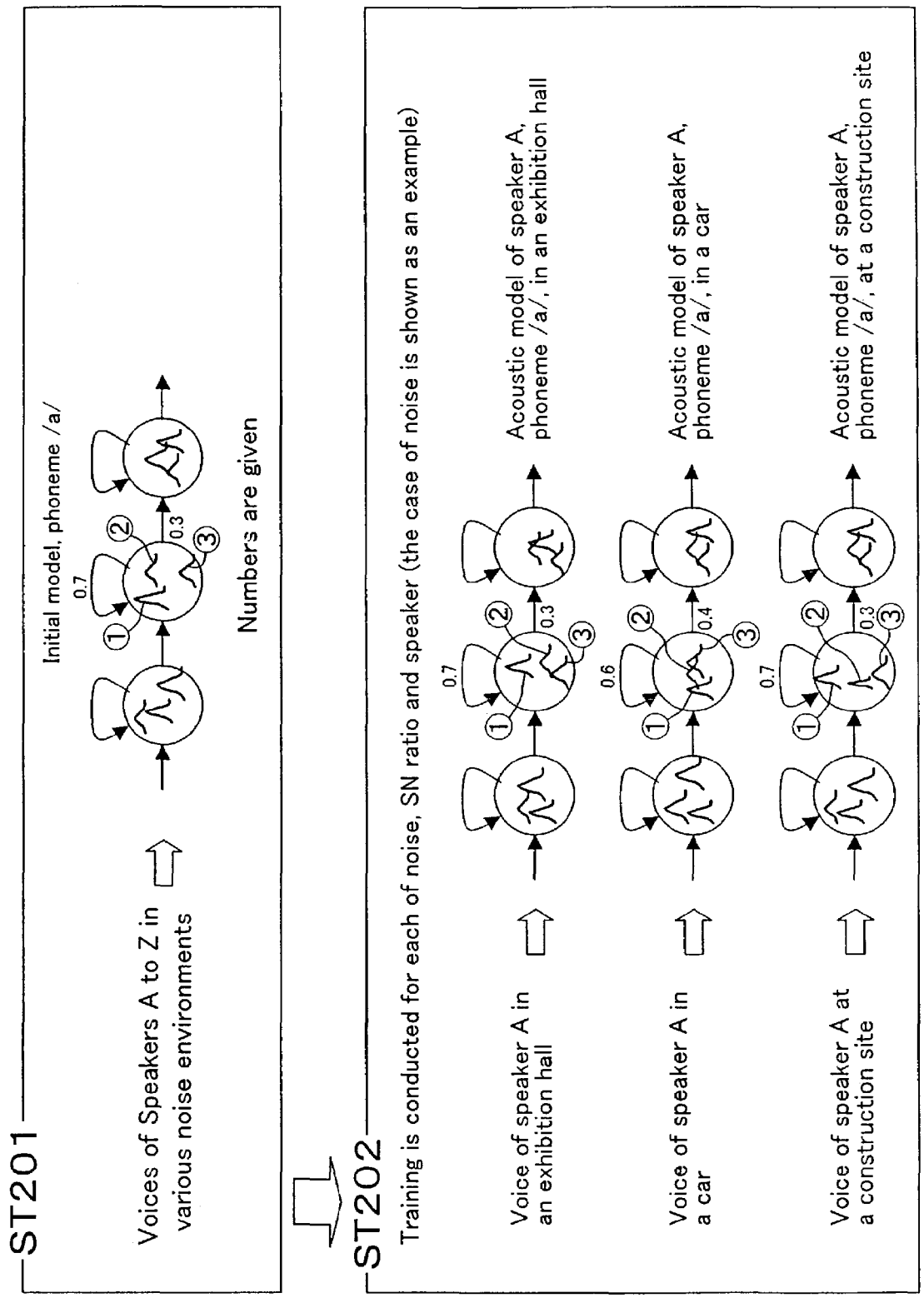
FIG. 6 is a view demonstrating a problem arising in the conventional "method using sufficient statistics".

FIG. 18A shows a configuration of a system of this example, which includes a server 1800, a digital TV system 1810 and a voice remote controller 1820. The server 1800 includes the grouping section 6, the selection model preparation section 2 and the sufficient statistic preparation section 1. The grouping section 6 groups the noise-superimposed speech data 84 according to the type of noise (noise of vacuum cleaner, noise of washing machine and the like)×SN ratio (10 dB, 20 dB and the like) as shown in FIG. 18B. The sufficient statistic preparation section 1 prepares a sufficient statistic for each speaker (speaker A, speaker B and the like)×voice tone of speaker (nasal voice, normal voice, rapid-speech voice and the like). The selection model preparation section 2 prepares a selection model corresponding to each sufficient statistic prepared by the sufficient statistic preparation section 1. The voice remote controller 1820 includes a microphone 1821, which converts a voice uttered by the user to predetermined voice data. The voice data from the microphone 1821 is transmitted to the digital TV system 1810. The digital TV system 1810 includes a hard disk (HDD) 1811, the adapted model preparation section 5, the speech recognition system 300 (see FIG. 3) and a processing section 1812. The selection models and the sufficient statistics prepared by the selection model preparation section 2 and the sufficient statistic preparation section 1, respectively, of the server 1800 are downloaded into the HDD 1811 via a communication network. The adapted model preparation section 5 prepares an adapted model using the voice data from the voice remote controller 1820 and the selection models and the sufficient statistics stored in the HDD 1811. The speech recognition system 300 recognizes the speech data from the voice remote controller 1820 using the adapted model prepared by the adapted model preparation section 5. The processing section 1812 performs processing in various ways according to the recognition result from the speech recognition system 300.

The system having the configuration described above operates in the following manner.

(Step ST1)

The user utters a voice into the microphone 1821 of the voice remote controller 1820. The voice uttered by the user is converted to predetermined voice data, which is then transmitted to the digital TV system 1810.

(Step ST2)

The adapted model preparation section 5 inputs the voice data from the voice remote controller 1820 into the selection models in the HDD 1811 and calculates the likelihoods of the selection models to the input voice data. The adapted model preparation section 5 selects top N selection models largest in likelihood, and then selects a group including the largest number of selected selection models among the groups to which the N selection models belong.

(Step ST3)

The adapted model preparation section 5 selects top M sufficient statistics largest in likelihood in the selected group, and prepares an adapted model using the selected M sufficient statistics.

Figure 19A:
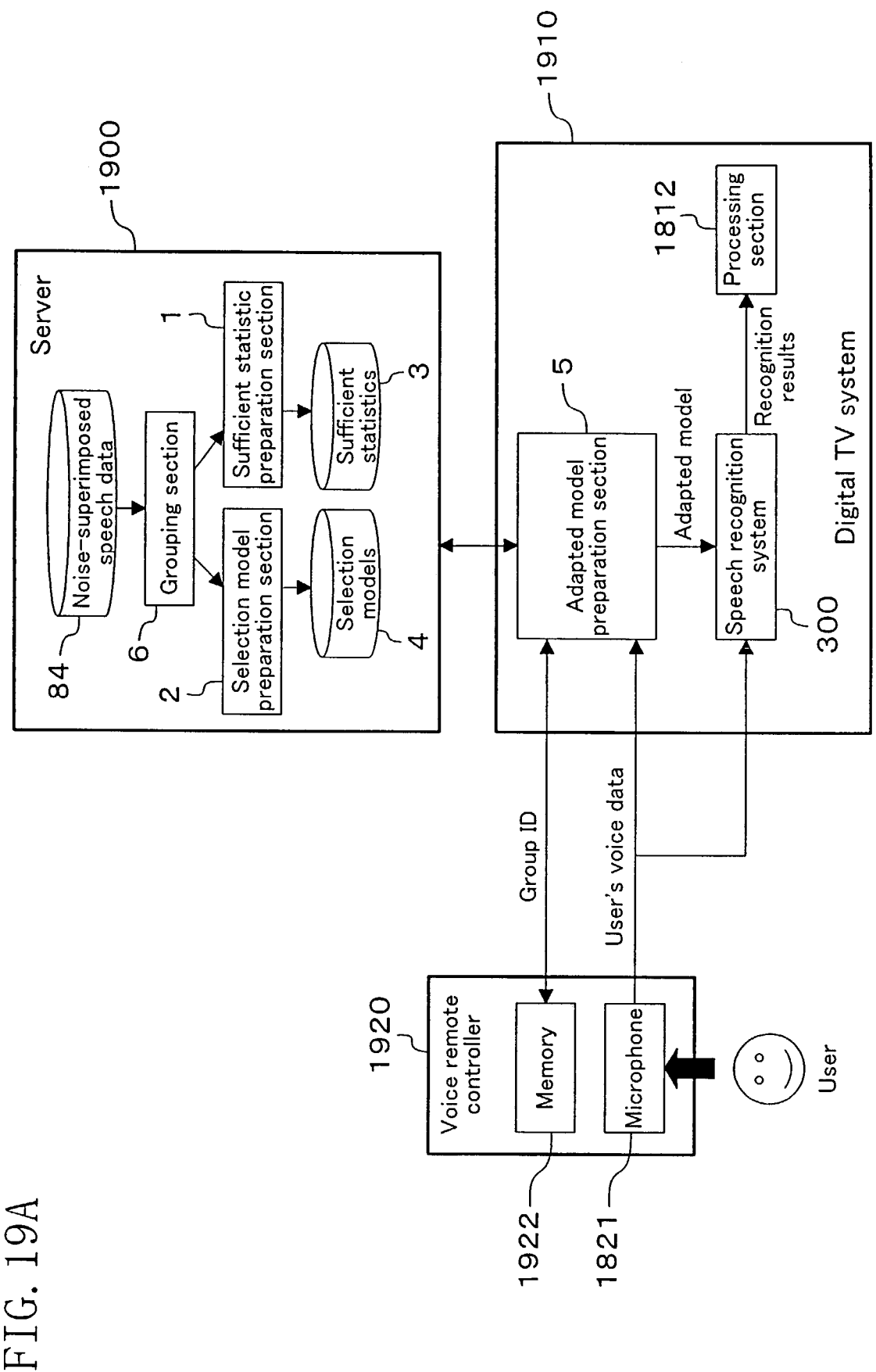
Figure 20:
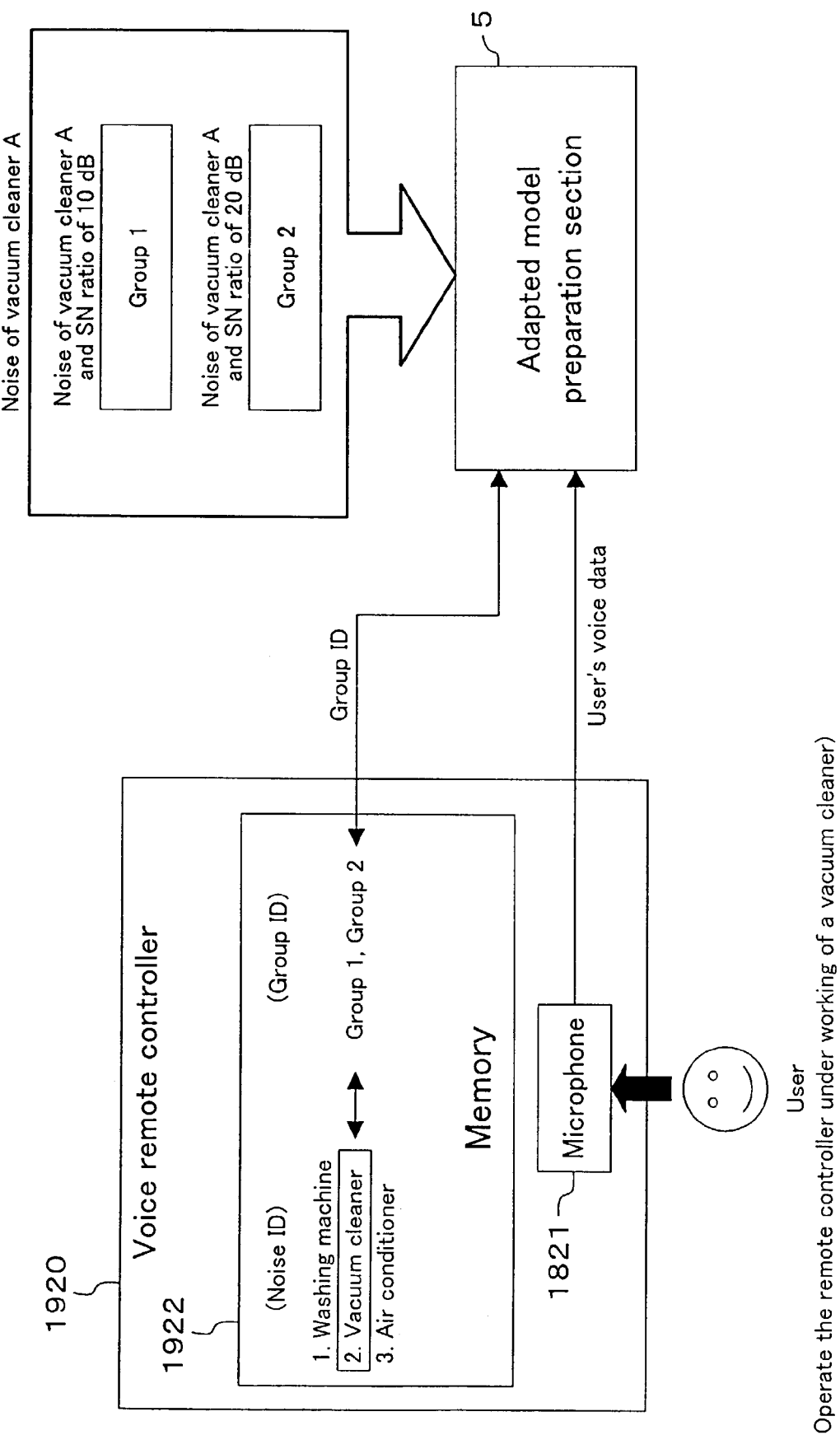

Group Selection Method 2 (see FIGS. 19A, 19B and 20)

FIG. 19A shows a configuration of a display system of this example, which includes a server 1900, a digital TV system 1910 and a voice remote controller 1920. The server 1900 includes the grouping section 6, the selection model preparation section 2, the sufficient statistic preparation section 1, the selection model storage section 4 and the sufficient statistic storage section 3. The grouping section 6 groups the noise-superimposed speech data 84 according to the type of noise (noise of vacuum cleaner A, noise of vacuum cleaner B and the like)×SN ratio (10 dB, 20 dB and the like) as shown in FIG. 19B. The sufficient statistic preparation section 1 prepares a sufficient statistic for each speaker (speaker A, speaker B and the like)×voice tone of speaker (nasal voice, normal voice, rapid-speech voice and the like). The selection model preparation section 2 prepares a selection model corresponding to each sufficient statistic prepared by the sufficient statistic preparation section 1. The voice remote controller 1920 includes the microphone 1821 and a memory 1922. The memory 1922 stores noise ID indicating the type of noise and group ID indicating the group number in association with each other. The digital TV system 1910 includes the adapted model preparation section 5, the speech recognition system 300 (see FIG. 3) and the processing section 1812. The adapted model preparation section 5 prepares an adapted model using the voice data from the voice remove controller 1920 and the selection models and the sufficient statistics stored in the selection model storage section 4 and the sufficient statistic storage section 3, respectively, of the server 1900.

The system having the configuration described above operates in the following manner.

(Step ST1-*a*)

The digital TV system 1910 urges the user to select the type of noise in the use environment by pressing a button of the remote controller 1920. For example, with a screen displaying a menu of choices "1. washing machine, 2. vacuum cleaner, 3. air conditioner, . . . ", the user selects the type of noise in the use environment by pressing the corresponding button. Assuming that the user operates the remote controller under working of a vacuum cleaner, the user selects "2. vacuum cleaner" as the type of noise.

(Step ST2-*a*)

The user utters a voice into the microphone 1821 of the voice remote controller 1920. The voice uttered by the user is converted to predetermined voice data, which is then transmitted to the digital TV system 1910.

(Step ST3-*a*)

The adapted model preparation section 5 inputs the voice data from the voice remote controller 1920 into the selection models in the selection model storage section 4 and calculates the likelihoods of the selection models to the input voice data. The adapted model preparation section 5 selects top N selection models largest in likelihood, and then selects a group including the largest number of selected selection models among the groups to which the N selection models belong.

(Step ST4-*a*)

The adapted model preparation section 5 selects top M sufficient statistics largest in likelihood in the selected group, and prepares an adapted model using the selected M sufficient statistics.

(Step ST5-*a*)

The adapted model preparation section 5 transmits the group ID indicating the group selected in the step ST3-*a* and group IDs indicating the groups having the same type of noise as the selected group to the voice remote controller 1920. The transmitted group IDs are stored in the memory 1922 in association with the noise ID indicating the type of noise selected in the step ST1-*a*. Assume that group 1 (see FIG. 19B), in which the type of noise is "noise of vacuum cleaner A", has been selected in the step ST3-*a*. The groups having "noise of vacuum cleaner A" as the type of noise are groups 1 and 2 (see FIG. 19B). Therefore, as shown in FIG. 20, the adapted model preparation section 5 transmits the group IDs of the groups (groups 1 and 2) having "noise of vacuum cleaner A" as the type of noise to the voice remote controller 1920. The group IDs are stored in the memory 1922 in association with the noise ID indicating the type of noise "2. vacuum cleaner" selected in the step ST1-*a* (see FIG. 20).

(Step ST1-*b*)

The user operates the remote controller again under working of the vacuum cleaner. The user selects "2. vacuum cleaner" as the type of noise by pressing a button. The voice remote controller 1920 transmits the group IDs (group IDs of groups 1 and 2) stored in the memory 1922 in association with the selected type of noise, "2. vacuum cleaner" to the digital TV system 1910 (see FIG. 20).

(Step ST2-*b*)

The user utters a voice into the microphone 1821 of the voice remote controller 1920. The voice uttered by the user is converted to predetermined voice data, which is then transmitted to the digital TV system 1910.

(Step ST3-*b*)

The adapted model preparation section 5 inputs the voice data from the voice remote controller 1920 into the selection models of the groups (groups 1 and 2) indicated by the group IDs from the voice remote controller 1920 among the selection models in the selection model storage section 4 of the server 1900, and calculates the likelihoods of the selection models to the input voice data. The adapted model preparation section 5 selects top N selection models largest in likelihood, and then selects a group including the largest number of selected selection models among the groups to which the N selection models belong.

(Step ST4-*b*)

The adapted model preparation section 5 selects top M sufficient statistics largest in likelihood in the selected group, and prepares an adapted model using the selected M sufficient statistics.

The process returns to step ST1-*b* for each adaptation processing, or to step ST1-*a* as required (for example, at the occasion of the replacement of the vacuum cleaner by purchase, the use of the speech recognition in the noise environment different from noise of vacuum cleaner, etc.).

—Equipment Used by a Plurality of Speakers in Environments of a Plurality of Types of Noise (for Example, PDA)—

Group Selection Method 1

The type of noise is automatically selected based on GPS positional information. Thereafter, sufficient statistics are selected based on the user's voice including noise using selection models (GMMs) from the sufficient statistics stored in a server connected through a network, and adapted. Specifically, the following processing is performed.

The type of noise is automatically selected based on GPS positional information (ST1). (Examples: noise of a train when the position is on a platform of a station; noise of construction when the position is at a site of construction)

The user's voice is input (ST2).

Top N selection models largest in likelihood obtained by inputting the user's voice into the selection models are selected in the groups of the selected noise, and a group of SN ratio including the largest number of selected selection models is selected (ST3).

Top M sufficient statistics largest in likelihood in the selected group are selected and adapted (ST4).

Group Selection Method 2

The type of noise is automatically selected based on a schedule stored in the PDA and time information. Thereafter, sufficient statistics are selected based on the user's voice including noise using selection models (GMMs) from the sufficient statistics stored in a server connected through a network, and adapted. Specifically, the following processing is performed.

The type of noise is automatically selected based on a schedule and time information (ST1). (Example: noise in a train when the schedule indicates that the user takes a train at ten and the present time is 10:55)

The user's voice is input (ST2).

Top N selection models largest in likelihood obtained by inputting the user's voice into the selection models are selected in the groups of the selected noise, and a group of SN ratio including the largest number of selected selection models is selected (ST3).

Top M sufficient statistics largest in likelihood in the selected group are selected and adapted (ST4).

—Equipment Used in an Environment of a Specific Type of Noise (for Example, Car Navigation System)

Figure 21A:
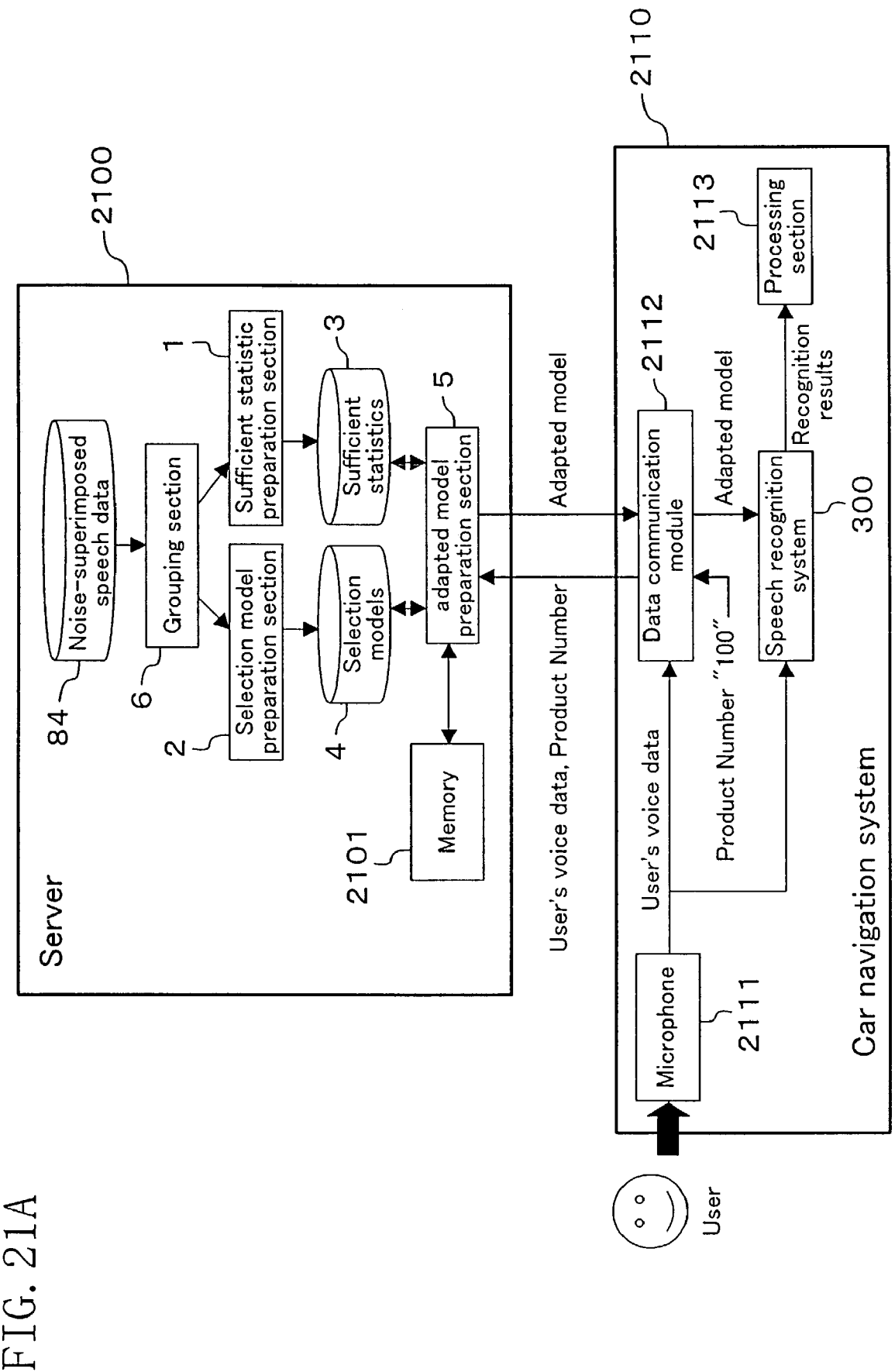
Figure 22:
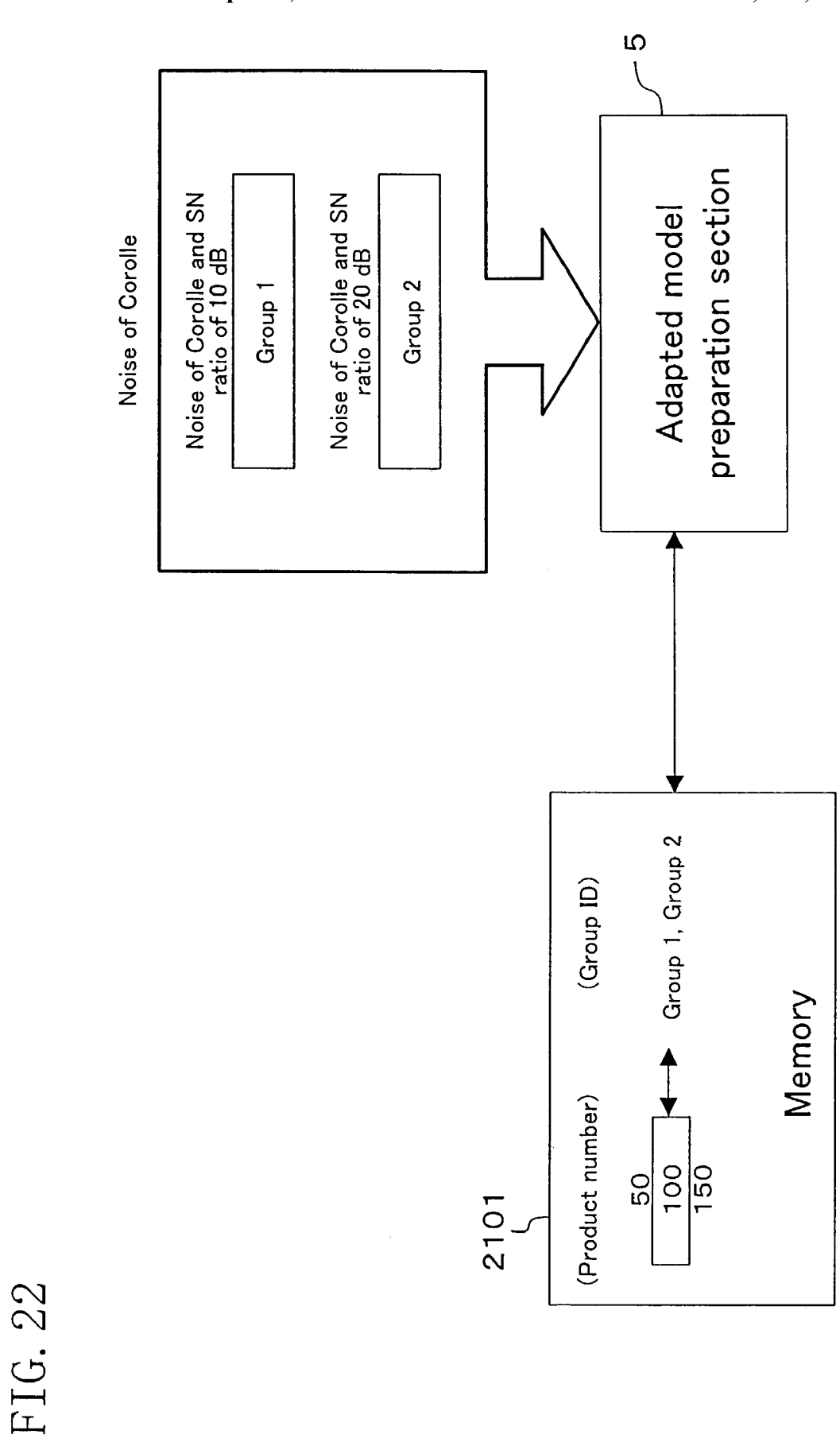

Group Selection Method (see FIGS. 21A, 21B and 22)

FIG. 21A shows a configuration of an information retrieval system of this example, which includes a server 2100 and a car navigation system 2110. The server 2100 includes the grouping section 6, the selection model preparation section 2, the sufficient statistic preparation section 1, the selection model storage section 4, the sufficient statistic storage section 3, the adapted model preparation section 5 and a memory 2101. The grouping section 6 groups the noise-superimposed speech data 84 according to the type of noise (noise of Corolle (a car model), noise of Mark III (another car model) and the like)×SN ratio (10 dB, 20 dB and the like) as shown in FIG. 21B. The memory 2101 stores equipment ID (product number, for example) for identifying the car navigation system and group ID indicating the group number in association with each other. The car navigation system 2110 includes a microphone 2111, a data communication module 2112, the speech recognition system 300 (see FIG. 3) and a processing section 2113.

The system having the configuration described above operates in the following manner.

(Step ST1-*a*)

The user utters a voice into the microphone 2111 of the car navigation system 2110. The voice uttered by the user is converted to predetermined voice data, which is then transmitted to the server 2100 via the data communication module 2112. The data communication module 2112 also transmits data (equipment ID) indicating the product number "100" of the car navigation system 2110 to the server 2100.

(Step ST2-*a*)

The adapted model preparation section 5 inputs the voice data from the car navigation system 2110 into the selection models in the selection model storage section 4 and calculates the likelihoods of the selection models to the input voice data. The adapted model preparation section 5 selects top N selection models largest in likelihood, and then selects a group including the largest number of selected selection models among the groups to which the N selection models belong.

(Step ST3-*a*)

The adapted model preparation section 5 selects top M sufficient statistics largest in likelihood in the selected group, and prepares an adapted model using the selected M sufficient statistics.

(Step ST4-*a*)

The adapted model preparation section 5 stores the group ID indicating the group selected in the step ST2-*a* and group IDs indicating the groups having the same type of noise as the selected group in the memory 2101 in association with the product number "100" transmitted from the car navigation system 2110. Assume that group 1 (see FIG. 21B), in which the type of noise is "noise of Corolle", has been selected in the step ST2-*a*. The groups having "noise of Corolle" as the type of noise are groups 1 and 2 (see FIG. 21B). Therefore, as shown in FIG. 22, the adapted model preparation section 5 stores the group IDs of the groups (groups 1 and 2) having "noise of Corolle" as the type of noise in the memory 2101 in association with the product number "100".

(Step ST1-*b*)

The user utters a voice again into the microphone 2111 of the car navigation system 2110. The voice uttered by the user is converted to predetermined voice data, which is then transmitted to the server 2100 via the data communication module 2112. The data communication module 2112 also transmits data (equipment ID) indicating the product number "100" of the car navigation system 2110 to the server 2100.

(Step ST2-*b*)

The adapted model preparation section 5 inputs the voice data from the car navigation system 2110 into the selection models of the groups (groups 1 and 2) indicated by the group IDs stored in the memory 2101 in association with the product number "100" from the car navigation system 2110 among the selection models in the selection model storage section 4, and calculates the likelihoods of the selection models to the input voice data (see FIG. 22). The adapted model preparation section 5 selects top N selection models largest in likelihood, and then selects a group including the largest number of selected selection models among the groups to which the N selection models belong.

(Step ST3-*b*)

The adapted model preparation section 5 selects top M sufficient statistics largest in likelihood in the selected group, and prepares an adapted model using the selected M sufficient statistics.

The process returns to step ST1-*b* for each adaptation processing, or to step ST1-*a* as required (for example, at the occasion that the car navigation system 2110 is placed in another model of car (ex. Mark III), etc.).

[Grouping Method 2]

Groups are formed according to the type of noise×SN ratio×similarity of speaker, and sufficient statistics for variations of the voice tone (nasal voice, rapid speech, stammering voice and the like) of similar speakers are stored for each group.

—Equipment Used by a Plurality of Speakers in Environments of a Plurality of Types of Noise (for Example, Controller of TV Set)—

Figure 23A:
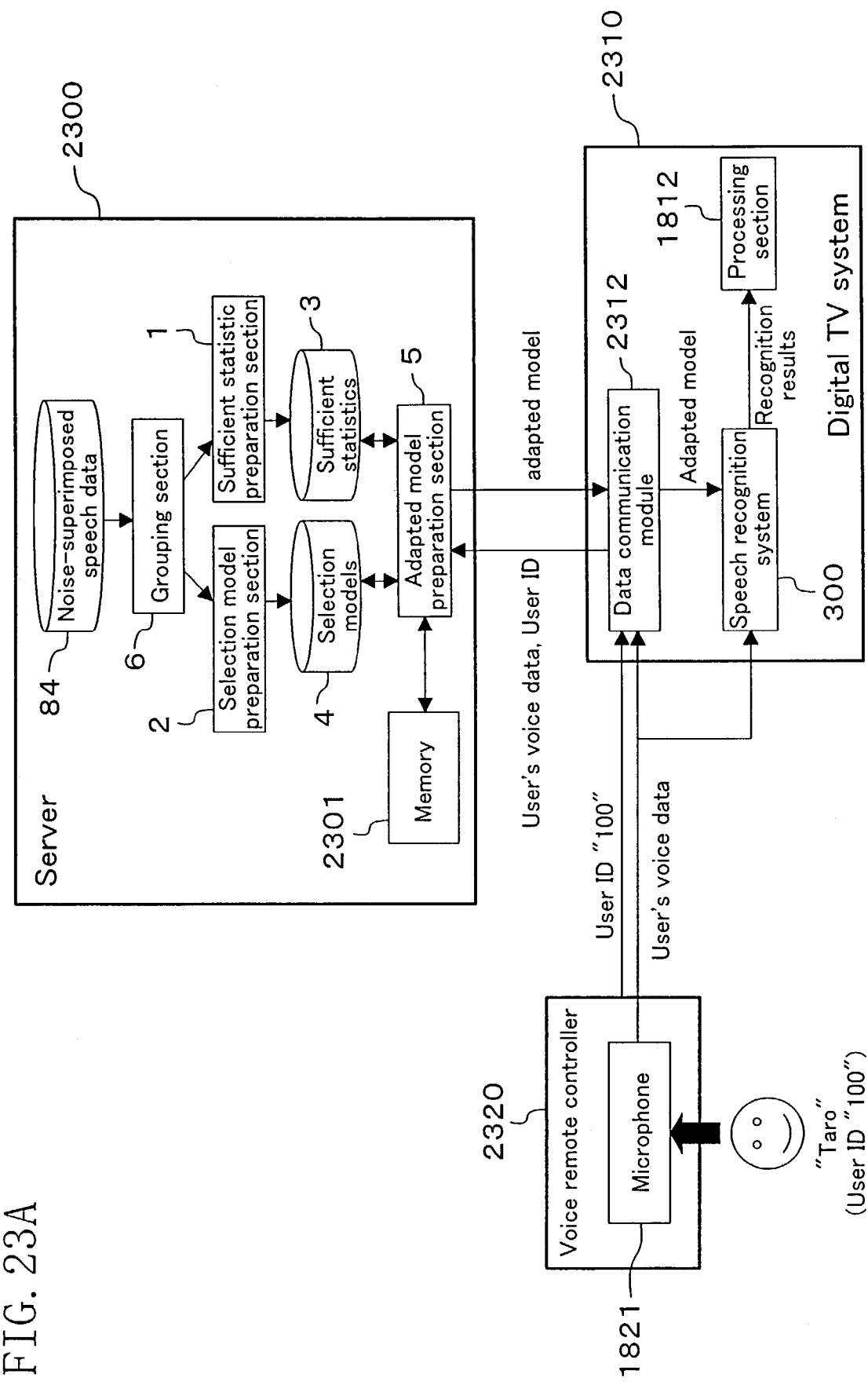
Figure 23B:
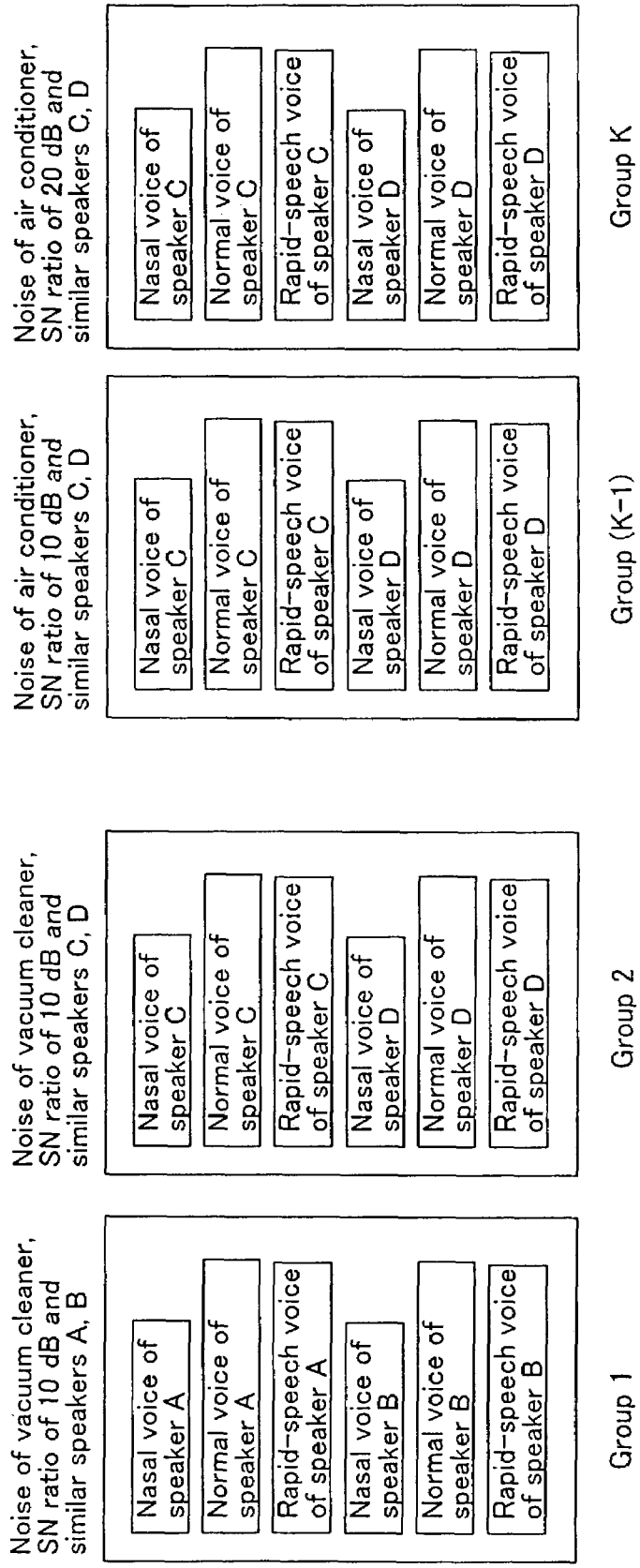
Figure 24:
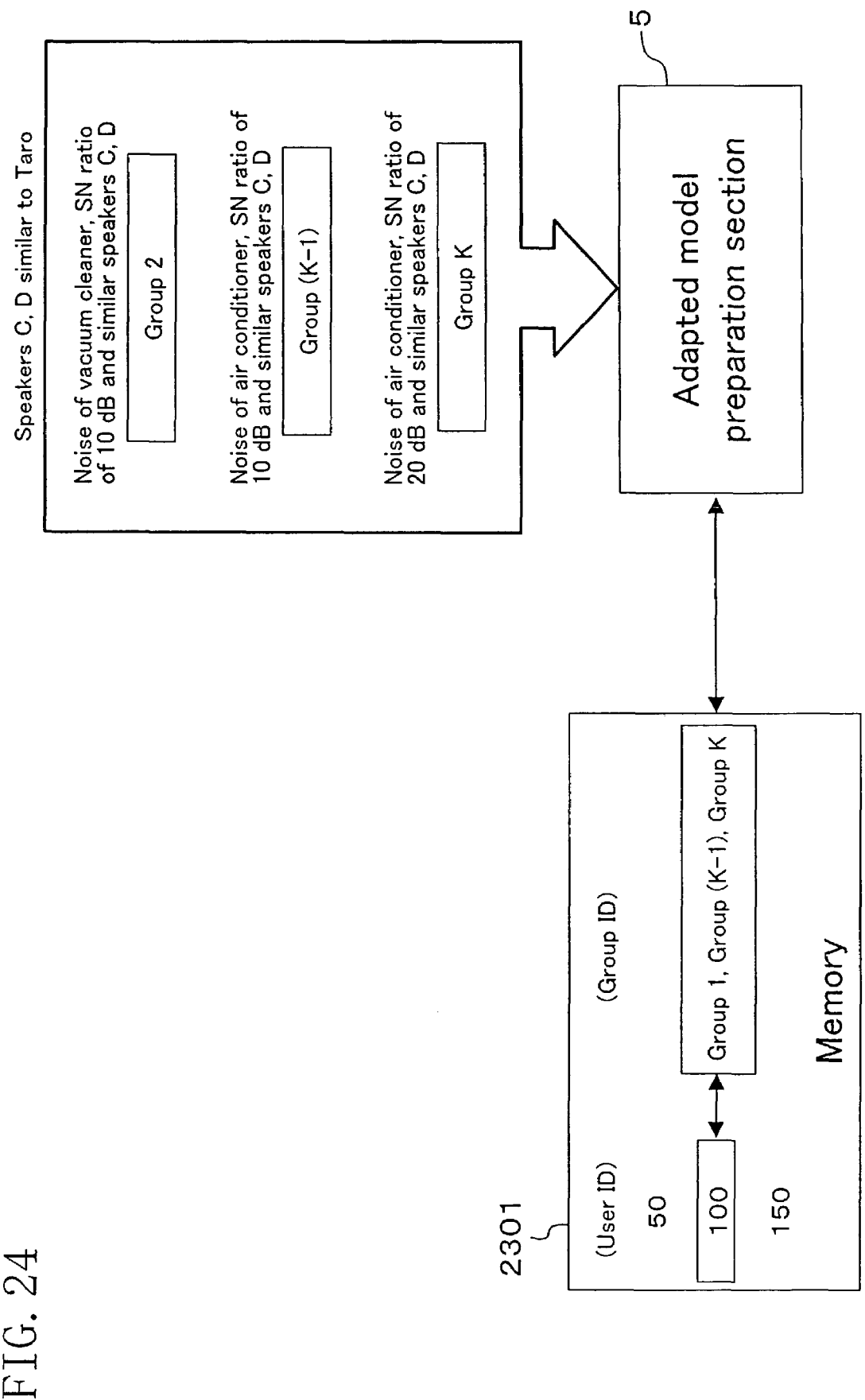

Group Selection Method (see FIGS. 23A, 23B and 24)

FIG. 23A shows a configuration of a system of this example, which includes a server 2300, a digital TV system 2310 and a voice remote controller 2320. The server 2300 includes the grouping section 6, the selection model preparation section 2, the sufficient statistic preparation section 1, the selection model storage section 4, the sufficient statistic storage section 3, the adapted model preparation section 5 and a memory 2301. The grouping section 6 groups the noise-superimposed speech data 84 according to the type of noise (noise of vacuum cleaner, noise of air conditioner and the like)×SN ratio (10 dB, 20 dB and the like)×similarity of speaker as shown in FIG. 23B. The memory 2301 stores user ID for identifying the user and group ID indicating the group number in association with each other. The digital TV system 2310 includes a data communication module 2312, the speech recognition system 300 (see FIG. 3) and the processing section 1812. The voice remote controller 2320 includes the microphone 1821.

The system having the configuration described above operates in the following manner.

(Step ST1-*a*)

The user utters a voice into the microphone 1821 of the voice remote controller 2320. The voice uttered by the user is converted to predetermined voice data, which is then transmitted to the digital TV system 2310. The user also enters information (user ID) for self-identification such as the user's name and a secret number. The entered user ID ("100" in the illustrated example) is transmitted to the digital TV system 2310. The voice data from the voice remote controller 2320 and the user ID "100" are transmitted to the server 2300 via the data communication module 2312.

(Step ST2-*a*)

The adapted model preparation section 5 inputs the voice data from the digital TV system 2310 into the selection models in the selection model storage section 4 and calculates the likelihoods of the selection models to the input voice data. The adapted model preparation section 5 selects top N selection models largest in likelihood, and then selects a group including the largest number of selected selection models among the groups to which the N selection models belong.

(Step ST3-*a*)

The adapted model preparation section 5 selects top M sufficient statistics largest in likelihood in the selected group, and prepares an adapted model using the selected M sufficient statistics.

(Step ST4-*a*)

The adapted model preparation section 5 stores the group ID indicating the group selected in the step ST2-*a* and group IDs indicating the groups having the same similar speakers as the selected group in the memory 2301 in association with the user ID "100" transmitted from the digital TV system 2310. Assume that group 2 (see FIG. 23B), in which the similar speakers are "speakers C, D", has been selected in the step ST2-*a*. The groups having "speakers C, D" as the similar speakers are groups 2, (K-1) and K (see FIG. 23B). Therefore, as shown in FIG. 24, the adapted model preparation section 5 stores the group IDs of the groups (groups 2, (K-1) and K) having "speakers C, D" as the similar speakers in the memory 2301 in association with the user ID "100".

(Step ST1-*b*)

The user utters a voice again into the microphone 1821 of the voice remote controller 2320. The voice uttered by the user is converted to predetermined voice data, which is then transmitted to the digital TV system 2310. The user also enters the user ID "100" by pressing a button. The entered user ID ("100") is transmitted to the digital TV system 2310. The voice data from the voice remote controller 2320 and the user ID "100" are transmitted to the server 2300 via the data communication module 2312.

(Step ST2-*b*)

The adapted model preparation section 5 inputs the voice data from the digital TV system 2310 into the selection models of the groups (groups 2, (K-1) and K) indicated by the group IDs stored in the memory 2301 in association with the user ID "100" from the digital TV system 2310 among the selection models in the selection model storage section 4, and calculates the likelihoods of the selection models to the input voice data (see FIG. 24). The adapted model preparation section 5 selects top N selection models largest in likelihood, and then selects a group including the largest number of selected selection models among the groups to which the N selection models belong.

(Step ST3-*b*)

The adapted model preparation section 5 selects top M sufficient statistics largest in likelihood in the selected group, and prepares an adapted model using the selected M sufficient statistics.

The process returns to step ST1-*b* for each adaptation processing, or to step ST1-*a* as required (for example, at the occasion of change of the user, etc.).

—Equipment Used by a Specific Speaker (for Example, Cellular Phone)—

Figure 25A:
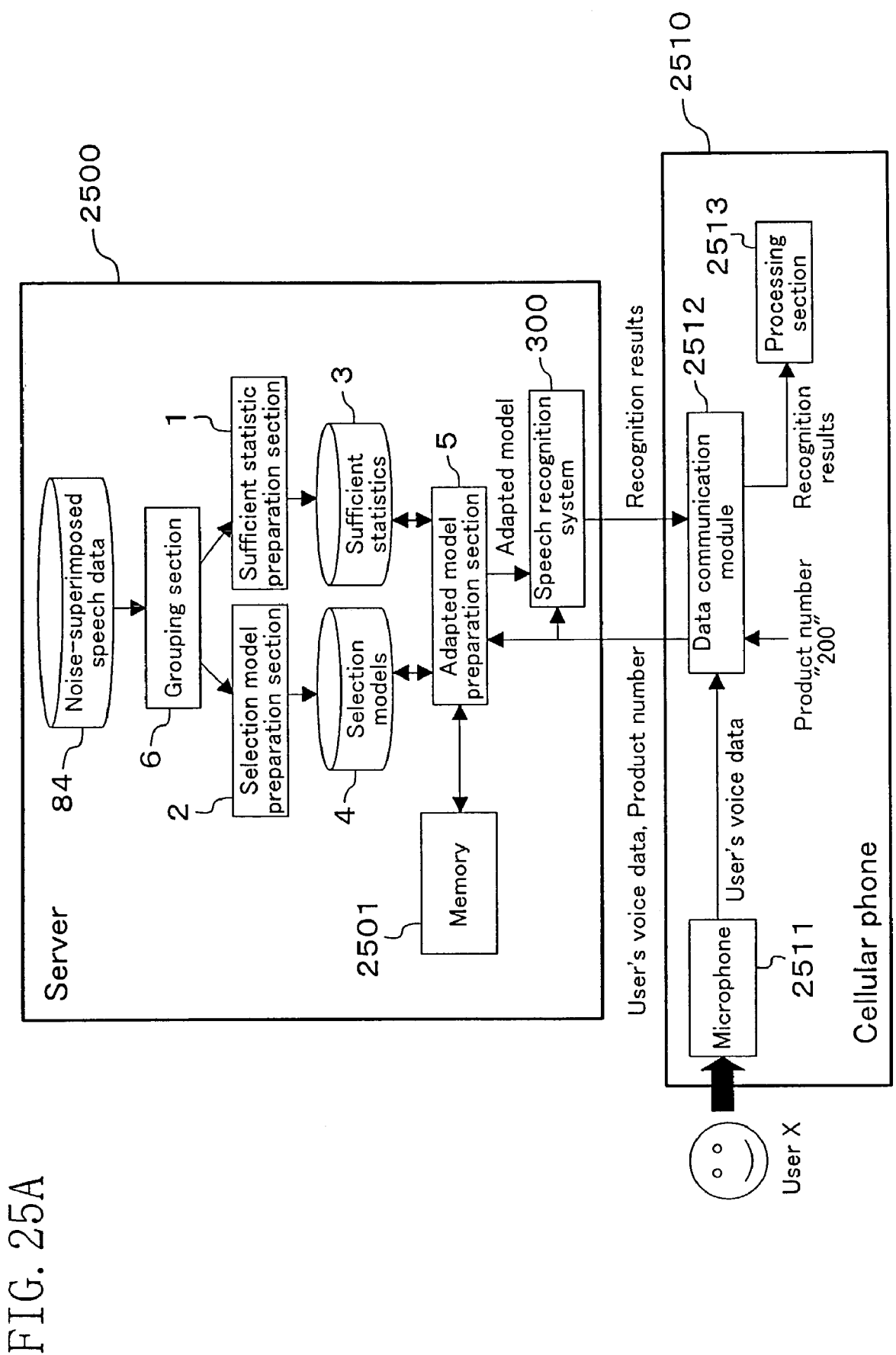
Figure 26:
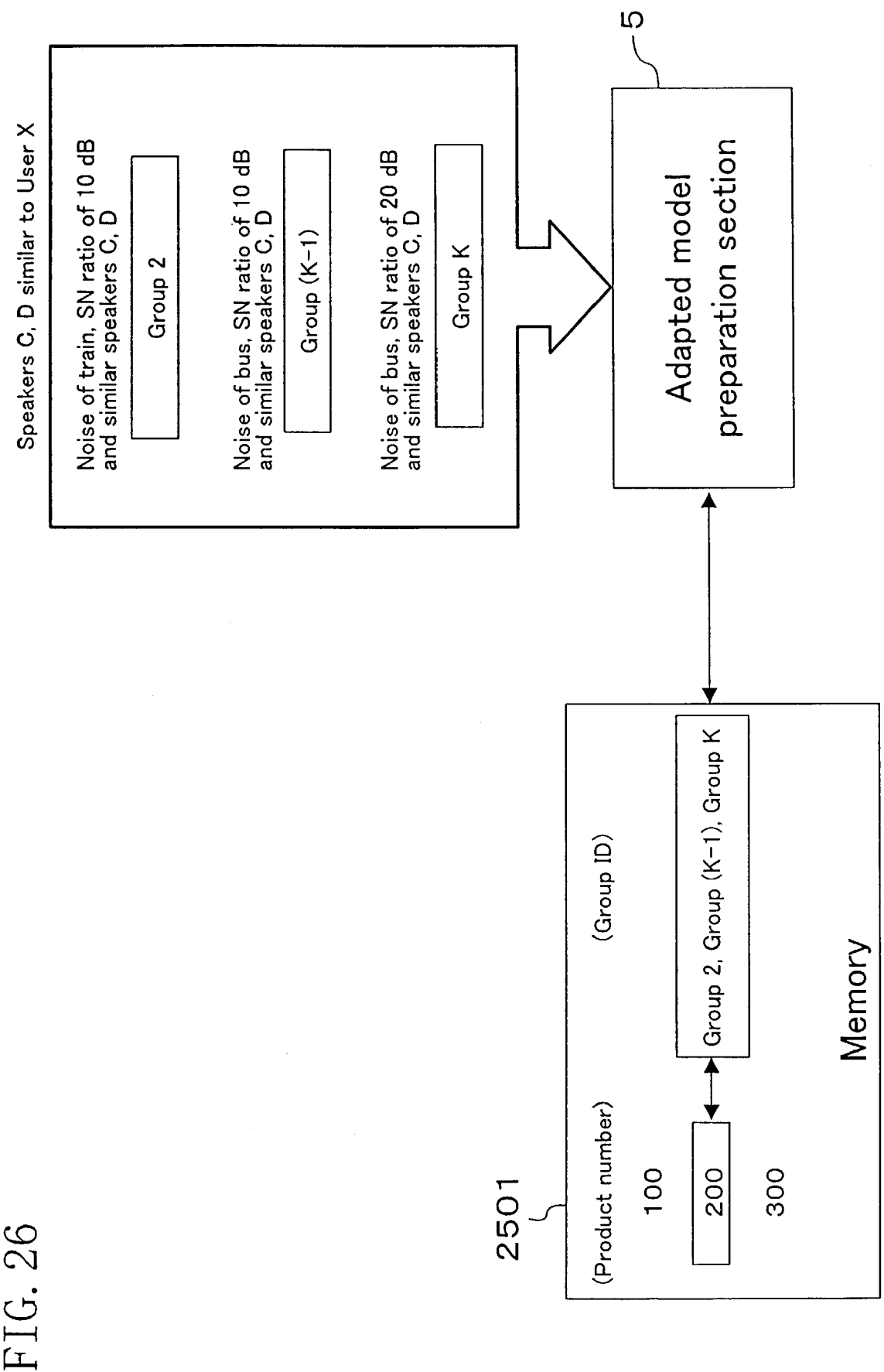

Group Selection Method (see FIGS. 25A, 25B and 26)

FIG. 25A shows a configuration of a system of this example, which includes a server 2500 and a cellular phone 2510. The server 2500 includes the grouping section 6, the selection model preparation section 2, the sufficient statistic preparation section 1, the selection model storage section 4, the sufficient statistic storage section 3, the adapted model preparation section 5, a memory 2501 and the speech recognition system 300. The grouping section 6 groups the noise-superimposed speech data 84 according to the type of noise (noise of train, noise of bus and the like)×SN ratio (10 dB, 20 dB and the like)×similarity of speaker as shown in FIG. 25B. The memory 2501 stores equipment ID (product number, for example) for identifying the cellular phone and group ID indicating the group number in association with each other. Recognition results from the speech recognition system 300 are transmitted to the cellular phone 2510 via a communication network. The cellular phone 2510 includes a microphone 2511, a data communication module 2512 and a processing section 2513.

The system having the configuration described above operates in the following manner.

(Step ST1-a)

The user utters a voice into the microphone 2511 of the cellular phone 2510. The voice uttered by the user is converted to predetermined voice data, which is then transmitted to the server 2500 via the data communication module 2512. The data communication module 2512 also transmits data (equipment ID) indicating the product number "200" of the cellular phone 2510 to the server 2500.

(Step ST2-a)

The adapted model preparation section 5 inputs the voice data from the cellular phone 2510 into the selection models in the selection model storage section 4 and calculates the likelihoods of the selection models to the input voice data. The adapted model preparation section 5 selects top N selection models largest in likelihood, and then selects a group including the largest number of selected selection models among the groups to which the N selection models belong.

(Step ST3-a)

The adapted model preparation section 5 selects top M sufficient statistics largest in likelihood in the selected group, and prepares an adapted model using the selected M sufficient statistics.

(Step ST4-a)

The adapted model preparation section 5 stores the group ID indicating the group selected in the step ST2-a and group IDs indicating the groups having the same similar speakers as the selected group in the memory 2501 in association with the product number "200" transmitted from the cellular phone 2510. Assume that group 2 (see FIG. 25B), in which the similar speakers are "speakers C, D", has been selected in the step ST2-a. The groups having "speakers C, D" as the similar speakers are groups 2, (K-1) and K (see FIG. 25B). Therefore, as shown in FIG. 26, the adapted model preparation section 5 stores the group IDs of the groups (groups 2, (K-1) and K) having "speakers C, D" as the similar speakers in the memory 2501 in association with the product number "200".

(Step ST1-b)

The user utters a voice again into the microphone 2511 of the cellular phone 2510. The voice uttered by the user is converted to predetermined voice data, which is then transmitted to the server 2500 via the data communication module 2512. The data communication module 2512 also transmits data (equipment ID) indicating the product number "200" of the cellular phone 2510 to the server 2500.

(Step ST2-b)

The adapted model preparation section 5 inputs the voice data from the cellular phone 2510 into the selection models of the groups (groups 2, (K-1) and K) indicated by the group IDs stored in the memory 2501 in association with the product number "200" from the cellular phone 2510 among the selection models in the selection model storage section 4, and calculates the likelihoods of the selection models to the input voice data (see FIG. 26). The adapted model preparation section 5 selects top N selection models largest in likelihood, and then selects a group including the largest number of selected selection models among the groups to which the N selection models belong.

(Step ST3-b)

The adapted model preparation section 5 selects top M sufficient statistics largest in likelihood in the selected group, and prepares an adapted model using the selected M sufficient statistics.

The process returns to step ST1-b for each adaptation processing, or to step ST1-a as required (for example, at the occasion of change of the user, etc.).

[Grouping Method 3]

Groups are formed according to the similarity of speaker, and sufficient statistics for variations of the type of noise×SN ratio are stored for each group.

—Equipment Used by a Plurality of Speakers in Environments of a Plurality of Types of Noise (for Example, Controller of TV Set)—

Figure 27:
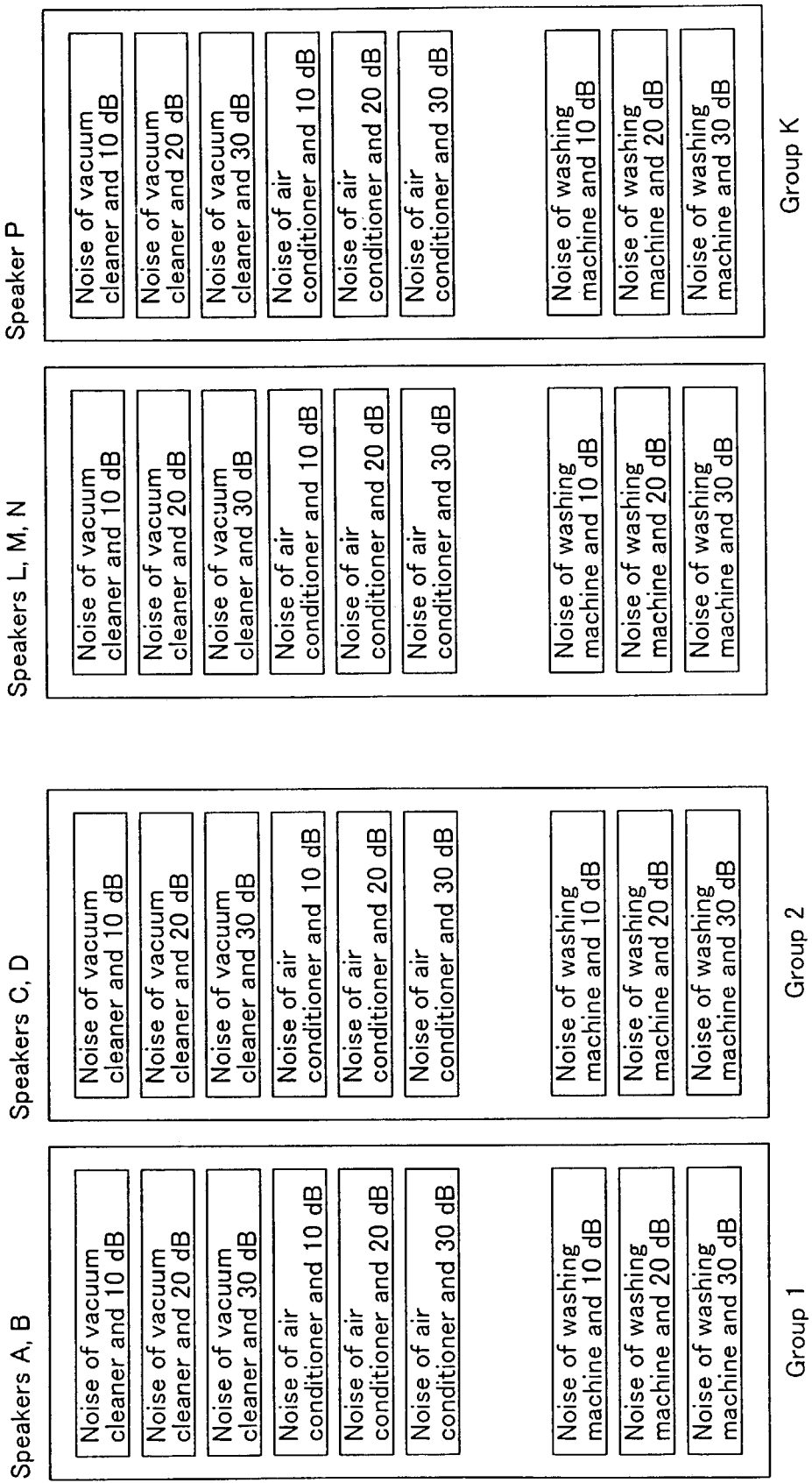
Figure 28:
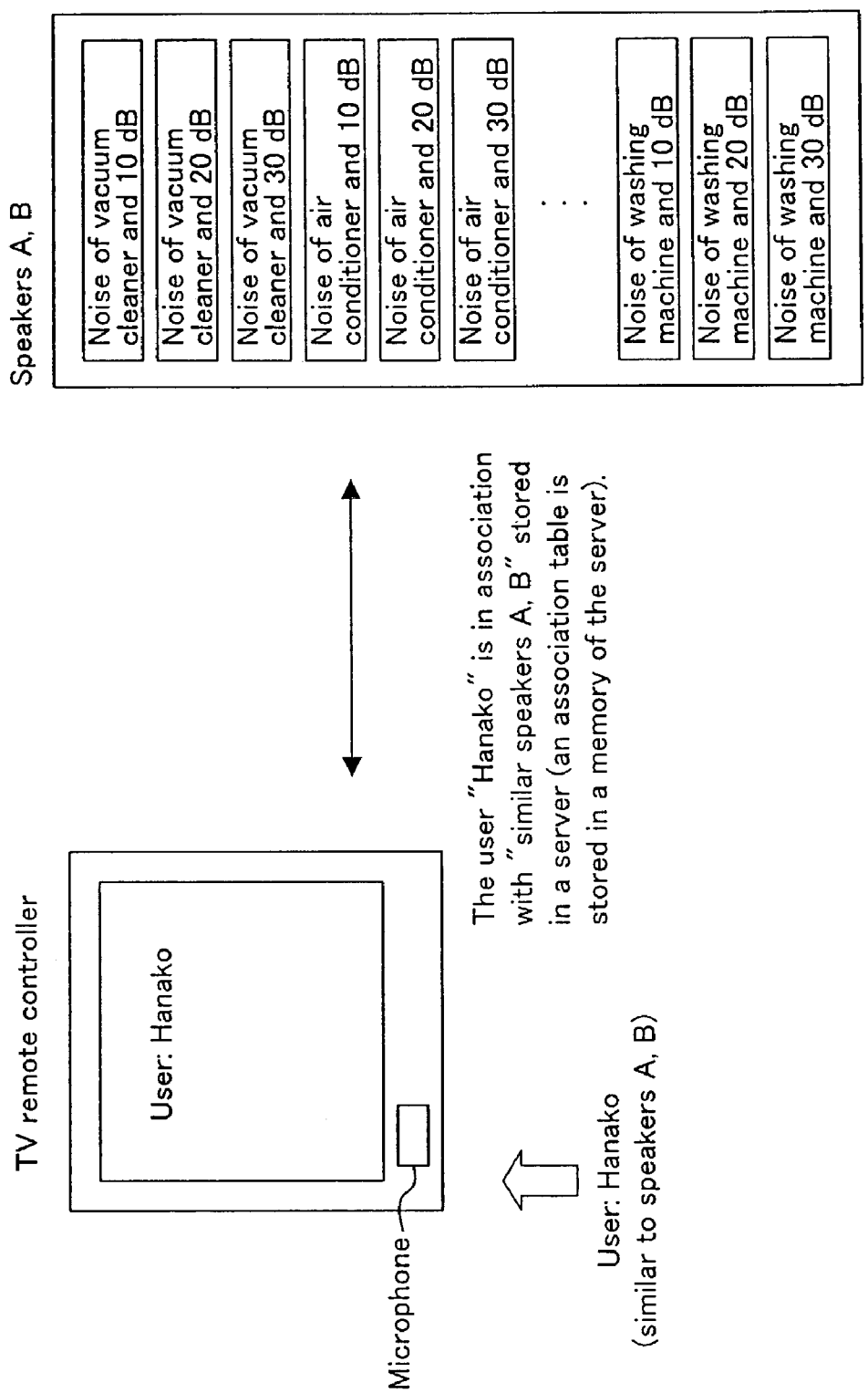

Group Selection Method (see FIGS. 27 and 28)

Sufficient statistics are selected based on the user's voice including noise using selection models (GMMs) from the sufficient statistics stored in a home set-top box or an external server connected through a network, and adapted. In this relation, the selected group is associated with the speaker ID of the user (name, secret number and the like). By this association, in the next adaptation, a group may be selected by entering the speaker ID. Specifically, the following processing is performed.

The user's voice is input (ST1-a).

Top N selection models largest in likelihood obtained by inputting the user's voice into the selection models are selected, and a group of speaker including the largest number of selected selection models is selected (ST2-a).

Top M sufficient statistics largest in likelihood in the selected group are selected (among various combinations of the type of noise and the SN ratio) and adapted (ST3-a).

The selected group is associated with the speaker ID (the association relationship is stored) (ST4-a).

The speaker ID is input to select the group (ST1-b).

The user's voice is input (ST2-b).

Top M sufficient statistics largest in likelihood in the selected group (group of a speaker similar to the user) are selected and adapted (ST3-b).

The process returns to step ST1-b for each adaptation processing, or to step ST1-a as required (for example, at the occasion of change of the user, etc.).

—Equipment Used by a Specific Speaker (for Example, Cellular Phone)—

Group Selection Method

Sufficient statistics are selected based on the user's voice including noise using selection models (GMMs) from the sufficient statistics stored in an external server connected through a network, and adapted. In this relation, the selected group is associated with equipment ID. By this association, in the next adaptation, a group may be automatically selected by entering the equipment ID. Specifically, the following processing is performed.

The user's voice is input (ST1-a).

Top N selection models largest in likelihood obtained by inputting the user's voice into the selection models are selected, and a group of speaker including the largest number of selected selection models is selected (ST2-a).

Top M sufficient statistics largest in likelihood in the selected group are selected and adapted (ST3-a).

The selected group is associated with equipment ID (the association relationship is stored) (ST4-a).

The user's voice is input (ST1-*b*).

A group is automatically selected with the equipment ID (ST2-*b*)

Top M sufficient statistics largest in likelihood in the selected group are selected and adapted (ST3-*b*).

The process returns to step ST1-*b* for each adaptation processing, or to step ST1-*a* as required (for example, at the occasion of change of the user, etc.).

[Grouping Method 4]

Groups are formed according to the SN ratio for a specific type of noise, and sufficient statistics for respective speakers are stored for each group.

—Equipment Used in an Environment of a Specific Type of Noise (for Example, Elevator)—

Group Selection Method

Sufficient statistics are selected based on the user's voice including noise using selection models (GMMs) from the sufficient statistics stored in a server mounted in an elevator, and adapted. Specifically, the following processing is performed.

The user's voice is input (ST1).

Top N selection models largest in likelihood obtained by inputting the user's voice into the selection models are selected, and a group of SN ratio including the largest number of selected selection models is selected (ST2).

Top M sufficient statistics largest in likelihood in the selected group are selected and adapted (ST3).

[Grouping Method 5]

Groups are formed according to the SN ratio for a specific speaker, and sufficient statistics for variations of the voice tone of the specific speaker (nasal voice, rapid speech, stammering voice and the like) are stored for each group.

—Equipment Used by a Specific Speaker in an Environment of a Specific Type of Noise (for Example, Car Navigation System)—

Group Selection Method

Sufficient statistics are selected based on the user's voice including noise using selection models (GMMs) from the sufficient statistics stored in a server (car navigation system) mounted in a car, and adapted. Specifically, the following processing is performed.

The user's voice is input (ST1).

Top N selection models largest in likelihood obtained by inputting the user's voice into the selection models are selected, and a group of SN ratio including the largest number of selected selection models is selected (ST2).

Top M sufficient statistics largest in likelihood in the selected group are selected and adapted (ST3).

Selection of a group may be made by preparing a group selection model for each group. (For example, when groups are formed according to the type of noise, noise selection models serve as group selection models. In the case of using GMMs, noise is input into the noise selection models, and a group largest in likelihood is selected.)

Embodiment 2

<Configuration of Adapted Model Preparation Apparatus>

Figure 29:
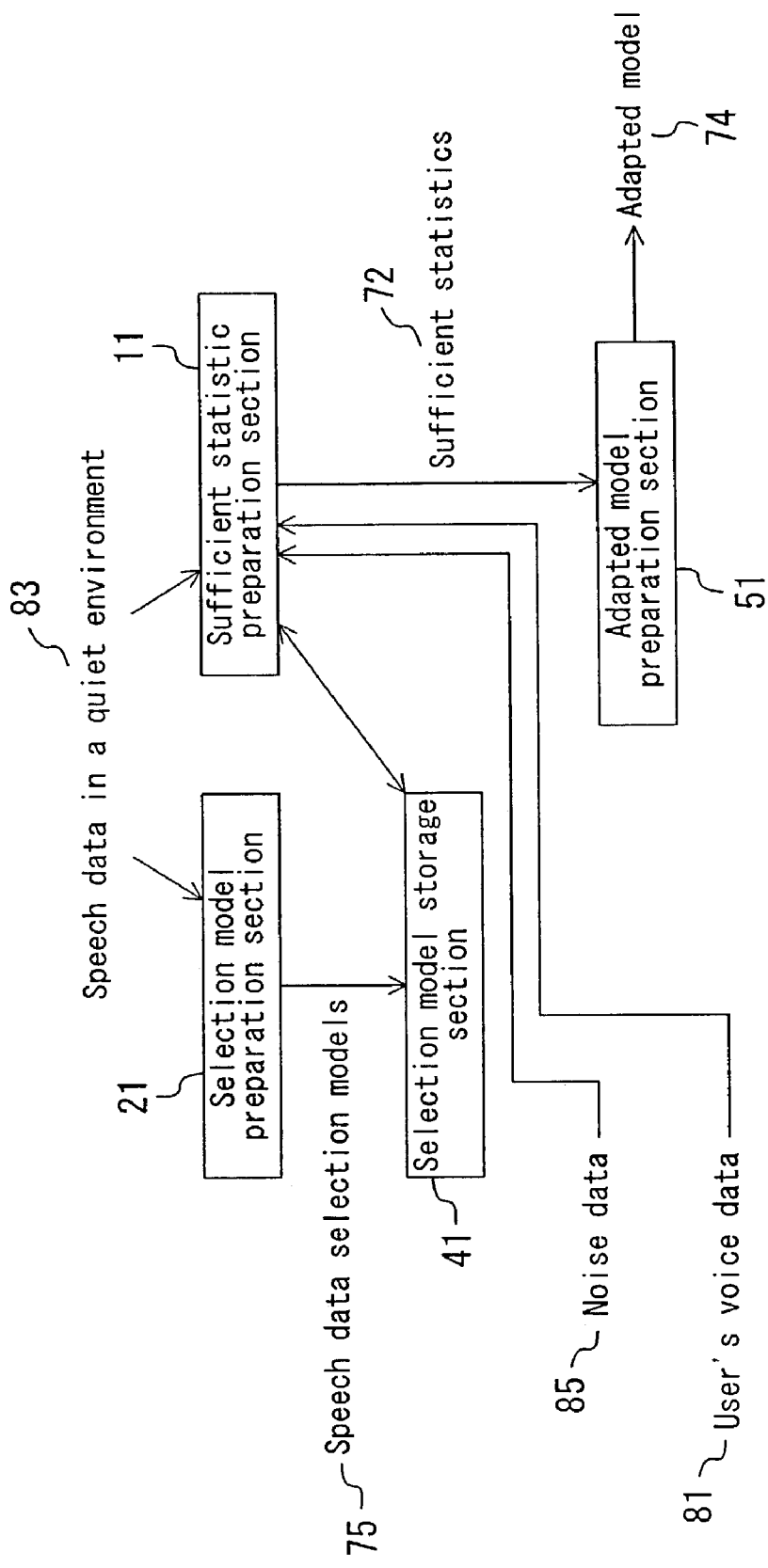
FIG. 29 is a block diagram of an adapted model preparation apparatus of Embodiment 2 of the present invention.

FIG. 29 is a block diagram showing the entire configuration of an adapted model preparation apparatus for speech recognition of Embodiment 2. The apparatus shown in FIG. 29 includes a selection model preparation section 21, a selection model storage section 41, a sufficient statistic preparation section 11 and an adapted model preparation section 51.

The selection model preparation section 21 prepares selection models 75 used for selecting speech data similar to user's voice data. The selection model storage section 41 stores the selection models 75 prepared by the selection model preparation section 21.

The sufficient statistic preparation section 11 selects speech data similar to the user's voice data from speech data 83 using the selection models 75 stored in the selection model storage section 41, and prepares sufficient statistics 72 using speech data obtained by superimposing noise on the selected speech data. The adapted model preparation section 51 prepares an adapted model 74 using the sufficient statistics 72 prepared by the sufficient statistic preparation section 11.

<Procedure of Preparation of Adapted Model>

A procedure of preparation of an adapted model by the apparatus having the configuration described above will be described.

[Preparation of Selection Models 75]

The selection models 75 are produced in the following manner. Assume herein that this preparation is performed off-line before the user requests acquisition of an adapted model.

The voice data 83 of a plurality of speakers are recorded in a quiet environment: Assume herein that speech data of about 300 speakers are recorded.

The selection model preparation section 21 prepares the selection model 75 using the speech data 83 for each speaker in the form of a Gaussian mixture model with 64 mixture components per state without distinction of the phoneme.

Figure 30:
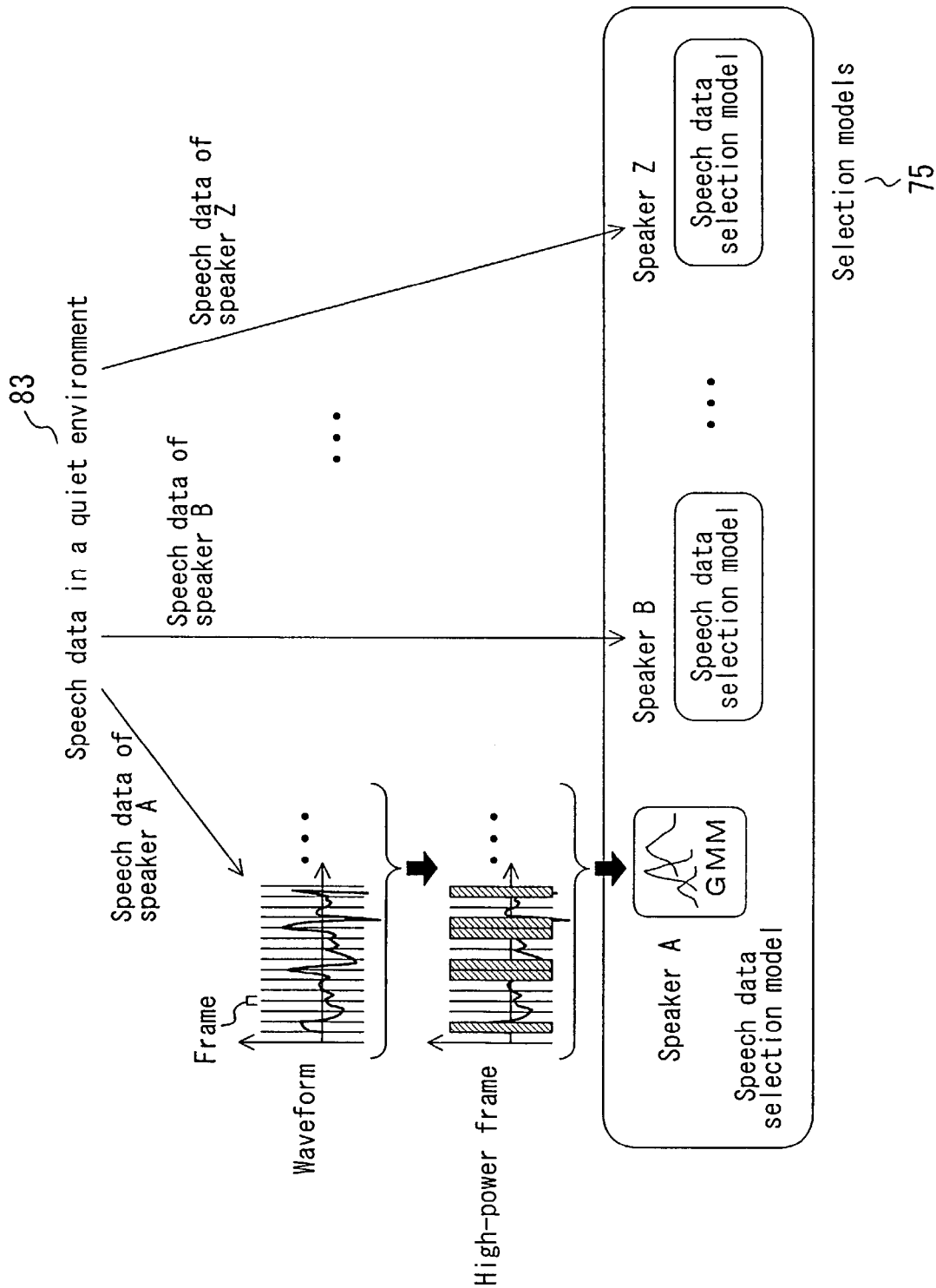
FIG. 30 shows a flow of preparation of selection models stored in a selection model storage section shown in FIG. 29.

For example, as shown in FIG. 30, the selection model 75 may be prepared using a high-power frame of the speech data 83. By using this frame, a noise-resistant voice data selection model can be prepared.

The selection model storage section 41 stores the selection models 75 prepared by the selection model preparation section 21. FIG. 30 shows examples of the selection models 75 stored in the selection model storage section 41.

[Preparation of Sufficient Statistics 72]

The sufficient statistics 72 are prepared in the following manner.

The user requests preparation of the adapted model 74.

The user then inputs noise data 85 of an environment in which speech recognition is performed (use environment) into the sufficient statistic preparation section 11 by use of a microphone and the like.

The user also inputs user's voice data 81 in the use environment into the sufficient statistic preparation section 11 by use of a microphone and the like. The user's voice data 81 is noise-superimposed voice data including noise in the use environment.

The sufficient statistic preparation section 11 calculates the likelihood of the selection models 75 by inputting the user's voice data 81 into the selection models 75 stored in the selection model storage section 41. Herein, the high-power frame of the user's voice data 81 is input into the selection models 75 shown in FIG. 30. Top L speakers (for example, top 20 speakers) largest in likelihood are selected as speakers similar to the user's voice data.

Figure 31:
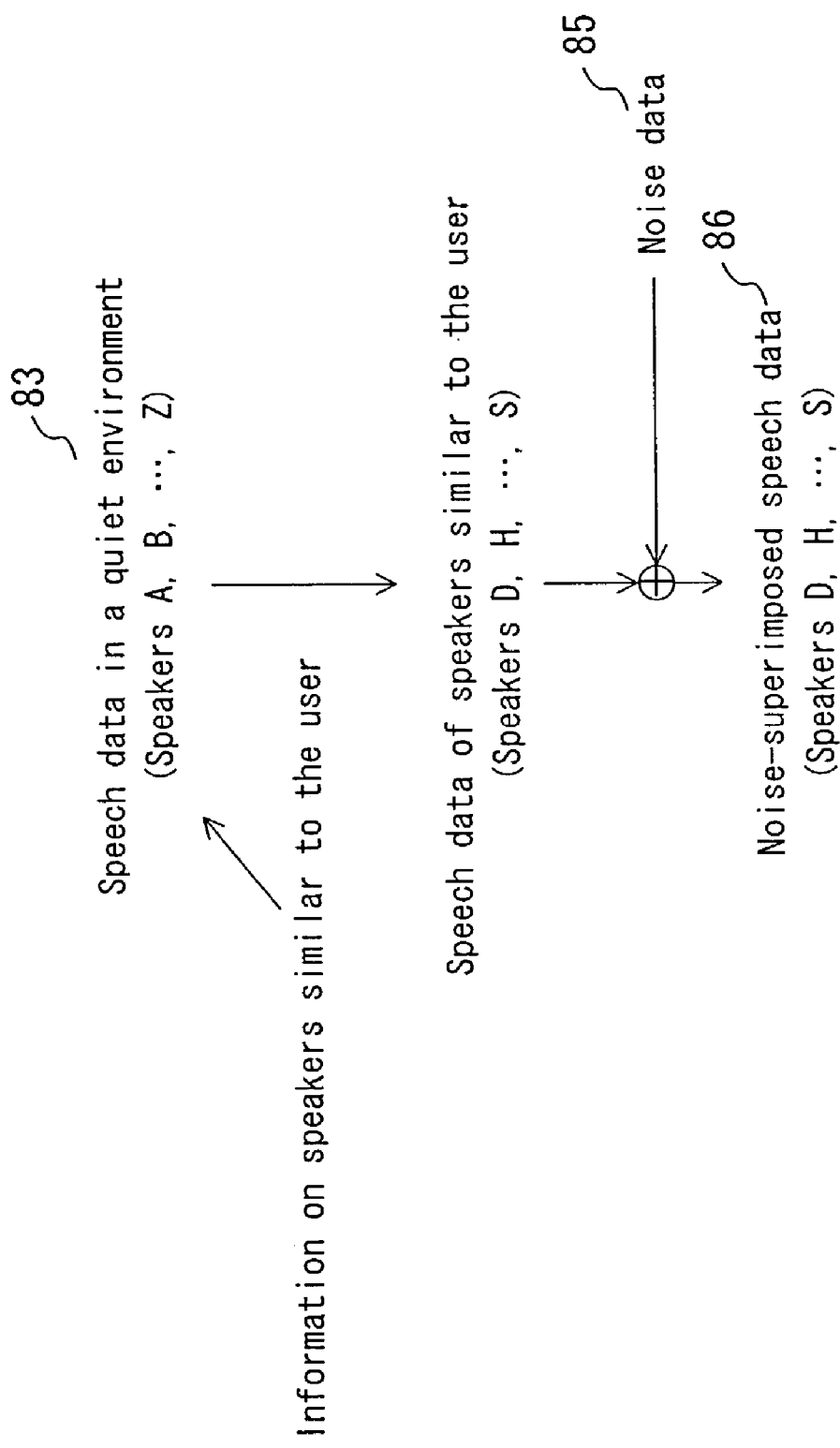
FIG. 31 shows a flow of preparation of noise-superimposed speech data.

The sufficient statistic preparation section 11 superimposes the noise data 85 on the speech data similar to the user's voice data among the speech data 83 in a quiet environment, to prepare noise-superimposed speech data 86. A SN ratio is calculated from the user's voice data 81 and the noise data 85, and the noise-superimposed speech data 86 is prepared based on the calculated SN ratio. FIG. 31 shows an example of preparation of the noise-superimposed speech data 86.

Figure 32:
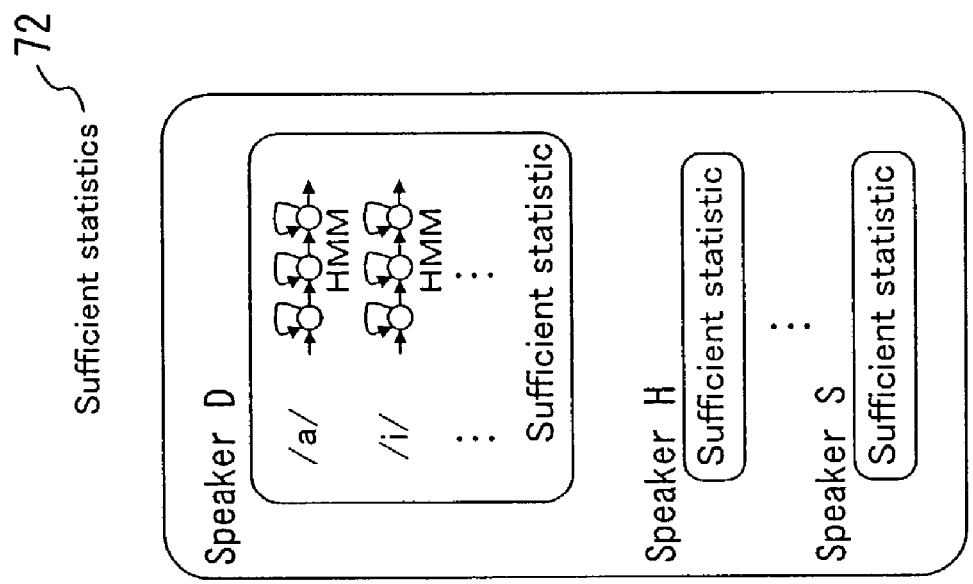
FIG. 32 shows examples of sufficient statistics prepared by a sufficient statistic preparation section shown in FIG. 29.

The sufficient statistic preparation section 11 prepares the sufficient statistics 72 using the noise-superimposed speech data 86. FIG. 32 shows examples of the sufficient statistics 72 prepared by the sufficient statistic preparation section 11.

[Preparation of Adapted Model 74]

The adapted model 74 is then prepared by the adapted model preparation section 51 in the following manner.

The adapted model preparation section 51 prepares the adapted model 74 using the sufficient statistics 72 prepared by the sufficient statistic preparation section 11. More specifically, the adapted model 74 is prepared by the following statistics calculation (equations 7 to 9). In the following equations, the mean and variance of the normal distribution in each state of the HMM of the adapted model 74 are expressed by $\mu_i^{adp}$ (i=1, 2, ..., $N_{mix}$) and $v_i^{adp}$ (i=1, 2, ..., $N_{mix}$) where $N_{mix}$ is the number of mixed distributions. The state transition probability is expressed by $a^{adp}[i][j]$ (i, j=1, 2, ..., $N_{state}$) where $N_{state}$ is the number of states, and $a^{adp}[i][j]$ represents the transition probability from state i to state j.

$$\mu_i^{adp} = \frac{\sum_{j=1}^{N_{sel}} C_{mix}^j \mu_i^j}{\sum_{j=1}^{N_{sel}} C_{mix}^j} (i = 1, 2, \ldots, N_{mix}) \quad \text{Equation 7}$$

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i = 1, 2, \ldots, N_{mix}) \quad \text{Equation 8}$$

$$a^{adp}[i][j] = \frac{\sum_{k=1}^{N_{sel}} C_{state}^k[i][j]}{\sum_{j=1}^{N_{state}} \sum_{k=1}^{N_{sel}} C_{state}^k[i][j]} (i, j = 1, 2, \ldots, N_{state}) \quad \text{Equation 9}$$

where $N_{sel}$ is the number of acoustic models selected, and $\mu_i^j$ (i=1, 2, ..., $N_{mix}$ and j=1, 2, ..., $N_{sel}$) and $v_i^j$ (i=1, 2, ..., $N_{mix}$ and j=1, 2, ..., $N_{sel}$) are the mean and variance, respectively, of the respective HHMs. $C_{mix}^j$ (j=1, 2, ..., $N_{sel}$) and $C_{state}^k[i][j]$ (k=1, 2, ..., $N_{sel}$ and i, j=1, 2, ..., $N_{state}$) are the EM count (frequency) in the normal distribution and the EM count related to the state transition, respectively.

The adapted model preparation section 51 then waits for a request for preparation of a next adapted model from a user.

<Effects>

As described above, in Embodiment 2, the noise-superimposed speech data 86 including the noise data 85 in the use environment is used for preparation of the sufficient statistics 72, which are then used for preparation of the adapted model 74. Therefore, the adapted model 74 adapted to the use environment can be prepared. This enables use of the adapted model in various noisy environments.

The sufficient statistics 72 are prepared using the noise-superimposed speech data 86 obtained by superimposing noise on speech data of speakers acoustically similar to the user. Therefore, the sufficient statistics 72 and then the adapted model 74 can be prepared instantaneously. This enables prompt use of the adapted model at the occasions of various changes of the use environment.

The noise data 85 may be input into the sufficient statistic preparation section 11 off-line before the user requests acquisition of an adapted model, to prepare the sufficient statistics 72 off-line.

The timing at which the noise data 85 is input into the sufficient statistic preparation section 11 may be automatically determined by the sufficient statistic preparation section 11.

The timing at which the adapted model 74 is prepared may be automatically determined by the adapted model preparation section 51.

The selection models 75 are not necessarily in the form of Gaussian mixture models.

Labels corresponding to the states of the HMM may be stored in a database, and the sufficient statistics 72 may be prepared from the noise-superimposed speech data 86 using the stored label information.

<Concrete Product Images>

Figure 33:
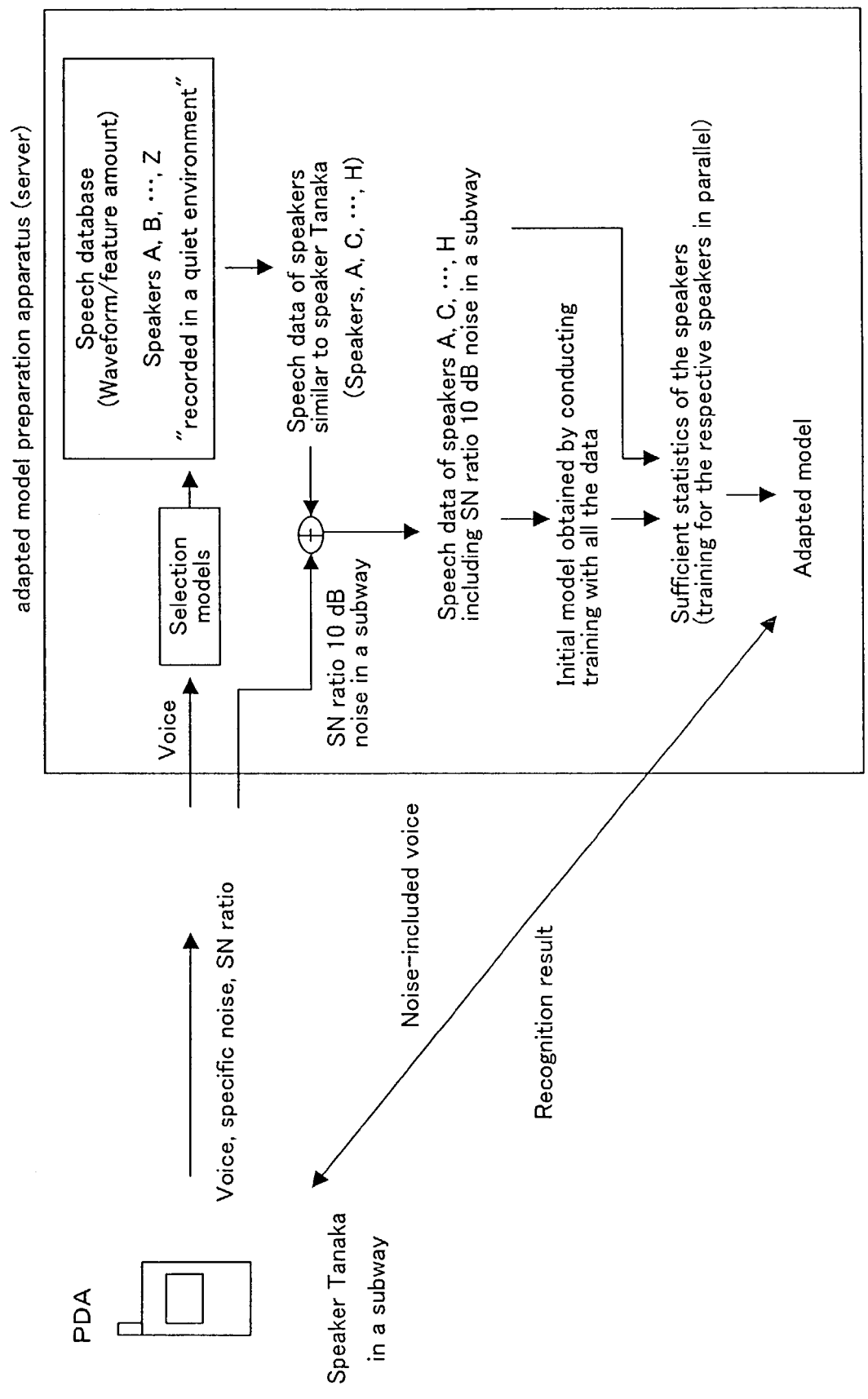
FIG. 33 shows an image of an actual product to which the adapted model preparation apparatus of Embodiment 2 has been applied.

FIG. 33 shows an image of a system of an actual product to which the adapted model preparation apparatus of Embodiment 2 has been applied. This system is essentially composed of a PDA into which voice is input and a server for preparing an adapted model to perform speech recognition. The user calls a service center (server) and sends an instruction by voice according to guidance from the center. The service center (server) receives the user's voice and noise and prepares an adapted model in the manner described above. The service center recognizes the user's voice using the prepared adapted model and sends guidance (recognition result) to the PDA.

Embodiment 3

<Configuration of Adapted Model Preparation Apparatus>

Figure 34:
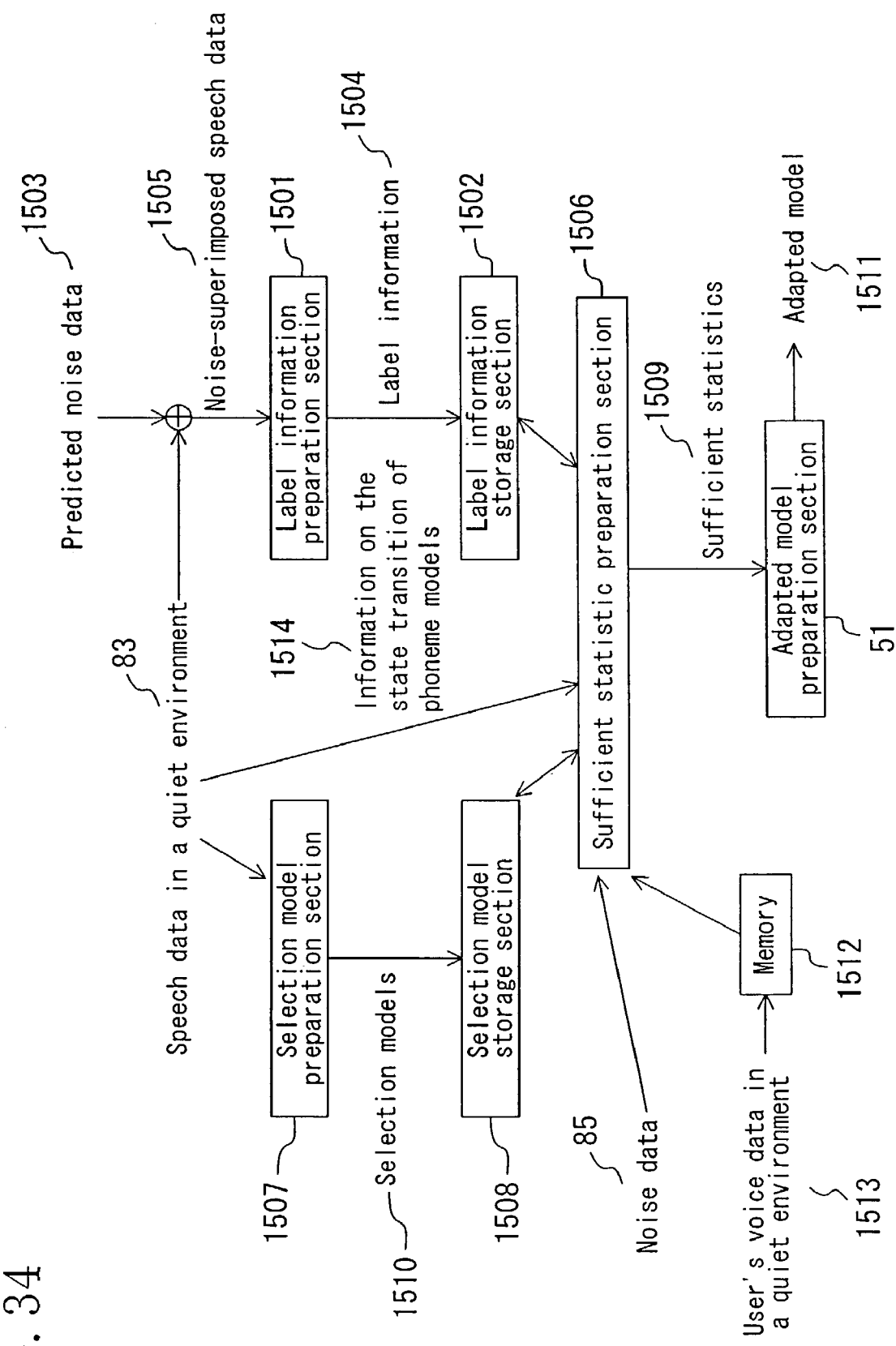
FIG. 34 is a block diagram of an adapted model preparation apparatus of Embodiment 3 of the present invention.

FIG. 34 is a block diagram showing the entire configuration of an adapted model preparation apparatus for speech recognition of Embodiment 3. The apparatus shown in FIG. 34 includes a selection model preparation section 1507, a selection model storage section 1508, a sufficient statistic preparation section 1506, an adapted model preparation section 51, a label information preparation section 1501, a label information storage section 1502 and a memory 1512.

The selection model preparation section 1507 prepares selection models 1510 used for selecting speech data similar to user's voice data. The selection model storage section 1508 stores the selection models 1510 prepared by the selection model preparation section 1507.

The label information preparation section 1501 prepares label information 1504 using noise-superimposed speech data 1505 obtained by superimposing predicted noise data 1503, predicted to be the noise in the use environment, on voice data 83 in a quiet environment at a predicted SN ratio. The label information storage section 1502 stores the label information 1504 prepared by the label information preparation section 1501.

The sufficient statistic preparation section 1506 selects speech data acoustically similar to user's voice data from the speech data 83 using the selection models 1510 stored in the selection model storage section 1508 and the user's voice data 1513 in a quiet environment. The sufficient statistic preparation section 1506 then superimposes noise data 85 on the selected speech data, and prepares sufficient statistics 1509 using the noise-superimposed speech data and the label information 1504 stored in the label information storage section 1502. The adapted model preparation section 51 prepares an adapted model 1511 using the sufficient statistics 1509 prepared by the sufficient statistic preparation section 1506.

<Procedure of Preparation of Adapted Model>

A procedure of preparation of an adapted model by the apparatus having the configuration described above will be described.

[Preparation of Selection Models 1510]

The selection models 1510 are prepared in the following manner. Assume herein that this preparation is performed off-line before the user requests acquisition of an adapted model.

The speech data 83 of a plurality of speakers are recorded in a quiet environment. Assume herein that speech data of about 300 speakers are recorded.

Figure 35:
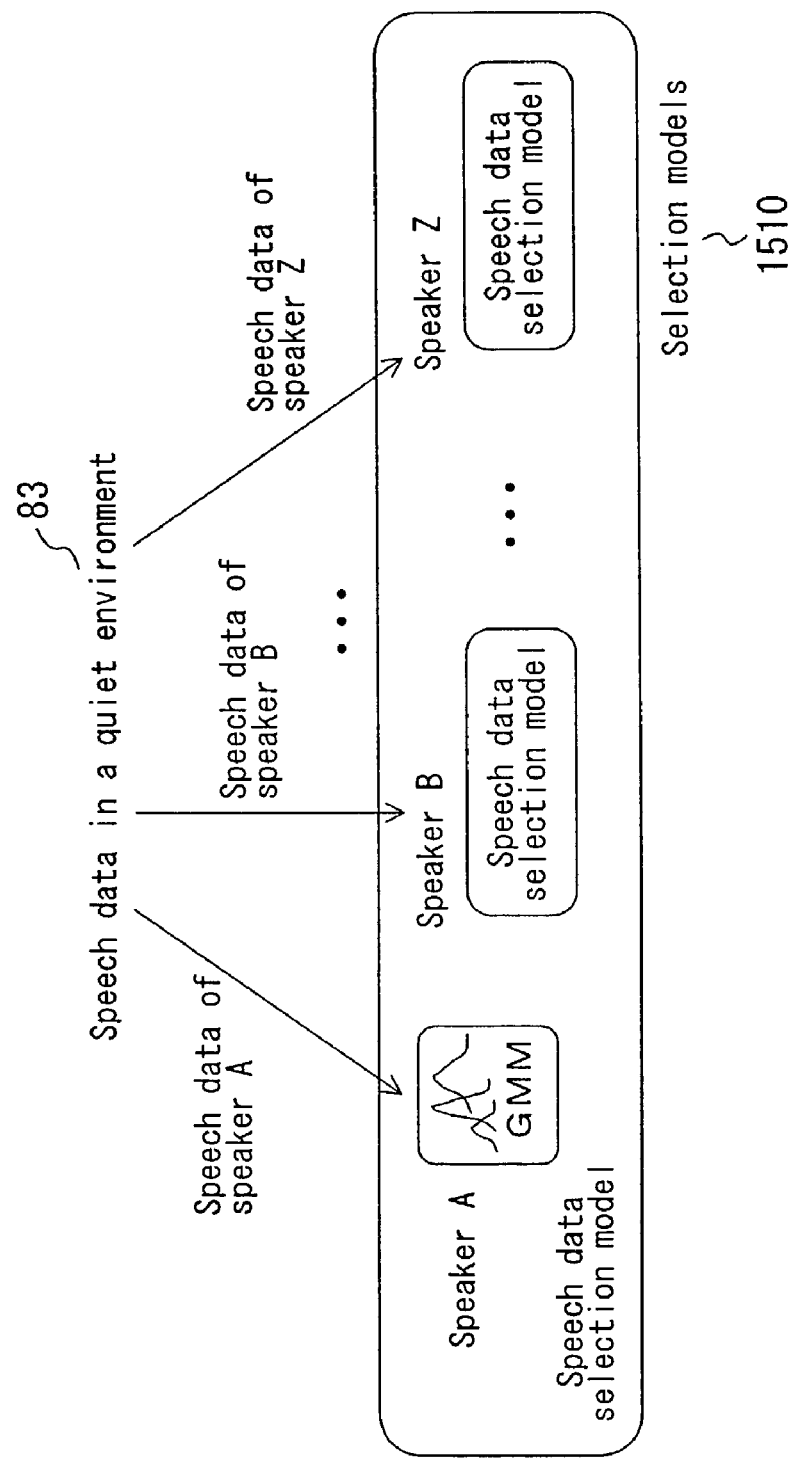
FIG. 35 shows a flow of preparation of selection models stored in a selection model storage section shown in FIG. 34.

As shown in FIG. 35, the selection model preparation section 1507 prepares the selection model 1510 for each speaker using the speech data 83 in the form of a Gaussian mixture model having 64 mixture components per state without distinction of the phoneme.

The selection model storage section 1508 stores the selection models 1510 prepared by the selection model preparation section 1507.

[Preparation of Label Information 1504 and Information 1514 on State Transition of Phoneme Model]

The label information 1504 and information 1514 on the state transition of phoneme models are prepared in the following manner. Assume herein that this preparation is performed off-line before the user requests acquisition of an adapted model. As an example, speech recognition for a car navigation system performed in a car will be described with reference to FIGS. 36, 37 and 38.

Figure 36:
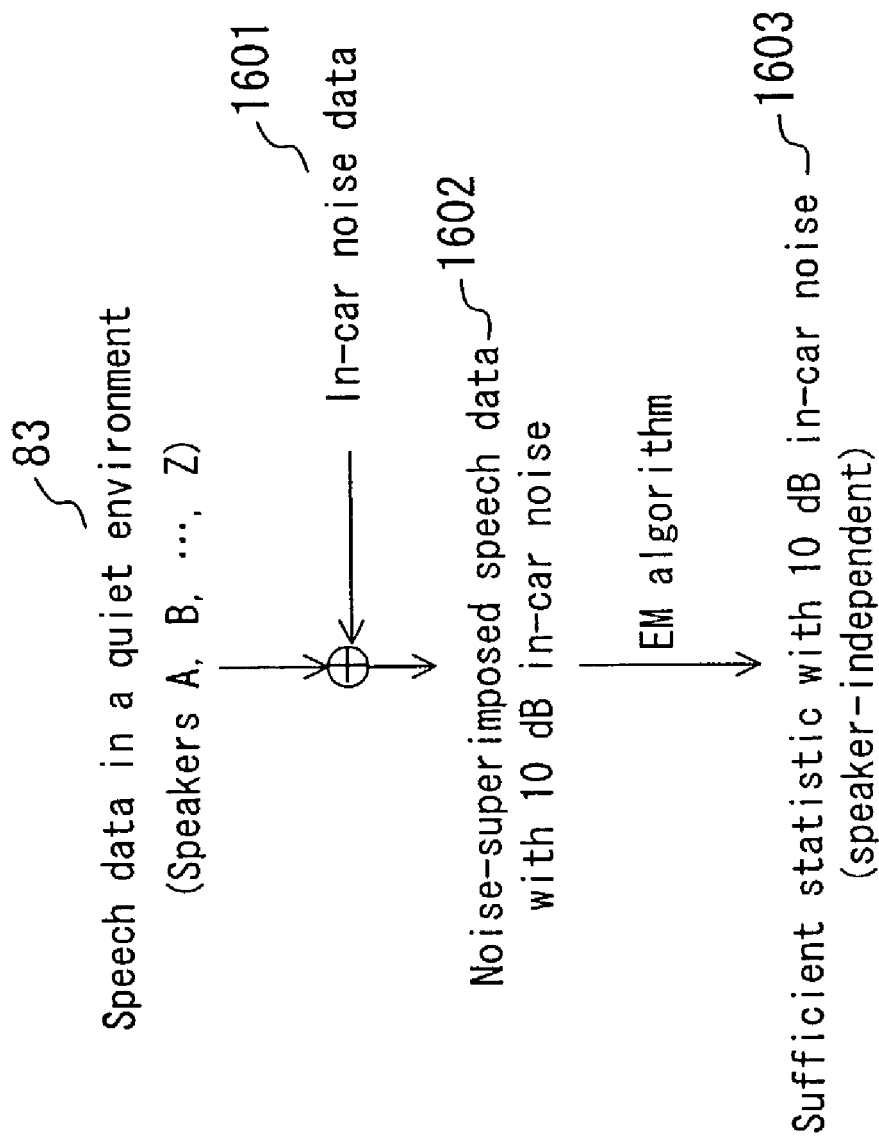
FIGS. 36 and 37 show a flow of preparation of label information.

Referring to FIG. 36, noise data 1601 (in-car noise data of normal car model A) predicted to be the noise in the use environment is superimposed on the speech data 83 in a quiet environment, to prepare noise-superimposed speech data 1602 with 10 dB in-car noise. In this example, as the in-car noise data 1601 of car model A, noise recorded in advance by actually driving the car on the street is used. Sufficient statistics 1603 with 10 dB in-car noise are calculated from the prepared noise-superimposed speech data 1602 using the EM algorithm. In this example, a speaker-independent sufficient statistic is prepared using HMM for each phoneme, and the state transition probability of HMM for each phoneme is used as the information 1514 on the state transition of phoneme models described above.

Figure 37:
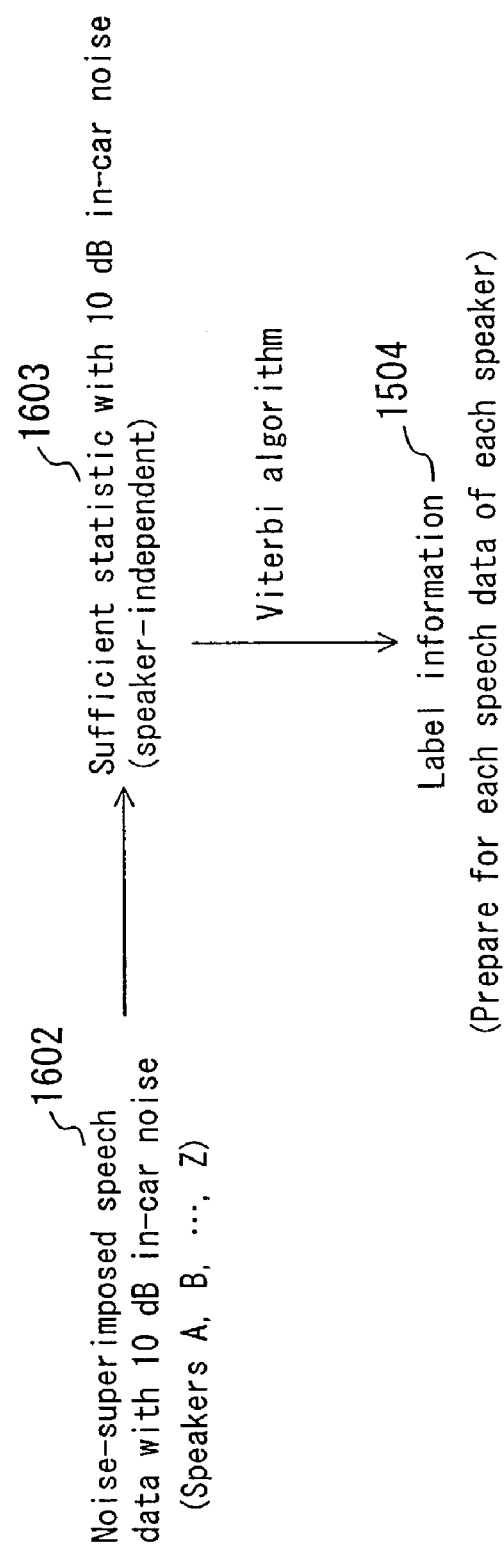
Figure 38:
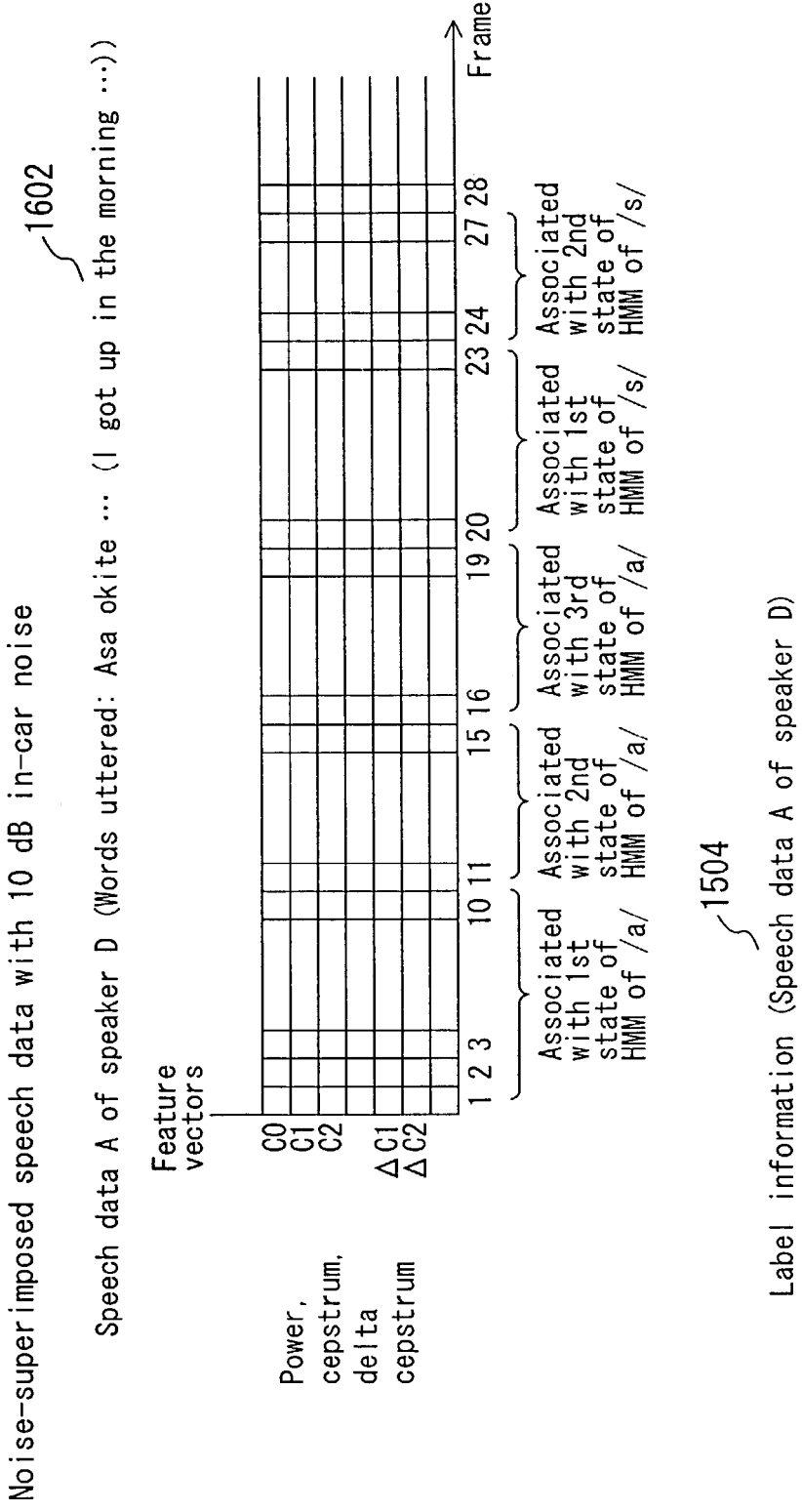
FIG. 38 shows an example of label information stored in a label information storage section.

Referring to FIG. 37, the noise-superimposed speech data 1602 with 10 dB in-car noise is input into the sufficient statistic 1603 with 10 dB in-car noise for each speech data (each utterance data of each speaker), to prepare the label information 1504 for each speech data (each utterance data of each speaker) using Viterbi algorithm. FIG. 38 shows an example of the label information 1504, which includes the HMM phoneme name and the HMM state number corresponding to each frame number.

The label information storage section 1502 stores the label information 1504 and the information 1514 on the state transition of phoneme models.

[Preparation of Sufficient Statistics 1509]

The sufficient statistics 1509 are prepared in the following manner.

The user stores in advance his or her voice data 1513 in a quiet environment in the memory 1512.

The user requests preparation of the adapted model 1511.

The sufficient statistic preparation section 1506 receives the user's voice data 1513 in a quiet environment, and also receives the noise data 85 in the use environment.

The sufficient statistic preparation section 1506 inputs the user's voice data 1513 in a quiet environment into the selection models 1510 stored in the selection model storage section 1508, to calculate the likelihood, and selects top L (for example, top 40) speakers largest in likelihood as the speakers similar to the user's voice data.

The sufficient statistic preparation section 1506 superimposes the noise data 85 on the speech data of the speakers similar to the user's voice data among the voice data 83 in a quiet environment, to prepare noise-superimposed speech data 86. An example of preparation of the noise-superimposed speech data 86 is shown in FIG. 31.

Figure 39:
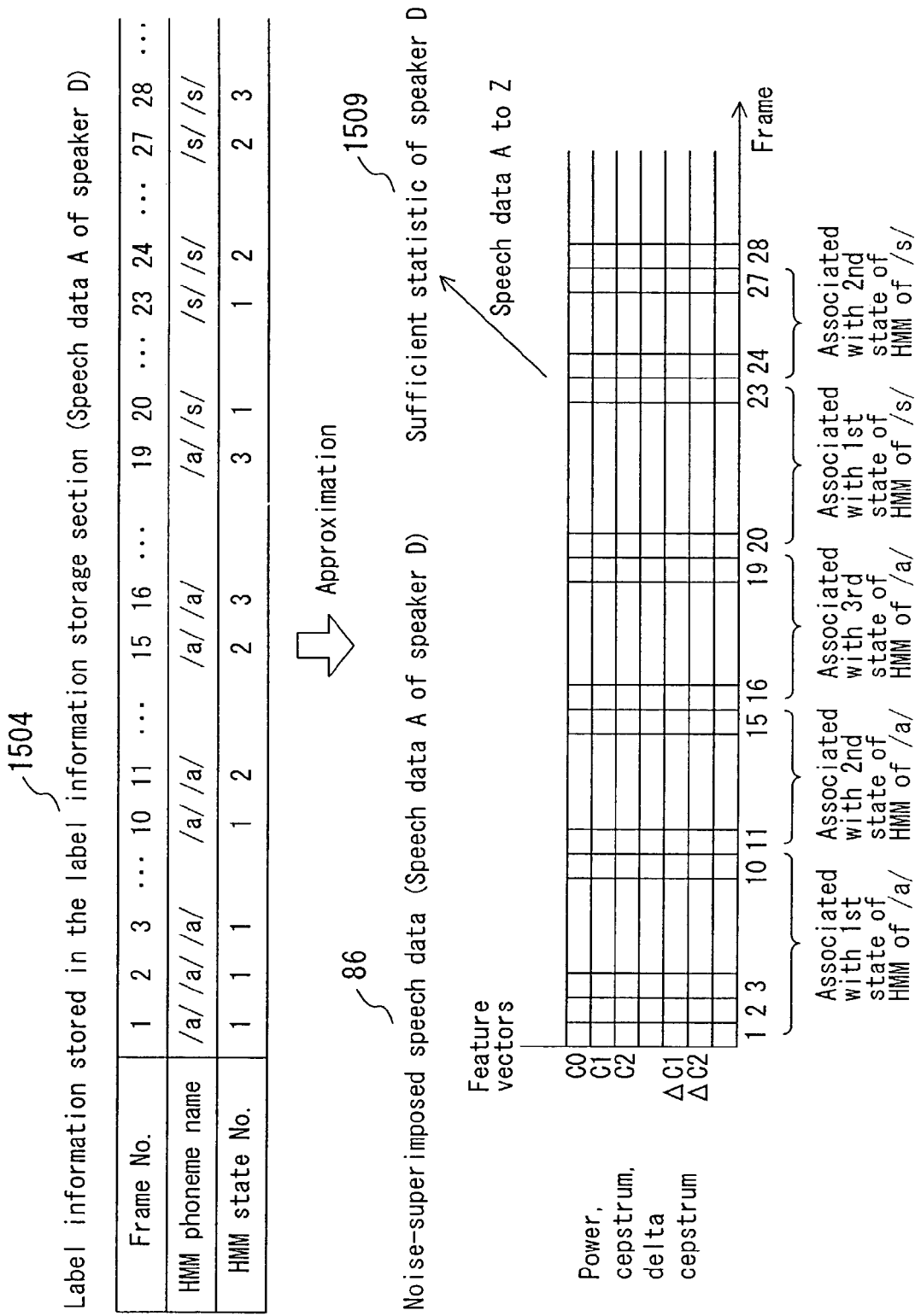
FIG. 39 shows a flow of preparation of sufficient statistics.

The sufficient statistic preparation section 1506 prepares the sufficient statistics 1509 using the noise-superimposed speech data 86, the label information 1504 stored in the label information storage section 1502 and the information 1514 on the state transition of phoneme models. As shown in FIG. 39, the phoneme names and the HMM state numbers corresponding to the noise-superimposed speech data 86 are considered identical to the phoneme names and the HMM state numbers of the noise-superimposed speech data 1505 indicated in the label information 1504. Likewise, the state transition probability of HMM for each phoneme is considered identical. In other words, no calculation is made for the HMM state number, the state transition probability and the like. In the same HMM state, calculation of the sufficient statistics, including the mean, variance and mixture weight, is performed.

[Preparation of Adapted Model 1511]

The adapted model 1511 is prepared by the adapted model preparation section 51 in the following manner.

The adapted model preparation section 51 prepares the adapted model 1511 using the sufficient statistics 1509 prepared by the sufficient statistic preparation section 1506. More specifically, the adapted model 1511 is prepared by the following statistics calculation (equations 10 to 11). In the equations, the mean and variance of the normal distribution in each state of the HMM of the adapted model 1511 are expressed by $\mu_i^{adp}$ (i=1, 2, ..., $N_{mix}$) and $v_i^{adp}$ (i=1, 2, ..., $N_{mix}$) where $N_{mix}$ is the number of mixed distributions. The state transition probability is expressed by $a^{adp}$[i][j] (i, j=1, 2, ..., $N_{state}$) where $N_{state}$ is the number of states, and $a^{adp}$[i][j] represents the transition probability from state i to state j.

$$\mu_i^{adp} = \frac{\sum_{j=1}^{N_{sel}} C_{mix}^j \mu_i^j}{\sum_{j=1}^{N_{sel}} C_{mix}^j} (i = 1, 2, \ldots, N_{mix})$$

Equation 10

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i = 1, 2, \ldots, N_{mix})$$

Equation 11

-continued $$a^{adp}[i][j] = \frac{\sum_{k=1}^{N_{sel}} C_{state}^k[i][j]}{\sum_{j=1}^{N_{state}} \sum_{k=1}^{N_{sel}} C_{state}^k[i][j]} \quad (i, j = 1, 2, \ldots, N_{state})$$

Equation 12 where $N_{sel}$ is the number of acoustic models selected, and $\mu_i^j$ (i=1, 2, . . . , $N_{mix}$ and j=1, 2, . . . , $N_{sel}$) and $v_i^j$ (i=1, 2, . . . , $N_{mix}$ and j=1, 2, . . . , $N_{sel}$) are the mean and variance, respectively, of the respective HHMs. $C_{mix}^j$ (j=1, 2, . . . , $N_{sel}$) and $C_{state}^k[i][j]$ (k=1, 2, . . . , $N_{sel}$ and i, j=1, 2, . . . , $N_{state}$) are the EM count (frequency) in the normal distribution and the EM count related to the state transition, respectively.

The adapted model preparation section 51 then waits for a request for preparation of a next adapted model from a user.

<Effects>

As described above, in Embodiment 3, the sufficient statistics 1509 are prepared using the label information 1504. Therefore, the sufficient statistics 1509 and then the adapted model 1511 can be prepared in a short time period. This enables prompt use of the adapted model at the occasions of various changes of the use environment.

The label information 1504 is prepared using the noise-superimposed speech data 1505 including noise close to the use environment. Therefore, high-precision sufficient statistics 1509 can be prepared in a short time period, and this enables prompt use of a higher-precision adapted model at the occasions of various changes of the use environment.

The sufficient statistics 1509 are calculated using the label information 1504 and the information 1514 on the state transition of phoneme models. Therefore, the sufficient statistics 1509 and then the adapted model 1511 can be prepared in a short time period. This enables prompt use of the adapted model at the occasions of various changes of the use environment.

The noise data 85 may be input into the sufficient statistic preparation section 1506 off-line before the user requests acquisition of an adapted model, to prepare the sufficient statistics 1509 off-line.

The timing at which the noise data 85 is input into the sufficient statistic preparation section 1506 may be automatically determined by the sufficient statistic preparation section 1506.

The timing at which the adapted model 1511 is prepared may be automatically determined by the adapted model preparation section 51.

The selection models 1510 are not necessarily in the form of Gaussian mixture models.

The user's voice data 1513 stored in the memory 1512 may be noise-superimposed speech data including noise in the use environment or an environment predicted to be the use environment.

The noise data 85 may be used as the predicted noise data 1503.

Embodiment 4

<Configuration of Adapted Model Preparation Apparatus>

Figure 40:
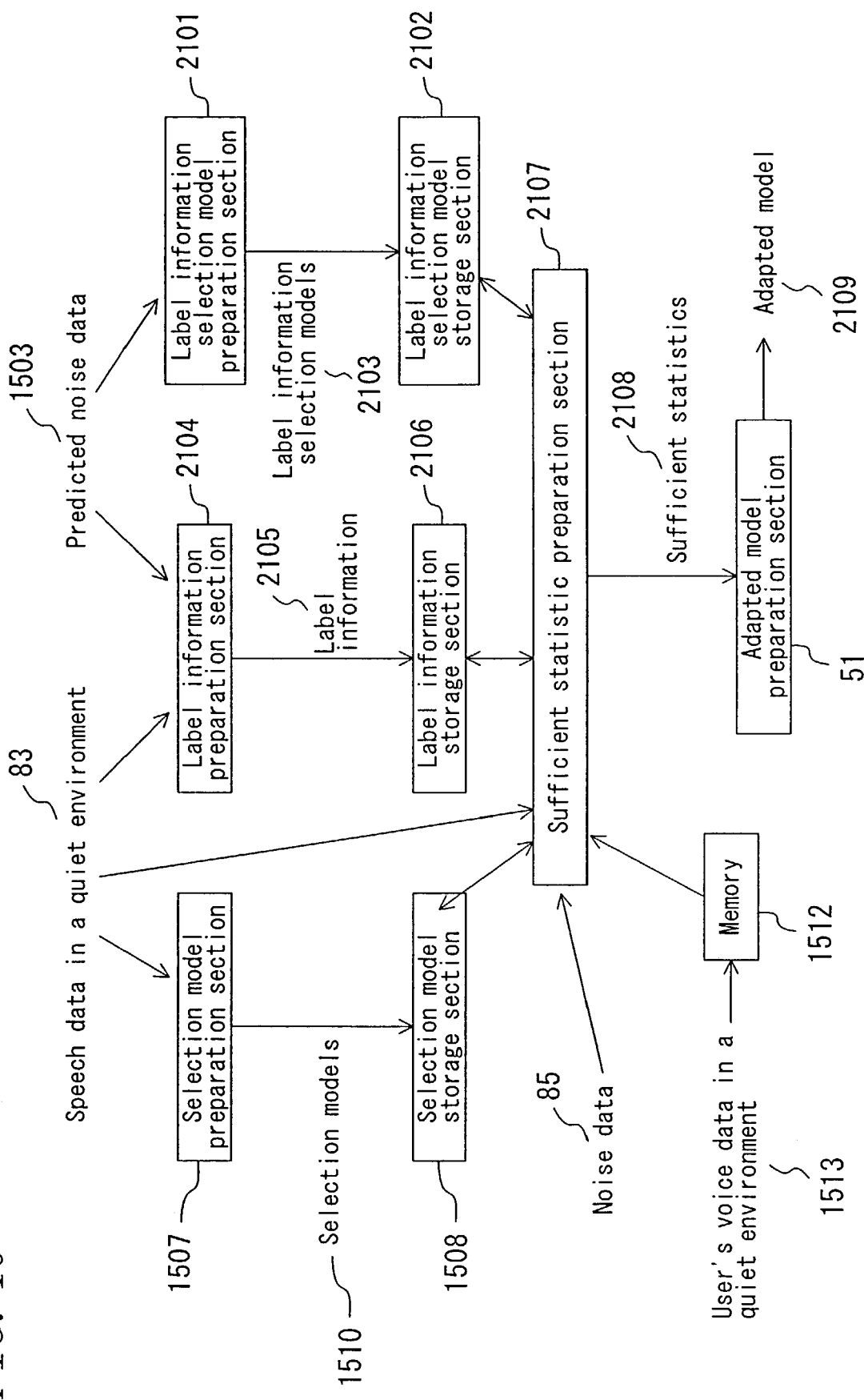
FIG. 40 is a block diagram of an adapted model preparation apparatus of Embodiment 4 of the present invention.

FIG. 40 is a block diagram showing the entire configuration of an adapted model preparation apparatus for speech recognition of Embodiment 4. The apparatus shown in FIG. 40 includes a selection model preparation section 1507, a selection model storage section 1508, a sufficient statistic preparation section 2107, an adapted model preparation section 51, a label information preparation section 2104, a label information storage section 2106, a label information selection model preparation section 2101, a label information selection model storage section 2102 and a memory 1512.

The selection model preparation section 1507 prepares selection models 1510 used for selecting speech data similar to user's voice data. The selection model storage section 1508 stores the selection models 1510 prepared by the selection model preparation section 1507.

The label information preparation section 2104 prepares two or more kinds of label information 2105 using noise-superimposed speech data obtained by superimposing predicted noise data 1503, predicted to be the noise in the use environment, on speech data 83 in a quiet environment at a predicted SN ratio. The label information storage section 2106 stores the two or more kinds of label information 2105 prepared by the label information preparation section 2104. The label information selection model preparation section 2101 prepares label information selection models 2103 using the predicted noise data 1503. The label information selection model storage section 2102 stores the label information selection models 2103 prepared by the label information selection model preparation section 2101.

The sufficient statistic preparation section 2107 selects speech data similar to the user's voice data from the speech data 83 using the selection models 1510 stored in the selection model storage section 1508 and the user's voice data 1513 in a quiet environment stored in the memory 1512. The sufficient statistic preparation section 2107 also selects label information appropriate to the use environment from the label information 2105 stored in the label information storage section 2106 using the label information selection models 2103 stored in the label information selection model storage section 2102 and noise data 85 in the use environment. The sufficient statistic preparation section 2107 superimposes the noise data 85 on the selected speech data, and prepares the sufficient statistics 2108 using the noise-superimposed speech data and the selected label information 2105 appropriate to the use environment. The adapted model preparation section 51 prepares an adapted model 2109 using the sufficient statistics 2108 prepared by the sufficient statistic preparation section 2107.

<Procedure of Preparation of Adapted Model>

A procedure of preparation of an adapted model by the apparatus having the configuration described above will be described.

[Preparation of Selection Models 1510]

The selection models 1510 are prepared in the following manner. Assume herein that this preparation is performed off-line before the user requests acquisition of an adapted model.

The speech data 83 of a plurality of speakers are recorded in a quiet environment. Assume herein that speech data of about 300 speakers are recorded.

The selection model preparation section 1507 prepares the selection model 1510 in the form of a Gaussian mixture model having 64 mixture components per state for each speaker using the speech data 83 without distinction of the phoneme, as shown in FIG. 35.

The selection model storage section 1508 stores the selection models 1510 prepared by the selection model preparation section 1507.

[Preparation of Label Information 2105]

The label information 2105 is prepared in the following manner. Assume herein that this preparation is performed off-line before the user requests acquisition of an adapted model. As an example, use of speech recognition in an exhibition hall will be described with reference to FIGS. 41 and 42.

Figure 41:
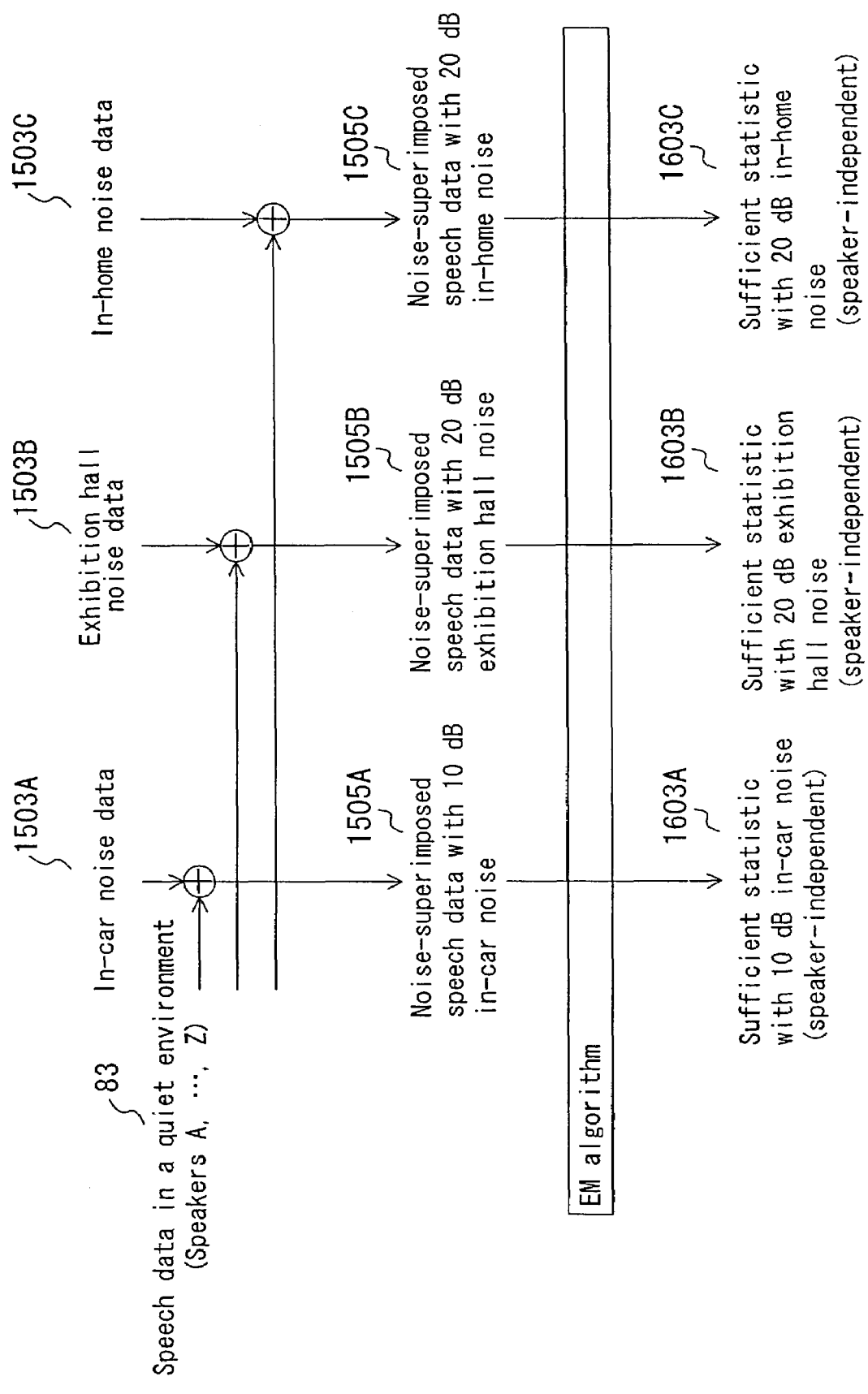
FIGS. 41 and 42 show a flow of preparation of label information.

Suppose it is known that the user often uses speech recognition in a car, in an exhibition hall and at home from the activity history of the user. In this case, general noises in a car, in an exhibition hall and at home are recorded in advance. As shown in FIG. 41, three types of noise data (in-car noise data 1503A, exhibition hall noise data 1503B and in-home noise data 1503C) predicted as the use environments are superimposed on the speech data 83 in a quiet environment, to prepare noise-superimposed speech data 1505A, 1505B and 1505C with 10 dB in-car noise, 20 dB exhibition hall noise and 20 dB in-home noise, respectively. Using the prepared noise-superimposed speech data, sufficient statistics 1603A, 1603B and 1603C are calculated for the respective noise types using the EM algorithm. Assume herein that speaker-independent sufficient statistics are prepared using HMM for each phoneme.

Figure 42:
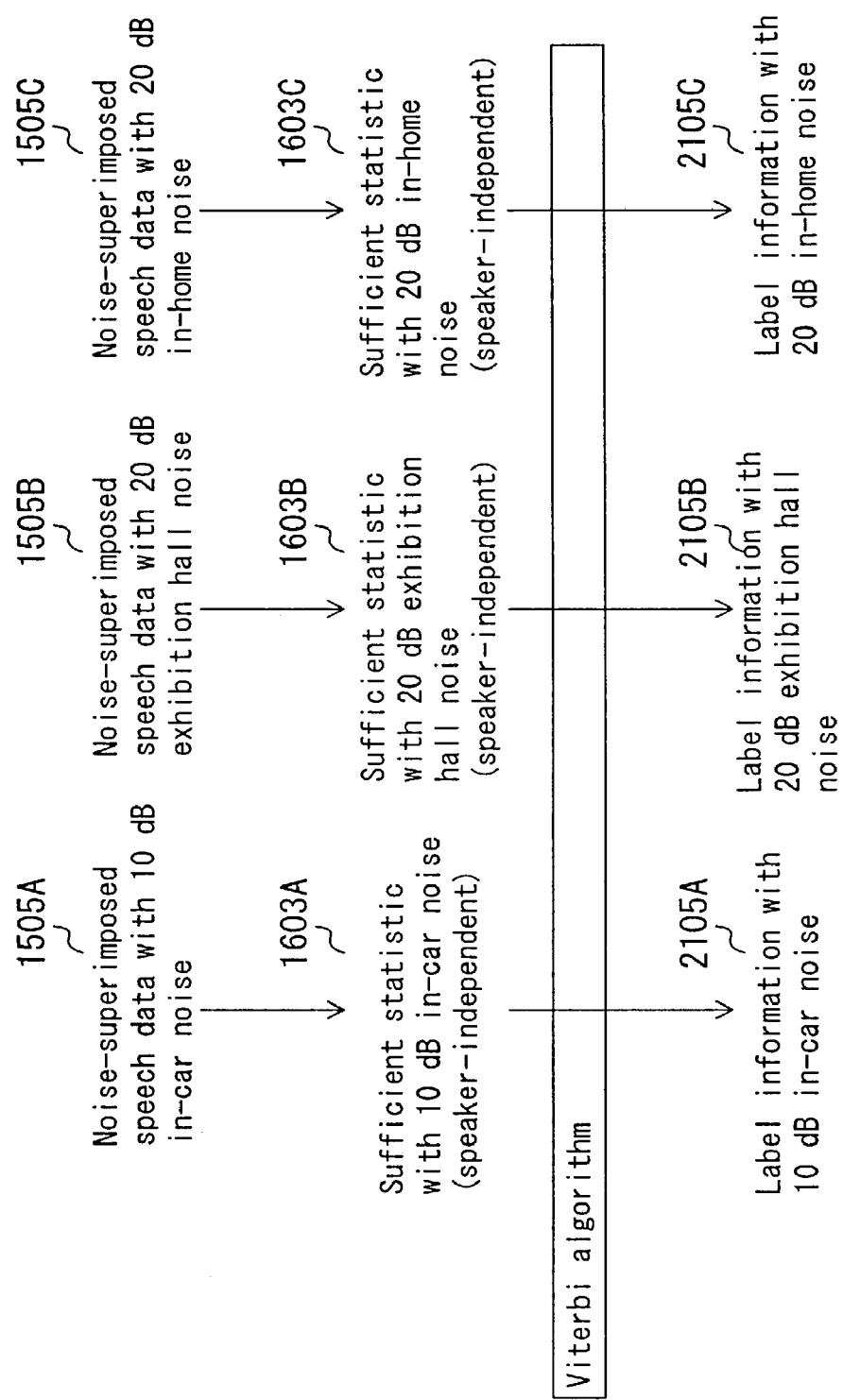

Thereafter, as shown in FIG. 42, the three types of noise-superimposed speech data 1505A, 1505B and 1505C are input into the sufficient statistics 1603A, 1603B and 1603C for each speech data (each utterance data of each speaker in each type of noise data), to thereby prepare three kinds of label information 2105A, 2105B and 2105C for each noise data (each utterance data of each speaker) using Viterbi algorithm.

[Preparation of Label Information Selection Models 2103]

Figure 43:
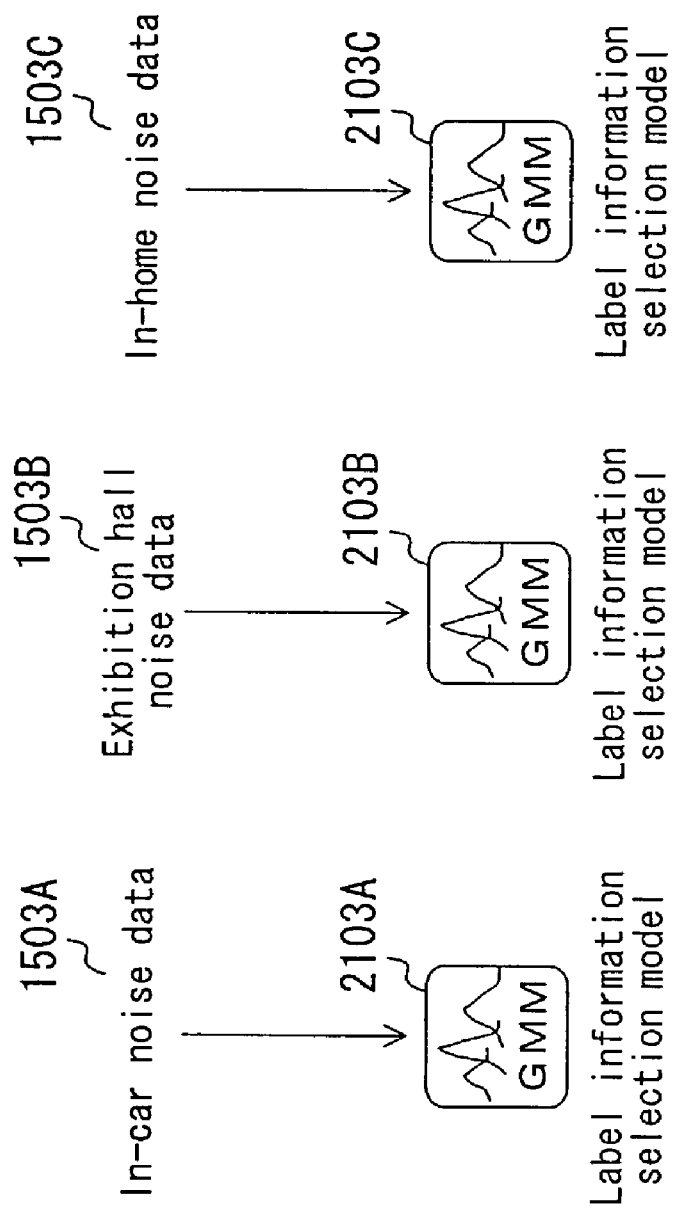
FIG. 43 shows a flow of preparation of label information selection models.

FIG. 43 shows preparation of the label information selection models 2103, in which, as an example, GMMs corresponding to the noise types are prepared. Label information selection models 2103A, 2103B and 2103C are prepared using the predicted noise data 1503A, 1503B and 1503C used in the preparation of the label information 2105.

[Preparation of Sufficient Statistics 2108]

The sufficient statistics 2108 are prepared in the following manner.

The user stores in advance his or her voice data 1513 in a quiet environment in the memory 1512.

The user requests preparation of the adapted model 2109.

The sufficient statistic preparation section 2107 receives the user's voice data 1513 in a quiet environment stored in the memory 1512, and also receives the noise data 85 in the use environment.

The sufficient statistic preparation section 2107 inputs the user's voice data 1513 in a quiet environment into the selection models 1510 stored in the selection model storage section 1508, to thereby calculate the likelihood, and selects top L (for example, top 40) speakers largest in likelihood as the speakers similar to the user's voice data.

The sufficient statistic preparation section 2107 superimposes the noise data 85 on the speech data of the speakers similar to the user's voice data among the speech data 83 in a quiet environment, to prepare noise-superimposed speech data 86. An example of preparation of the noise-superimposed voice data 86 is shown in FIG. 31.

The sufficient statistic preparation section 2107 inputs the noise data 85 into the label information selection models 2103 stored in the storage section 2102, and retrieves the label information 2105 corresponding to the label information selection model 2103 largest in likelihood from the label information storage section 2106. Since the use environment in this example is an exhibition hall, the label information 2105B of 20 dB exhibition hall noise is retrieved.

The sufficient statistic preparation section 2107 prepares the sufficient statistics 2108 using the noise-superimposed speech data 86 and the label information 2105B of 20 dB exhibition hall noise retrieved from the label information storage section 2106.

[Preparation of Adapted Model 2109]

The adapted model 2109 is prepared by the adapted model preparation section 51 in the following manner.

The adapted model preparation section 51 prepares the adapted model 2109 using the sufficient statistics 2108 prepared by the sufficient statistic preparation section 2107. More specifically, the adapted model 2109 is prepared by the following statistics calculation (equations 13 to 15). In the equations, the mean and variance of the normal distribution in each state of the HMM of the adapted model 2109 are expressed by $\mu_i^{adp}$ (i=1, 2, . . . , $N_{mix}$) and $v_i^{adp}$ (i=1, 2, . . . , $N_{mix}$) where $N_{mix}$ is the number of mixed distributions. The state transition probability is expressed by $a^{adp}[i][j]$ (i, j=1, 2, . . . , $N_{state}$) where $N_{state}$ is the number of states, and $a^{adp}[i][j]$ represents the transition probability from state i to state j.

$$\mu_i^{adp} = \frac{\sum_{j=1}^{N_{sel}} C_{mix}^j \mu_i^j}{\sum_{j=1}^{N_{sel}} C_{mix}^j} (i = 1, 2, \ldots, N_{mix}) \quad \text{Equation 13}$$

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i = 1, 2, \ldots, N_{mix}) \quad \text{Equation 14}$$

$$a^{adp}[i][j] = \frac{\sum_{k=1}^{N_{sel}} C_{state}^k[i][j]}{\sum_{j=1}^{N_{state}} \sum_{k=1}^{N_{sel}} C_{state}^k[i][j]} (i, j = 1, 2, \ldots, N_{state}) \quad \text{Equation 15}$$

where $N_{sel}$ is the number of acoustic models selected, and $\mu_i^j$ (i=1, 2, . . . , $N_{mix}$ and j=1, 2, . . . , $N_{sel}$) and $v_i^j$ (i=1, 2, . . . , $N_{mix}$ and j=1, 2, . . . , $N_{sel}$) are the mean and variance, respectively, of the respective HHMs. $C_{mix}^j$ (j=1, 2, . . . , $N_{sel}$) and $C_{state}^k[i][j]$ (k=1, 2, . . . , $N_{sel}$ and i, j=1, 2, . . . , $N_{state}$) are the EM count (frequency) in the normal distribution and the EM count related to the state transition, respectively.

The adapted model preparation section 51 then waits for a request for preparation of a next adapted model from a user.

<Effects>

As described above, in Embodiment 4, the sufficient statistics 2108 are prepared using the label information 2105 appropriate to the use environment selected based on the label information selection models 2103. Therefore, further precise sufficient statistics can be prepared. This enables prompt use of a higher-precision adapted model at the occasions of various changes of the use environment.

The noise data 85 may be input into the sufficient statistic preparation section 2107 off-line before the user requests acquisition of an adapted model, to prepare the sufficient statistics 2108 off-line.

The timing at which the noise data 85 is input in the sufficient statistic preparation section 2107 may be automatically determined by the sufficient statistic preparation section 2107.

The timing at which the adapted model 2109 is prepared may be automatically determined by the adapted model preparation section 51.

The selection models 1510 are not necessarily in the form of Gaussian mixture models.

The user's voice data 1513 stored in the memory 1512 may be noise-superimposed speech data including noise in the use environment or an environment predicted to be the use environment.

The number of kinds of label information 2105 is not necessarily the same as the number of the label information selection models 2103.

The noise data 85 may be used as the predicted noise data 1503.

The adapted model preparation apparatus of Embodiment 2 can be implemented both by hardware and software (a computer program).

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for preparing an acoustic model used for speech recognition using sufficient statistics, each of which is represented by a hidden Markov model, each state of the hidden Markov model being represented by mixed Gaussian distributions, the sufficient statistics including, as information, a mean value, a variance value and an EM count value of the mixed Gaussian distributions and an identification number given to a Gaussian distribution included in the mixed Gaussian distributions, the method preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the method comprising the steps of:
(a) grouping noise-superimposed speech data according to acoustic similarity;
(b) preparing sufficient statistics for each of groups obtained in the step (a) as a material for preparing an acoustic model from a predetermined initial-value sufficient statistic using the speech data in the group;
(c) selecting a group acoustically similar to voice data of a user of the speech recognition from the groups obtained in the step (a);
(d) selecting a plurality of sufficient statistics acoustically similar to the voice data of the user from the sufficient statistics in the group selected in the step (c); and
(e) preparing an acoustic model by performing statistics calculation using a mean value, a variance value and an EM count value among Gaussian distributions of a same identification number for the sufficient statistics selected in the step (d), to obtain a new Gaussian distribution, wherein in the step (a), the noise super-imposed speech data is grouped so that a Gaussian distribution of the predetermined initial-value sufficient statistic and a Gaussian distribution of a sufficient statistic of the noise-super-imposed speech data, whose distribution distance is closest to the Gaussian distribution of the predetermined initial-value sufficient statistic will have a same identification number when the sufficient statistic of the noise-super-imposed speech data is prepared from the predetermined initial-value sufficient statistic using the noise-superimposed speech data.

2. The method of claim 1, wherein the steps (a) and (b) are performed off-line before the user uses the speech recognition.

3. The method of claim 1, wherein in the step (a), the grouping is made according to the type of the noise.

4. The method of claim 1, wherein in the step (a), the grouping is made according to the SN ratio of the noise-superimposed voice data.

5. The method of claim 1, wherein in the step (a), the grouping is made according to acoustic similarity of speaker.

6. The method of claim 1, wherein in the step (a), the sufficient statistics are prepared for each speaker.

7. The method of claim 6, wherein in the step (b), the sufficient statistics are prepared for each voice tone of each speaker.

8. The method of claim 1, wherein in the step (b), the sufficient statistics are prepared for each type of the noise.

9. The method of claim 1, wherein in the step (b), the sufficient statistics are prepared for each SN ratio of speech data in each group.

10. A method for preparing an acoustic model used for speech recognition using sufficient statistics, each of which is represented by a hidden Markov model, each state of the hidden Markov model being represented by mixed Gaussian distributions, the sufficient statistics including, as information, a mean value, a variance value and an EM count value of the mixed Gaussian distributions and an identification number given to a Gaussian distribution included in the mixed Gaussian distributions, the method preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the method comprising the steps of:
(a) selecting from a plurality of speech data of a plurality of speakers, speech data which is acoustically similar to voice data of a user of the speech recognition and which will make a Gaussian distribution of a predetermined initial-value sufficient statistic and a Gaussian distribution of a distribution of a sufficient statistic of the speech data, whose distribution distance is closest to the Gaussian distribution of the predetermined initial-value sufficient statistic, will have a same identification number when the sufficient statistic of the speech data is prepared from the predetermined initial-value sufficient statistic using the speech data;
(b) superimposing noise in an environment in which the speech recognition is used on the speech data selected in the step (a);
(c) preparing sufficient statistics using noise-superimposed speech data obtained in the step (b) so that a Gaussian distribution of a predetermined initial-value sufficient statistic and a Gaussian distribution of a sufficient statistic of the noise-superimposed speech data, whose distribution distance is closest to the Gaussian distribution of the predetermined initial-value sufficient statistic, will have a same identification number when the sufficient statistic of the noise-superimposed speech data is prepared from the predetermined initial-value sufficient statistic;

(d) preparing an acoustic model by performing statistics calculation using a mean value, a variance value and an EM count value among Gaussian distributions of a same identification number for the sufficient statistics prepared in the step (c) to obtain a new Gaussian distribution.

11. The method of claim 10, further comprising the steps of:

(e) superimposing noise in an environment in which the speech recognition is predicted to be used on the plurality of speech data of the plurality of speakers; and (f) preparing label information on the noise-superimposed speech data obtained in the step (e), wherein in the step (c), the sufficient statistics are prepared using noise-superimposed speech data obtained in the step (b) and label information on the speech data selected in the step (a) among the label information prepared in the step (f).

12. The method of claim 11, wherein the step (f) further comprises preparing information on the state transition of acoustic models for noise-superimposed speech data obtained in the step (e), and in the step (c), the sufficient statistics are prepared using additionally information on the state transition of acoustic models for the speech data selected in the step (a) among the information on the state transition of acoustic models prepared in the step (f).

13. The method of claim 11, wherein in the step (e), each of a plurality of types of noise is superimposed on the plurality of speech data of the plurality of speakers, in the step (f), label information is prepared for each of the plurality of types of noise, and in the step (a), label information appropriate to the environment in which the speech recognition is used is selected from a plurality of types of label information on the speech data selected in the step (a), and the sufficient statistics are prepared using the selected label information.

14. An apparatus for preparing an acoustic model used for speech recognition using sufficient statistics, each of which is represented by a hidden Markov model, each state of the hidden Markov model being represented by mixed Gaussian distributions, the sufficient statistics including as information, a mean value, a variance value and an EM count value of the mixed Gaussian distributions and an identification number given to a Gaussian distribution included in the mixed Gaussian distributions, the apparatus preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the apparatus comprising:

a storage section for storing sufficient statistics prepared from a predetermined initial-value sufficient statistic using speech data in each of a plurality of groups, the plurality of groups being obtained by grouping noise-superimposed speech data according to acoustic similarity;

a first selection section for selecting a group acoustically similar to voice data of a user of the speech recognition from the plurality of groups;

a second selection section for selecting a plurality of sufficient statistics acoustically similar to the voice data of the user from the sufficient statistics in the group selected by the first selection section; and a model preparation section for preparing an acoustic model by performing statistics calculation using a mean value, a variance value and an EM count value among Gaussian distributions of a same identification number for the sufficient statistics selected by the second selection section, to obtain a new Gaussian distribution, wherein the plurality of groups are obtained as a result of grouping the noise-superimposed speech data so that a Gaussian distribution of the predetermined initial-value sufficient statistic and a Gaussian distribution of a sufficient statistic of the noise-superimposed speech data, whose distribution distance is closest to the Gaussian distribution of the predetermined initial-value sufficient statistic, will have a same identification number when the sufficient statistic of the noise-superimposed speech data is prepared from the predetermined initial-value sufficient statistic using the noise-superimposed speech data.

15. The apparatus of claim 14, further comprising:

a grouping section for grouping noise-superimposed speech data according to acoustic similarity; and a sufficient statistic preparation section for preparing sufficient statistics for each of groups obtained by the grouping section using speech in the group, wherein the storage section stores the sufficient statistics prepared by the sufficient statistic preparation section.

16. An apparatus for preparing an acoustic model used for speech recognition using sufficient statistics, each of which is represented by a hidden Markov model, each state of the hidden Markov model being represented by mixed Gaussian distributions, the sufficient statistics including as information, a mean value, a variance value and an EM count value of the mixed Gaussian distributions and an identification number given to a Gaussian distribution included in the mixed Gaussian distributions, the apparatus preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the apparatus comprising:

a storage section for storing a plurality of speech data of a plurality of speakers;

a selection section for selecting from the speech data stored in the storage section, speech data which is acoustically similar to voice data of a user of the speech recognition and which will make a Gaussian distribution of a predetermined initial-value sufficient statistic and a Gaussian distribution of a sufficient statistic of the speech data, whose distribution distance is closest to the Gaussian distribution of the predetermined initial-value sufficient statistic will have a same identification number when the sufficient statistic of the speech data is prepared from the predetermined initial-value sufficient statistic using the speech data;

a noise superimposing section for superimposing noise in an environment in which the speech recognition is used on the speech data selected by the selection section;

a sufficient statistic preparation section for preparing sufficient statistics using noise-superimposed speech data obtained by the noise superimposing section so that a Gaussian distribution of a predetermined initial-value sufficient statistic and a Gaussian distribution of a sufficient statistic of the noise-superimposed speech data, whose distribution distance is closest to the Gaussian distribution of the predetermined initial-value sufficient statistic, will have a same identification number when the sufficient statistic of the noise-superimposed speech data is prepared from the predetermined initial-value sufficient statistic; and a model preparation section for preparing an acoustic model by performing statistics calculation using a mean value, a variance value and an EM count value among Gaussian distributions of a same identification number for the sufficient statistics prepared by the sufficient statistic preparation section, to obtain a new Gaussian distribution.

17. A computer program for preparing an acoustic model used for speech recognition using sufficient statistics, each of which is represented by a hidden Markov model, each state of the hidden Markov model being represented by mixed Gaussian distributions, the sufficient statistics including as information, a mean value, a variance value and an EM count value of the mixed Gaussian distributions and an identification number given to a Gaussian distribution included in the mixed Gaussian distributions, the program preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the program tailoring a computer to function as the means of:

(a) storing sufficient statistics prepared from a predetermined initial-value sufficient statistic using speech data in each of a plurality of groups, the plurality of groups being obtained by grouping noise-superimposed speech data according to acoustic similarity;

(b) selecting a group acoustically similar to voice data of a user of the speech recognition from the plurality of groups;

(c) selecting a plurality of sufficient statistics acoustically similar to the voice data of the user from the sufficient statistics in the group selected by the means (b); and (d) preparing an acoustic model by performing statistics calculation using a mean value, a variance value and an EM count value among Gaussian distributions of a same identification number for the sufficient statistics selected by the means (c), to obtain a new Gaussian distribution, wherein the plurality of groups are obtained as a result of grouping the noise-superimposed speech data so that a Gaussian distribution of the predetermined initial-value sufficient statistic and a Gaussian distribution of a sufficient statistic of the noise-superimposed speech data, whose distribution distance is closest to the Gaussian distribution of the predetermined initial-value sufficient statistic will have a same identification number when the sufficient statistic of the noise-superimposed speech data is prepared from the predetermined initial-value sufficient statistic using the noise-superimposed speech data.

18. The program of claim 17, wherein the computer is tailored to further function as the means of:

(e) grouping noise-superimposed speech data according to acoustic similarity; and (f) preparing sufficient statistics for each of groups obtained by the means (e) using speech data in the group, wherein the means (a) stores the sufficient statistics prepared by the means (f).

19. A computer program for preparing an acoustic model used for speech recognition using sufficient statistics, each of which is represented by a hidden Markov model, each state of the hidden Markov model being represented by mixed Gaussian distributions, the sufficient statistics including as information, a mean value, a variance value and an EM count value of the mixed Gaussian distributions and an identification number given to a Gaussian distribution included in the mixed Gaussian distributions, the program preparing an acoustic model represented by a hidden Markov model and used for speech recognition by performing statistics calculation using a mean value, a variance value and an EM count value among Gaussian distributions of a same identification number for two or more different sufficient statistics, to obtain a new Gaussian distribution, and the program tailoring a computer to function as the means of:

(a) storing a plurality of speech data of a plurality of speakers;

(b) selecting from the speech data stored in the means (a), speech data which is acoustically similar to voice data of a user of the speech recognition and which will make a Gaussian distribution of a predetermined initial-value sufficient statistic and a Gaussian distribution of a sufficient statistic of the speech data, whose distribution distance is closest to the Gaussian distribution of the predetermined initial-value sufficient statistic, will have a same identification number when the sufficient statistic of the speech data is prepared from the predetermined initial-value sufficient statistic using the speech data;

(c) superimposing noise in an environment in which the speech recognition is used on the speech data selected by the means (b);

(d) preparing sufficient statistics using noise-superimposed speech data obtained by the means (c) so that a Gaussian distribution of a predetermined initial-value sufficient statistic and a Gaussian distribution of a sufficient statistic of the noise-superimposed speech data, whose distribution distance is closest to the Gaussian distribution of the predetermined initial-value sufficient statistic, will have a same identification number when the sufficient statistic of the noise-superimposed speech data is prepared from the predetermined initial-value sufficient statistic; and (e) preparing an acoustic model by performing statistics calculation using a mean value, a variance value and an EM count value among Gaussian distribution of a same identification number for the sufficient statistics prepared by the means (d).

* * * * *

UNITED STATES PATENT AND TRADEMARK OFFICE
CERTIFICATE OF CORRECTION

| | | |
|---|---|---|
| PATENT NO. | : 7,209,881 B2 | Page 1 of 1 |
| APPLICATION NO. | : 10/323990 | |
| DATED | : April 24, 2007 | |
| INVENTOR(S) | : Shinichi Yoshizawa et al. | |

It is certified that error appears in the above-identified patent and that said Letters Patent is hereby corrected as shown below:

ON TITLE PAGE

Item (56) FOREIGN PATENT DOCUMENTS "05002399 A" should be -- JP5-2399 --

COLUMN 35

Line 41, Claim 13, "in the step (a) . . ." should be -- in the step (c) . . . --

Signed and Sealed this

Seventh Day of August, 2007

JON W. DUDAS
*Director of the United States Patent and Trademark Office*